(12) United States Patent
Fraser et al.

(10) Patent No.: US 9,943,096 B2
(45) Date of Patent: Apr. 17, 2018

(54) METHODS AND COMPOSITIONS FOR AFFECTING THE FLAVOR AND AROMA PROFILE OF CONSUMABLES

(71) Applicant: Impossible Foods Inc., Redwood City, CA (US)

(72) Inventors: Rachel Fraser, San Francisco, CA (US); Patrick O'Reilly Brown, Stanford, CA (US); Jessica Karr, San Francisco, CA (US); Celeste Holz-Schietinger, East Palo Alto, CA (US); Elysia Cohn, Sunnyvale, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

(21) Appl. No.: 15/398,479

(22) Filed: Jan. 4, 2017

(65) Prior Publication Data

US 2017/0112175 A1 Apr. 27, 2017

Related U.S. Application Data

(63) Continuation of application No. 14/797,006, filed on Jul. 10, 2015, now Pat. No. 9,700,067, which is a (Continued)

(51) Int. Cl.
*A23L 27/26* (2016.01)
*A23L 13/40* (2016.01)
(Continued)

(52) U.S. Cl.
CPC ............. *A23L 27/26* (2016.08); *A23L 13/424* (2016.08); *A23L 13/426* (2016.08); *A23L 27/00* (2016.08); *A23L 27/20* (2016.08); *A23L 33/185* (2016.08)

(58) Field of Classification Search
None
See application file for complete search history.

(56) References Cited

U.S. PATENT DOCUMENTS 2,934,437 A 4/1960 Morton et al.
3,394,017 A 7/1968 Giacino et al.
(Continued)

FOREIGN PATENT DOCUMENTS

CN 1252231 A 5/2000
CN 1301811 A 7/2001
(Continued)

OTHER PUBLICATIONS

Cerny et al. "Formation of Aroma Compounds from Ribose and Cysteine during the Maillard Reaction"—J. Agric. Food Chem. 51, 2003, pp. 2714-2721.*
(Continued)

*Primary Examiner* — Elizabeth Gwartney
(74) *Attorney, Agent, or Firm* — Fish & Richardson P.C.

(57) ABSTRACT

This document relates to food products containing highly conjugated heterocyclic rings complexed to an iron ion and one or more flavor precursors, and using such food products to modulate the flavor and/or aroma profile of other foods. The food products described herein can be prepared in various ways and can be formulated to be free of animal products.

24 Claims, 5 Drawing Sheets

Related U.S. Application Data continuation of application No. PCT/US2014/011347, filed on Jan. 13, 2014, which is a continuation of application No. 13/941,211, filed on Jul. 12, 2013.

(60) Provisional application No. 61/908,634, filed on Nov. 25, 2013, provisional application No. 61/751,816, filed on Jan. 11, 2013.

(51) Int. Cl.
A23L 27/00 (2016.01)
A23L 27/20 (2016.01)
A23L 33/185 (2016.01)

(56) References Cited

U.S. PATENT DOCUMENTS

| | | | |
|---|---|---|---|
| 3,658,550 A | 4/1972 | Hawley | |
| 3,693,533 A | 9/1972 | Liepa | |
| 3,829,582 A | 8/1974 | Guadagni et al. | |
| 3,870,801 A | 3/1975 | Tombs | |
| 3,966,985 A | 6/1976 | Jonas | |
| 3,973,043 A | 8/1976 | Lynn | |
| 4,045,587 A | 8/1977 | Katz et al. | |
| 4,094,997 A | 6/1978 | Aishima et al. | |
| 4,218,487 A | 8/1980 | Jaeggi | |
| 4,435,438 A | 3/1984 | Lehnhardt et al. | |
| 4,604,290 A | 8/1986 | Lee et al. | |
| 4,678,676 A | 7/1987 | Ishizuka et al. | |
| 4,994,285 A | 2/1991 | Hisano et al. | |
| 5,039,543 A | 8/1991 | Lee et al. | |
| 5,055,310 A | 10/1991 | Nonaka et al. | |
| 5,264,239 A | 11/1993 | Cornet et al. | |
| 5,443,852 A | 8/1995 | Shahidi et al. | |
| 5,597,594 A | 1/1997 | Matsuura et al. | |
| 5,650,554 A | 7/1997 | Moloney et al. | |
| 5,753,295 A | 5/1998 | Goldman | |
| 5,807,601 A | 9/1998 | Carpenter et al. | |
| 5,856,452 A | 1/1999 | Moloney et al. | |
| 5,922,392 A | 7/1999 | Kelly et al. | |
| 6,093,424 A | 7/2000 | Han et al. | |
| 6,146,645 A | 11/2000 | Deckers et al. | |
| 6,183,762 B1 | 2/2001 | Deckers et al. | |
| 6,210,742 B1 | 4/2001 | Deckers et al. | |
| 6,228,418 B1 | 5/2001 | Gluck | |
| 6,242,036 B1 | 6/2001 | Han et al. | |
| 6,287,620 B1 | 9/2001 | Van Den Ouweland et al. | |
| 6,372,234 B1 | 4/2002 | Deckers et al. | |
| 6,372,961 B1 | 4/2002 | Tarczynski | |
| 6,379,738 B1 | 4/2002 | Dingman et al. | |
| 6,383,531 B1 | 5/2002 | Gottemoller | |
| 6,399,135 B2 | 6/2002 | Gottemoller | |
| 6,413,569 B1 | 7/2002 | Borders et al. | |
| 6,416,797 B1 | 7/2002 | Han et al. | |
| 6,420,148 B2 | 7/2002 | Yamaguchi | |
| 6,495,184 B1 | 12/2002 | Zheng et al. | |
| 6,495,187 B1 | 12/2002 | Borders et al. | |
| 6,509,453 B1 | 1/2003 | Moloney | |
| 6,582,710 B2 | 6/2003 | Deckers et al. | |
| 6,596,287 B2 | 7/2003 | Deckers et al. | |
| 6,599,513 B2 | 7/2003 | Deckers et al. | |
| 6,692,788 B1 | 2/2004 | Mottram et al. | |
| 6,761,914 B2 | 7/2004 | Deckers et al. | |
| 6,908,634 B2 | 6/2005 | Hwang | |
| 6,936,749 B1 | 8/2005 | Guy et al. | |
| 7,052,879 B2 | 5/2006 | Shaw et al. | |
| 7,332,587 B2 | 2/2008 | Moloney | |
| 7,407,786 B2 | 8/2008 | Giver et al. | |
| 7,479,472 B1 | 1/2009 | Harbury et al. | |
| 7,585,645 B2 | 9/2009 | Deckers et al. | |
| 7,622,290 B2 | 11/2009 | Brunstedt et al. | |
| 7,666,618 B2 | 2/2010 | Miasnikov et al. | |
| 7,666,628 B2 | 2/2010 | Moloney | |
| 7,674,953 B2 | 3/2010 | Mulet Salort et al. | |
| 7,709,044 B2 | 5/2010 | Ishimoto | |
| 7,807,870 B2 | 10/2010 | Geigenberger et al. | |
| 7,931,925 B2 | 4/2011 | Nielsen | |
| 8,012,732 B2 | 9/2011 | Brunstedt et al. | |
| 8,021,695 B2 | 9/2011 | Gruber et al. | |
| 8,188,415 B2 | 5/2012 | Kats et al. | |
| 8,304,522 B2 | 11/2012 | Kungitani | |
| 8,597,694 B2 | 12/2013 | Guth et al. | |
| 9,011,949 B2 | 4/2015 | Brown et al. | |
| 2001/0024677 A1 | 9/2001 | Bringe | |
| 2001/0049132 A1 | 12/2001 | Kringelum et al. | |
| 2002/0034570 A1 | 3/2002 | Krammer et al. | |
| 2003/0198700 A1 | 10/2003 | Gruber | |
| 2003/0212281 A1 | 11/2003 | Sinha et al. | |
| 2003/0224476 A1 | 12/2003 | Chou | |
| 2004/0151778 A1 | 8/2004 | Richard et al. | |
| 2004/0161513 A1 | 8/2004 | Akashe et al. | |
| 2005/0037111 A1 | 2/2005 | Berry | |
| 2006/0035003 A1 | 2/2006 | McMindes et al. | |
| 2006/0035006 A1 | 2/2006 | McMindes et al. | |
| 2006/0204644 A1 | 9/2006 | Cavallini et al. | |
| 2006/0233721 A1 | 10/2006 | Tamarkin et al. | |
| 2007/0269567 A1 | 11/2007 | McMindes et al. | |
| 2007/0269571 A1 | 11/2007 | Akita et al. | |
| 2007/0269583 A1 | 11/2007 | McMindes et al. | |
| 2008/0226810 A1 | 9/2008 | Passe et al. | |
| 2008/0254168 A1 | 10/2008 | Mueller et al. | |
| 2008/0254199 A1 | 10/2008 | Orcutt et al. | |
| 2008/0268112 A1 | 10/2008 | Rolan et al. | |
| 2008/0292749 A1 | 11/2008 | Goodwins et al. | |
| 2008/0299254 A1 | 12/2008 | Kim et al. | |
| 2009/0264520 A1 | 10/2009 | Bhagat et al. | |
| 2009/0274817 A1 | 11/2009 | Yamaguchi et al. | |
| 2010/0074998 A1 | 3/2010 | Vega et al. | |
| 2010/0136201 A1 | 6/2010 | Bigeard et al. | |
| 2010/0196575 A1 | 8/2010 | Sanchez | |
| 2010/0233347 A1 | 9/2010 | Uhrhan | |
| 2010/0249560 A1 | 9/2010 | Levinson et al. | |
| 2010/0281765 A1 | 11/2010 | Schwartz | |
| 2010/0310738 A1 | 12/2010 | Ludwig | |
| 2010/0311950 A1 | 12/2010 | Kugitani | |
| 2011/0008502 A1 | 1/2011 | Hosomi et al. | |
| 2011/0064862 A1 | 3/2011 | McCready et al. | |
| 2011/0065847 A1 | 3/2011 | Miwa et al. | |
| 2011/0081386 A1 | 4/2011 | Guth et al. | |
| 2011/0081435 A1 | 4/2011 | Guth et al. | |
| 2011/0117180 A1 | 5/2011 | Yan et al. | |
| 2011/0286992 A1 | 11/2011 | Gruber et al. | |
| 2011/0288389 A9 | 11/2011 | Levinson et al. | |
| 2012/0059150 A1 | 3/2012 | Moloney et al. | |
| 2012/0093994 A1 | 4/2012 | Hsieh et al. | |
| 2013/0004617 A1 | 1/2013 | Zhang et al. | |
| 2015/0296834 A1 | 10/2015 | Geistlinger et al. | |
| 2015/0296835 A1 | 10/2015 | Anderson et al. | |
| 2015/0366233 A1 | 12/2015 | Brown et al. | |

FOREIGN PATENT DOCUMENTS

| | | |
|---|---|---|
| CN | 1407108 A | 4/2003 |
| CN | 1466903 | 1/2004 |
| CN | 1557188 | 12/2004 |
| CN | 1593223 A | 3/2005 |
| CN | 1634524 A | 7/2005 |
| CN | 101138405 | 3/2008 |
| CN | 101156632 | 4/2008 |
| CN | 101489422 | 7/2009 |
| CN | 101541187 A | 9/2009 |
| CN | 101606574 A | 12/2009 |
| CN | 101861895 | 10/2010 |
| CN | 101897418 | 12/2010 |
| CN | 102440302 | 5/2012 |
| CN | 102578544 | 7/2012 |
| CN | 102835460 | 12/2012 |
| DE | 102007061256 | 6/2009 |
| DE | 202011002097 | 3/2011 |
| EP | 0136428 | 4/1985 |
| EP | 0500132 | 8/1992 |
| EP | 0815736 | 1/1998 |
| EP | 1166653 | 1/2002 |

(56) References Cited

FOREIGN PATENT DOCUMENTS

| | | |
|---|---|---|
| EP | 1254601 | 11/2002 |
| EP | 0680751 | 11/2004 |
| EP | 1529444 | 5/2005 |
| EP | 1759593 | 3/2007 |
| EP | 1361264 | 4/2007 |
| EP | 1952695 | 8/2008 |
| EP | 2138052 | 12/2009 |
| EP | 2943072 | 11/2015 |
| GB | 2016255 | 9/1979 |
| JP | S42-22194 | 10/1942 |
| JP | S49-39824 | 10/1974 |
| JP | S51-63971 | 10/1975 |
| JP | 52156962 | 12/1977 |
| JP | S53115846 | 10/1978 |
| JP | S54122766 | 9/1979 |
| JP | S573338 | 1/1982 |
| JP | H08140627 | 6/1996 |
| JP | 2009171877 | 8/2009 |
| JP | 2011000073 | 1/2011 |
| JP | 2012016336 | 1/2012 |
| WO | WO 1993/025697 | 12/1993 |
| WO | WO 1994/017673 | 8/1994 |
| WO | WO 1996/017981 | 6/1996 |
| WO | WO 1997/01961 | 1/1997 |
| WO | WO 1998/012913 | 4/1998 |
| WO | WO 1998/053698 | 12/1998 |
| WO | WO 2001/022829 | 4/2001 |
| WO | WO 2001/022830 | 4/2001 |
| WO | WO 2003/070172 | 8/2003 |
| WO | WO 2004/113543 | 12/2004 |
| WO | WO 2005/013713 | 2/2005 |
| WO | WO 2005/097059 | 10/2005 |
| WO | WO 2006/042608 | 4/2006 |
| WO | WO 2007/060288 | 5/2007 |
| WO | WO 2007/115899 | 10/2007 |
| WO | WO 2007/137125 | 11/2007 |
| WO | WO 2007/118751 | 12/2007 |
| WO | WO 2008/017499 | 2/2008 |
| WO | WO 2008/030089 | 3/2008 |
| WO | WO 2008/083117 | 7/2008 |
| WO | WO 2009/060678 | 5/2009 |
| WO | WO 2010/101625 | 9/2010 |
| WO | WO 2012/106751 | 8/2012 |
| WO | WO 2012/110797 | 8/2012 |
| WO | WO 2012/116703 | 9/2012 |
| WO | WO 2013/010037 | 1/2013 |
| WO | WO 2013/010042 | 1/2013 |
| WO | WO 2013/013292 | 1/2013 |
| WO | WO 2013/138793 | 9/2013 |
| WO | WO 2014/110532 | 7/2014 |
| WO | WO 2014/110540 | 7/2014 |
| WO | WO 2015/127388 | 8/2015 |

OTHER PUBLICATIONS

Tong et al. ,"Blood Composition of Different Beef Breed Types"—Can. J. Anim. Sci, 66, Dec. 1986, pp. 915-924.*
Shimbayashi et al.,"Free Amino Acids and Phsphorylethanolamine in Milk Whey of Cow"—Agr. Biol. Chem, vol. 29, No. 1, 1965, pp. 13-19.*
Koutsidis et al., "Water-soluble precursors of beef flavor: I. Effect of diet and breed"—Meat Science, 79, 2008, pp. 124-130.*
Field et al., "Heme Pgiment Content of Bovine Hemopoietic Marrow and Muscle"—J. Food Sci., vol. 45, 1980, pp. 1109-1112.*
Jamieson, "Iroquois Stew With Beef, Chicken and Pork"—Bon Appétit, Nov. 1995, http://www.epicurious.com/recipes/food/views/iroquois-stew-with-beef-chicken-and-pork-865.*
Griffiths, W., "XCIII. The Action of Gastric Juice on Beef Muscle-Globulin, With Reference to Anaemia"—Biochemistry Journal, vol. 28, 1934, pp. 671-675.*
Proulx et al., "Iron bioavailability of hemoglobin from soy root nodules suing a Caco-2 cell culture model"—J. Agric. Food Chem., Feb. 22, 2006, 54(4), pp. 1518-1522.*

"Heterlolgous," Merriam-Webster Dictionary, retrieved on Sep. 10, 2015, http://www.merriam-webster.com/dictionary/heterologous, 1 page.
"Rethink Meat," Presented at the 6th Annual Sustainable Innovation Forum, Paris, France, Dec. 7-8, 2015, retrieved on Feb. 1, 2016, https://amp.twimg.com/v/7c7f7084-b173-42cb-bc12-723f35994dff, 1 page (Video Submission).
"Silicon Valley gets a taste for food," The Economist Technology Quarterly, Mar. 7, 2015, http://cdn.static-economist.com/sites/default/files/sponsorships/accenture_tq_march2015/20150307_tq_mailoutpdf, pp. 11-13.
"Veggie burgers that look, taste, and bleed like real meat," CBS News, Aug. 9, 2016, retrieved Aug. 25, 2016 <http://www.cbsnews.com/news/food-trend-veggie-burgers-that-look-bleed-taste-like-real-meat/>, 4 pages.
"Watch Momofuku Cook Impossible Foods' Plant-Based Burger that 'Bleeds'," Vice, Jul. 27, 2016, retrieved Aug. 25, 2016, <https://munchies.vice.com/en/videos/watch-momofuku-cook-impossible-foods-plant-based-burger-that-bleeds>, 3 pages.
"Acidified Milk Products and Protein Stabilisation," Herbstreith & Fox, retrieved on Mar. 3, 2014, http://www.herbstreith-fox.de/en/informative-literature/informative-literature-from-rd-and-tech-application.html, 15 pages.
"Ice Cream and Ice Cream Desserts," Herbstreith & Fox, retrieved on Mar. 3, 2014, http://www.herbstreith-fox.de/en/informative-literature/informative-literature-from-rd-and-tech-application.html, 5 pages.
"Innovation at Its Best: 5 Years of Food Valley Awards," Food Valley, retrieved on Mar. 7, 2014, http://www.foodvalley.nl/English/Afbeeldingen/FVAjubileumuitgave/Innovation%20at%20Its%20Best%20-%205%20Years%20of%20Food%20Valley%20Awards.pdf, 51 pages.
"Low Methylester Amidated Pectins," Herbstreith & Fox, retrieved on Mar. 3, 2014, http://www.herbstreith-fox.de/en/informative-literature/informative-literature-from-rd-and-tech-application.html, 13 pages.
"Stabilisation of Whey and Whey Mix Products with Pectin," Herbstreith & Fox, retrieved on Mar. 3, 2014, http://www.herbstreith-fox.de/en/informative-literature/informative-literature-from-rd-and-tech-application.html, 6 Pages.
"Texturising of Fermented Milk Products," Herbstreith & Fox, retrieved on Mar. 3, 2014, http://www.herbstreith-fox.de/en/informative-literature/informative-literature-from-rd-and-tech-application.html, 6 pages.
Asgar et al., "Nonmeat Protein Alternatives as Meat Extenders and Meat Analogs," Comprehensive Reviews in Food Science and Food Safety, 2010, 9:513-529.
Back, "Process Flavors," Handbook of Meat, Poultry and Seafood Quality, Second Edition, 2012, Chapter 7, 91-104.
Battaglia et al., "The Enigmatic LEA Proteins and Other HydroPhilins1[W]," Plant Physiology, Sep. 2008, 148:6-24.
Belitz et al., "Aroma Compounds," Food Chemistry, Springer 2009, pp. 340-402.
Belitz et al., Food Chemistry, 3rd revised edition. Springer-Verlag, Berlin (2006), p. 368.
Beuchat et al., "Fermentation of Peanut Milk with *Lactobacillus bulgaricus* and L. *acidophilus*," J. Food Sci, 1978, 43:1109-1112.
Beyond Better Order page and Nutritional Facts, retrieved on Feb. 6, 2014, http://www.beyond-better.com/order.html, 8 pages.
Beyond Meat, posted on or before Feb. 24, 2001, accessed Jan. 7, 2014, http://beyondmeat.com/, 2 pages.
Boca Bruschetta Tomato Basil Parmesan Veggie Patties Package Ingredients, posted on or before Jul. 22, 2008, accessed on Jan. 7, 2014, http://www.bocaburger.com/products/nutrition-info.aspx?product=5928360103, 1 page.
Boca Flame Grilled Meatless Burgers Package Ingredients, posted on or before Jul. 14, 2008, accessed on Jan. 7, 2014, http://www.bocaburger.com/products/nutrition-info.aspx?product=5928367321, 1 page.
Boca Original Meatless Chik'n Nuggets Package Ingredients, posted on or beforeJul. 22, 2008, accessed Jan. 7, 2014, http://www.bocaburger.com/products/nutrition-info.aspx?product=5928360012, 1 page.

(56) References Cited

OTHER PUBLICATIONS

Boca Original Vegan Meatless Burgers Package Ingredients, posted on or before Jul. 14, 2008, accessed Jan. 7, 2014, http://www.bocaburger.com/products/nutrition-info.aspx?product=5928333445, 1 page.

Boral and Bohidar, "Effect of Ionic Strength on Surface-Selective Patch Binding-Induced Phase Separation and Coacervation in Similarly Charged Gelatin-Agar Molecular Systems," Journal of Physical Chemistry B, 2010, 114(37): 12027-35.

Bradshaw, "Food 2.0: the future of what we eat," FT Magazine, Oct. 31, 2014, retrieved on Nov. 11, 2014, http://www.ft.com/cms/s/2/bfa6fca0-5fbb-11e4-8c27-00144feabdc0.html#axzz3InGaCIdL, 6 pages.

Brewer, "The Chemistry of Beef Flavor," Dec. 2006, retrieved on Aug. 30, 2016, <http://beefresearch.org/CMDocs/BeefResearch/The%20Chemistry%20of%20Beef%20Flavor.pdf>, 16 pages.

Brooks et al., "Prediction of beef flavor by precursor and volatile compounds Principal Investigators: Funded by The Beef Checkoff," Texas Tech University, May 31, 2012, retreived Aug. 30, 2016, <http://www.beefresearch.org/CMDocs/BeefResearch/PE_Project_Summaries_FY11Prediction_of_beef_flavor.pdf>.

Bunge et al., "Quest Heats up for Alternatives to Beef," The Wall Street Journal, Business News, Nov. 4, 2016, p. B5.

Burdock, "Fenaroli's handbook of flavor ingredients," CRC press, 17 pages (2016).

Bute Island Foods, "Sheese," posted on or before Dec. 5, 2006, retrieved on Feb. 6, 2014, http://www.buteisland.com/a_sheese_home.htm, 26 pages.

Cadwallader and Macleod, "16 Instrumental methods for analyzing the flavor of muscle foods," Flavor of Meat, Meat Products and Seafoods, 18 pages (1998).

Calkins et al., "A fresh look at meat flavor," Meat Science, 77(1):63-80 (2007).

Chamlee, "Why Do People Want Veggie Burgers That Bleed?," Eater, Jul. 25, 2016, retrieved Aug. 25, 2016, <http://www.eater.com/2016/7/25/12270698/lab-grown-meat-beyond-burger-impossible-foods>, 11 pages.

Chaudhari et al., "The cell biology of taste," 190(3):285-296 (Aug. 2010).

Chen et al., "Effect of Urea on Volatile Generation from Maillard Reaction of Cysteine and Ribose," J. Agric. Food Chem., 48:3512-3516 (2000).

Chen et al., "Influence of DNA on Volatile Generation from Maillard Reaction of Cysteine and Ribose," Nutraceutical Beverages, American Chemical Society, pp. 427-442 (Dec. 2003).

Chicago Vegan Foods, accessed on Jan. 7, 2014, http://chicagoveganfoods.com/products/teese-vegan-cheese/, 8 pages.

Chinese Second Office Action in Chinese Application No. 201280041099.9, dated Oct. 8, 2015, 15 pages (with translation).

Clare et al., "Effects of Transglutaminase Catalysis on the Functional and Immunoglobulin Binding Properties of Peanut Flour Dispersions Containing Casein," J. Agric. Food Chem., 2008, 56(22):10913-10921.

Connelly and Piper, "Person of the Year: Tal Ronnen," VegNews, Nov./Dec. 2013, 29-32.

Dai, "David Chang Adds Plant Based 'Impossible Burger' to Nishi Menu," Jul. 26, 2016, retrieved Jul. 27, 2016 <http://ny.eater.com/2016/7/26/12277310/david-chang-impossible-burger-nishi>, 6 pages.

Daiya, Deliciously Dairy Free, "Say Cheese, Dairy-Free cheesy deliciousness," posted on or before Jan. 26, 2010, accessed Jan. 7, 2014, http://www.daiyafoods.com, 6 pages.

Davis et al., "Some Rheological Properties of Aqueous Peanut Flour Dispersions," J. Texture Studies, 2007, 38:253-272.

Deliciously Healthy Nacheez, Products and Nutrition Facts, posted on or before Jan. 23, 2011, retrieved on Feb. 7, 2014, http://nacheez.com/, 9 pages.

Dixie Diner's Club, Cheese (Not!) Sauce Nutrition Facts, posted on or before Sep. 3, 2009, retrieved on Feb. 7, 2014, http://www.dixiediner.com/cheese-notÂ™-sauce-regular-cheese-p-69.html, 2 pages.

D'Onfro, "I tried the plant-based meat that Google wanted to buy and I never want to eat a 'real' hamburger again" Business Insider, Jun. 12, 2016, retrieved Jun. 14, 2016, <http://www.businessinsider.com/impossible-burgers-taste-test-2016-6>, 14 pages.

Donnelly, "Meet the Impossible Burget: It Looks and Taskes Like the Real Thing But Is Totally Meat-Free," Vogue, Aug. 1, 2016, retreived Aug. 25, 2016 <http://www.vogue.com/13462891/impossible-burger-meat-free-vegan-david-chang/>, 6 pages.

Door 86 Vegan Cheese, Discover a New World of Vegan Cheese and Menu, posted on or before Dec. 5, 2013, retrieved Feb. 7, 2014, http://door86vegancheese.wix.com/door-86-vegan-cheese#, 14 pages.

Dr. Cow, Natural Living & Organic Foods, "Aged Cashew & Brazil Nut Cheese," posted on or before Sep. 22, 2008, accessed Feb. 7, 2014, http://www.dr-cow.com/products/aged-cashew-brazil.html, 1 page.

Dr. Cow, Natural Living & Organic Foods, "Aged Cashew & Crystal Algae Cheese," posted on or before Sep. 22, 2008, accessed Feb. 7, 2014, http://www.dr-cow.com/products/aged-cashew-crystal.html, 1 page.

Dr. Cow, Natural Living & Organic Foods, "Aged Cashew & Dulse Cheese," posted on or before Sep. 22, 2008, accessed Feb. 7, 2014, http://www.dr-cow.com/products/aged-cashew-dulse.html, 1 page.

Dr. Cow, Natural Living & Organic Foods, "Aged Cashew & Hemp Seeds Cheese," posted on or before Sep. 22, 2008, accessed Feb. 7, 2014, http://www.dr-cow.com/products/aged-cashew-hemp.html, 1 page.

Dr. Cow, Natural Living & Organic Foods, "Aged Cashew Nut Cheese," posted on or before Sep. 22, 2008, accessed Feb. 7, 2014, http://www.dr-cow.com/products/aged-cashew-nut-cheese.html, 1 page.

Dr. Cow, Natural Living & Organic Foods, "Aged Macadamia & Hemp Seeds Cheese," posted on or before Sep. 22, 2008, accessed Feb. 7, 2014, http://www.dr-cow.com/products/aged-macadam-hemp.html, 1 page.

Dr. Cow, Natural Living & Organic Foods, "Aged Macadamia Nut Cheese," posted on or before Sep. 22, 2008, accessed Feb. 7, 2014, http://www.dr-cow.com/products/aged-macadam-nut-cheese.html, 1 page.

Dr. Cow, Natural Living & Organic Foods, "Cashew Nut Cream Cheese," posted on or before Sep. 22, 2008, accessed Jan. 7, 2014, http://www.dr-cow.com/products/cashew-nut-cream-cheese.html, 1 page.

Duane, "Engineering the Future of Artisanal Vegan Cheese," Food & Wine, Nov. 2013, http://www.foodandwine.com/articles/engineering-the-future-of-artisanal-vegan-cheese, 5 pages.

Ellis et al., "Structure of ferric soybean leghemoglobin a nicotinate at 2.3 A resolution," Acta Crystallographica, May 1997, Section D, 53(3):302-310.

Elmore et al., "Effect of the Polyunsaturated Fatty Acid Composition of Beef Muscle on the Profile of Aroma Volatiles," J. Agric. Food Chem. 47:1619-1625 (1999).

Etienne, "Eating the plant-derived Impossible Burget cooked by Momofuku's David Chang," Tech Crunch, Jul. 26, 2016, retrieved Aug. 25, 2016, <https://techcrunch.com/2016/07/26/eating-the-plant-derived-impossible-burger-cooked-by-momofukus-david-chang/>, 9 pages.

European Search Report (Supplementary) in European Application No. 12810661.4, dated Mar. 12, 2015, 14 pages.

European Search Report (Supplementary) in European Application No. 12811683.7, dated Mar. 12, 2015, 9 pages.

European Search Report for International Application No. EP 14737766, dated Jul. 15, 2016, 11 pages.

Fantastic World Foods, "Fantastic Foods Nature's Burger (Meatless Burger Mix)," posted on or before Jan. 6, 2009, accessed on Jan. 7, 2014, http://fantasticfoods.elsstore.com/view/product/?id=8715&cid=1967, 2 pages.

(56) References Cited

OTHER PUBLICATIONS

Felt, "Raw Vegan Almond Ricotta Cheese," FeedYourSkull, Mar. 12, 2012, https://feedyourskull.com/2012/03/12/raw-vegan-almond-ricotta-cheese/, 15 pages.
Follow Your Heart Homepage, posted on or before Nov. 28, 1999, accessed Jan. 7, 2014, http://www.followyourheart.com, 3 pages.
Follow Your Heart, Products and Nutrition Facts, posted on or before Nov. 28, 1999, accessed Feb. 7, 2014, http://www.followyourheart.com/products/, 26 pages.
Foo, "Beef and Scallop Stir-Fry," Food & Wine, Jul. 2001, retrieved on Sep. 10, 2015, http://www.foodandwine.com/recipes/beef-and-scallop-stir-fry/print, 3 pages.
Food for Lovers, Vegan Queso Original & Vegan Queso Mild, posted on or before Oct. 27, 2011, retrieved Feb. 7, 2014, http://www.foodforlovers.com/products, 3 pages.
Free & Easy Dairy Free Cheese Flavour Sauce Mix, Holland & Barrett, posted on or before Jun. 22, 2013, retrieved Feb. 7, 2014, http://www.hollandandbarrett.com/pages/product_detail.asp-?pid=2686, 2 pages.
Fromson, "The Race to Build a Fake-Meat Burger That Just Might Save the World, Free the cows!" New York Magazine, Jun. 1-7, 2015, 46-48.
Galaxy Foods Vegan Soy Grated Parmesan, ShopRite, retrieved Feb. 7, 2014, http://www.shoprite.com/pd/Galaxy-Nutritional-Foods/Vegan-Grated-Soy-Topping-Parmesan-Flavor/4-oz/077172640006/, 6 pages.
Gardein the Ultimate Beefless Burger Package Ingredients, posted on or before 2013, accessed Jan. 7, 2014, http://gardein.com/products/beefless-burger/, 12 pages.
Gardenburger the Original Veggie Burger Package Ingredients, posted on or before Oct. 5, 2008, accessed Jan. 7, 2014, http://www.gardenburger.com/product.aspx?id=11630, 1 page.
GenBank Accession No. AFK42304.1, unknown [Medicago truncatula], May 25, 2012, 1 page.
Gharst, "Biochemical and Rheological Characteristics of Peanut Proteins Crosslinked with Microbial Transglutaminase," A dissertation submitted to the Graduate Faculty of North Carolina State University, Raleigh NC, 2007, 149 pages.
Gharst, "Effects of Transglutaminase Catalysis on the Functional and Immunoglobulin Binding Properties of Peanut Flour Dispersions Containing Casein," J. Agric. Food Chem., 2008, 56:10913-10921.
Gharst, "The Effect of Transglutaminase Crosslinking on the Rheological Characteristics of Heated Peanut Flour Dispersions," J. Food Sci., 2007, 72(7):C369-C375.
Gilbert et al., "The revolutionary meatless burger from Impossible Foods is perfect for begtarians and carnivores alike," Tech Insider, Aug. 4, 2016, retrieved on Aug. 25, 2016, <http://www.techinsider.io/the-impossible-foods-burger-review-vegetarian-2016-8>, 9 pages.
Go Veggie!, "0% Dairy. 100% Yum.," posted on or before 2013, accessed Jan. 7, 2014, http://goveggiefoods.com/our-products/dairy-free-cheese-alternative-products/, 1 page.
Go Veggie!, Dairy Free Products and Nutrition Facts, posted on or before 2013, accessed Feb. 7, 2014, http://goveggiefoods.com/our-products/dairy-free-cheese-alternative-products/, 13 pages.
Gordinier, "Masters of Disguise Among Meatless Burgers," The New York Times, Mar. 22, 2011, accessed Jan. 7, 2014, http://www.nytimes.com/2011/03/23/dining/23meatless.html?pagewanted=all&_r=0, 5 pages.
Grigorakis et al., "Organoleptic and volatile aroma compounds comparison of wild and cultured gilthead sea bream (*Sparus aurata*): sensory differences and possible chemical basis," Aquaculture 225:109-119 (2003).
Grobart, "Making a Steak Without a Cow," Bloomberg Technology, Jun. 21, 2016, retrieved Jun. 23, 2016 <http://www.bloomberg.com/news/articles/2016-06-21/making-a-steak-without-the-cow>, 2 pages.

Grosch, "Evaluation of the Key Odorants of Food by Dilution Experiments, Aroma Models and Omission," Chem. Senses 26:533-545 (Jun. 2001).
Hanlon, "Fake Meat: is science fiction on the verge of becoming fact?," The Guardian, Jun. 22, 2012, http://www.theguardian.com/science/2012/jun/22/fake-meat-scientific-breakthroughs-research, 7 pages.
Hannah, "A fermented feast," Bittersweet, retrieved on Nov. 3, 2016, retrieved from <https://bittersweetblog.com/2010/06/09/a-fermented-feast/>, 2 pages.
Heller, "Barbecued Soybeans," Vegetarian Soybean Recipes, Mother Earth News, Jan./Feb. 1985, http://motherearthnews.com/real-food/vegetarian-soybean-recipes-zmaz85asie.aspx.
Heme Protein Database, "Welcome to the Heme Protein Database," posted on or before Apr. 14, 2013, accessed Dec. 18, 2013, http://hemeprotein.info/heme.php, 1 page.
Heritage Health Food Creamy Veeta Cheeze Sauce Mix, Vegan Essentials, posted on or before Aug. 13, 2013, retrieved Feb. 7, 2014, http://store.veganessentials.com/creamy-veeta-cheeze-sauce-mix-by-heritage-health-food-p3945.aspx, 1 page.
Herper, "Mission Impossible Burger: Tasting the Fake Meat That Wants to Save the World," Forbes, Jul. 28, 2016, retrieved on Aug. 25, 2016, <http://www.forbes.com/sites/matthewherper/2016/07/28/mission-impossible-burger-tasting-the-fake-meat-that-wants-to-save-the-world/#57781d823c43>, 6 pages.
Helper, "Drop that Burger," Forbes Online, Nov. 12, 2009, http://www.forbes.com/forbes/2009/1130/thought-leaders-mcdonalds-global-warming-drop-that-burger.html, 4 pages.
Homma et al. "Cheese-like food production from various nuts," Food Preservation Science, Japan 2009, Abstract.
Hoshaw, "Silicon Valley's Bloody Plant Burger Smells, Tastes and Sizzles Like Meat" the salt, Jun. 21, 2016, retrieved Jun. 21, 2016 <http ://www.npr.org/sections/thesalt/2016/06/21/482322571/silicon-valley-s-bloody-plant-burger-smells-tastes-and-sizzles-like-meat>, 8 pages.
Hui et al., "Handbook of meat and meat processing," CRC Press, 2012, retrieved on Dec. 5, 2016, retrieved from <https://www.crcpress.com/Handbook-of-Meat-and-Meat-Processing-Second-Edition/Hui/p/book/9781439836835>, 3 pages.
International Preliminary Report on Patentability in International Application No. PCT/US14/11347, dated Jul. 14, 2015, 10 pages.
International Search Report and Written Opinion in International Application No. PCT/US14/11347, dated Jul. 3, 2014, 20 pages.
Jamieson, "Iroquois Stew with Beef, Chicken and Pork," Epicurious, Nov. 1995, retrieved on Sep. 10, 2015, http://www.epicurious.com/recipes/food/printerfriendly/iroquois-stew-with-beef-chicken-and-pork-865, 2 pages.
Jensen, "Comparative Analysis of Autoxidation of Haemoglobin," J. Experimental Biology, 2001, 204:2029-2033.
Ju and Kilara, "Textural Properties of Cold-set Gels Induced from Heat-denatured Whey Protein Isolates," J. Food Science, 1998, 63(2): 288-292.
Jublot et al., "Quantitation of sulphur aroma compounds in maillard model reaction systems of different composition," Expression of Multidisciplinary Flavour Science, 4 pages (2010).
Kanani, "The Future of Meat is Meatless, Just as Tasty, and About to Change the World," Forbes, Mar. 6, 2014, retrieved on Sep. 11, 2015, http://www.forbes.com/sites/rahimkanani/2014/03/06/the-future-of-meat-is-meatless-just-as-tasty-and-about-to-change-the-world/, 8 pages.
Karahadian et al., "Action of Tocopherol-Type Compounds in Directing Reactions Forming Flavor Compounds in Autoxidizing Fish Oils," J. Amer. Oil Chem. Soc., 66:1302-8 (1989).
Kerscher et al., "Quantification of 2-Methyl-3-furnathiol, 2-Furfurylthiol, 3-Mercapto-2-pentanone in Heated Meat," J. Agric. Food Chem. 46:1954-1958 (1996).
Kerth and Miller, "Beef flavor: a review from chemistry to consumer," White Paper: Product Quality, Texas A&M University Dept of Animal Sciences, 25 pages (2013).
Khan et al., "Meat flavor precursors and factors influencing flavor precursors—A systematic review," Meat Science, 110:278-284 (Dec. 2010).

(56) References Cited

OTHER PUBLICATIONS

Kraft American Singles Package Ingredients, posted on or before Jun. 27, 2012, accessed on Jan. 7, 2014, http://www.kraftrecipes.com/Products/ProductInfoDisplay.aspx?SiteId=1&Product=2100060473, 1 page.
Kummer, "The Problem with Fake Meat," MIT Technology Review, Mar. 31, 2015, retrieved Apr. 20, 2016, <https://www.technologyreview.com/s/536296/the-problem-with-fake-meat/>, 11 pages.
Kung et al., "Tobacco as a Potential Food Source and Smoke Material: Nutritional Evaluation of Tobacco Leaf Protein," J. Food Sci., 1980, 45(2):320-322, 327.
Lane et al., "The Variety of Odors Produced in Maillard Model Systems and How They are Influenced by Reaction Conditions," The Maillard Reaction in Foods and Nutrition, American Chemical Society, pp. 141-158 (Apr. 1983).
Leahy Gardens Vegan & Delicious, Macaroni & Cheese and Cheese Flavored Sauce Mix Product and Nutrition Facts, posted on or before Feb. 8, 2010, retrieved Feb. 7, 2014, http://www.leaheyfoods.com/products/MacCheese.aspx, 3 pages.
Leduc et al., "Differentiation of fresh and frozen/thawed fish, European sea bass (*Dicentrarchus labrax*), gilthead seabream (*Sparus aurata*), cod (*Gadus morhua*) and salmon (*Salmo salar*), using volatile compounds by SPME/GC/MS," J. Sci. Food Agric., 92:2560-80 (2012).
Lisanatti Foods, Vegan Cheeze Products and Nutrition Facts, posted on or before Mar. 26, 2013, retrieved Feb. 7, 2014, http://www.lisanatti.com/index.php?option=com_zoo&view=category&layout=category&Itemid=22 , 5 pages.
Liu et al., "Intermolecular Interactions During Complex Coacervation of Pea Protein Isolate and Gum Arabic," Journal of Agricultural and Food Chemistry, 2010, 58:552-556.
Lopez, "We just tried the 'Impossible Burger'—the meatless burger NYC has been waiting for," Business Insider, Jul. 27, 2016, retrieved on Aug. 25, 2016, <http://www.businessinsider.com/what-the-impossible-burger-tastes-like-2016-7>, 5 pages.
Lugay and Kim, "Freeze alignment: A novel method for protein texturization," Utilization of Protein Resources, 1981, p. 177-187.
Luteness, "The Richest Source of Protein," MOSAIC, May/Jun. 1979, 39-45.
Maltais et al., "Formation of Soy Protein Isolate Cold-Set Gels: Proteins and Salt Effects," J. Food Science, 2005, 70 (1): C67-C73.
Marshall et al., "We Tried the "Bleeding" Vegetarian Burger and It Was Actually Good," Jul. 27, 2016, retrieved Jul. 28, 2016 <https://www.buzzfeed.com/chelseamarshall/bleeding-vegetable-burger?utm_term=.jaa03Kyo7#.ogV0m7MAW>, 10 pages.
McGorrin, "Advances in Dairy Flavor Chemistry," FoodFlavors and Chemistry: Advances of the New Millennium, Spanier, A. M.; Shahidi,F.; Parliment, T. H.; Mussinan, C. J.; Ho, C.-T.; Contis, E. T., Eds., RoyalSociety of Chemistry, Cambridge, pp. 67-84 (2001).
McGorrin, "Character-impact flavor and off-flavor compounds in foods," Flavor, Fragrance, and Odor Analysis, 2nd, 207-262 (2012).
McGorrin, "The significance of volatile sulfur compounds in food flavors," Volatile sulfur compounds in food 1068, 29 pages (2011).
Moon et al., "Odour-active components of simulated beef flavour analyzed by solid phase microextraction and gas chromatography-mass spectrometry and-olfactometry," Food Research International, 39:294-308 (Apr. 2006).
Morita, "Comparison of aroma characteristics of 16 fish species by sensory evaluation and gas chromatographic analysis," J. Sci. Food Agric., 83:289-297 (2003).
Morningstar Farms Garden Veggie Patties Package Ingredients, posted on or before Jun. 26, 2013, accessed Jan. 7, 2014, https://www.morningstarfarms.com/products/burgers/garden-veggie-patties, 6 pages.
Mottram et al., "Formation of Sulfer Aroma Compounds in Reaction Mixtures Containing Cysteine and Three Different Forms of Ribose," J. Agric. Food Chem., 50:4080-4086 (2002).
Mottram, "Flavour formation in meat and meat products: a review," Food Chemistry, 62(4):415-24 (Aug. 1998).
Mottram,"An Overview of the Contribution of Sulfur-Containing Compounds to the Aroma in Heated Foods," Heteroatomic Aroma Compounds, American Chemical Society, pp. 73-92 (Aug. 2002).
Nacho Mom's Vegan Queso, Products and Nutrition Facts, posted on or before Sep. 20, 2010, retrieved on Feb. 7, 2014, http://fatgoblin.com/Home.html, 6 pages.
Nielson, Introduction to the Chemical Analysis of Foods, Jones & Bartlett Publishers, 1994.
Nutty Cow Nut Cheeses, Products and Nutrition Facts, posted on or before Jul. 23, 2012, retrieved Feb. 7, 2014, http://www.nuttycow.com/, 6 pages.
Parmela Parmesan Style Aged Nut Cheese, Product and Nutrition Facts, 2012, retrieved Feb. 7, 2014, http://www.parmelafoods.com/your-health.html, 4 pages.
Peace Cheese 100% Plant-based Cheese Alternative, Product and Nutrition Facts, posted on or before Jun. 6, 2012, retrieved Feb. 7, 2014, http://www.ilovepeacecheese.com/#/products/4571642621, 3 pages.
Proulx et al., "Iron Bioavailability of Hemoglobin from Soy Root Nodules Using a Caco-2 Cell Culture Model," J. Agricultural and Food Chemistry, Feb. 2006, 54(4):1519-1522.
Proulx, "Diversified strategies for improving iron bioavalibility of maize," Iowa State University—Retrospective Theses and Dissertations, 2007 retrieved on Sep. 19, 2016, retreived from <http://lib.dr.iastate.edu/rtd/15852/>, 144 pages.
Punk Rawk Labs: an ongoing experiment in optimal health, Nut Milk Cheese Products, posted on or before Jun. 8, 2011, retrieved Feb. 7, 2014, http://www.punkrawklabs.net/cheeses.html, 4 pages.
Ramos et al., "What is Masa?—Ingredient Intelligence," The Kitchn, retrieved on Dec. 1, 2016, http://www.thekitchn.com/whats-the-difference-between-masa-and-masa-harina-226434, 5 pages.
Reedy et al., "Development of a heme protein structure-electrochemical function database," Nucleic Acids Research, 2008, 36:307-313.
Richins et al., "Effect of Iron Source on Color and Appearance of Micronutrient-Fortified Corn Flour Toritallas," Cereal Chem., 85:561-5 (2008).
Road's End Organics, Cheese Sauce Mix Products and Nutrition Facts, posted on or before Oct. 28, 2009, retrieved Feb. 7, 2014, http://www.edwardandsons.com/reo_shop_chreese.itml, 6 pages.
Road's End Organics, Mac & Chreese Products and Nutrition Facts, posted on or before Oct. 28, 2009, retrieved Feb. 7, 2014, http://www.edwardandsons.com/reo_shop_pastas.itml, 7 pages.
Rochet and Chaintreau, "Carbonyl Odorants Contributing to the In-Oven Roast Beef Top Note," J. Agric. Food Chem., 53:9578-9585 (Nov. 2005).
Rowe, "Chemistry and technology of flavors and fragrances," Oxford:: Blackwell; 2005, 351 pages.
Rusli, "The Secret of These New Veggie Burgers: Plant Blood," The Wall Street Journal, Oct. 7, 2014, retrieved on Oct. 9, 2014, http://online.wsj.com/articles/the-secret-of-these-new-veggie-burgers-plant-blood-1412725267, 5 pages.
Schieberle et al., "Characterization of Key Odorants in Dry-Heated Cysteine-Carbohydrate Mixtures: Comparison with Aqueous Reaction Systems," Flavor Analysis, American Chemical Society, pp. 320-330 (Sep. 1998).
Schwartz, "Meet the Silicon Valley-Backed Vegan Cheese That You Might Actually Eat," Fast Company, Feb. 26, 2014, retrieved Sep. 11, 2015, http://www.fastcoexist.com/3025648/meet-the-silicon-valley-backed-vegan-cheese-that-you-might-actually-eat, 6 pages.
Segner, "Meatless burger made possible with local effort," Jul. 29, 2016, retrieved Aug. 1, 2016 <http://www.southernminn.com/owatonna_peoples_press/news/article_3d414149-1040-534d-b1af-bf4f8c486788.html>, 5 pages.
Selli et al., "Odour-active and off-odour components in rainbow trout (*Oncorhynchus mykiss*) extracts obtained by microwave assisted distillation-solvent extraction," Food Chemistry, 114:317322 (2009).
Shahidi et al., "Meat flavor volatiles: A review of the composition, techniques of analysis, and sensory evaluation," CRC Critical Reviews in Food Science and Nutrition, 24(2):141-243 (Jan. 1986).

(56) References Cited

OTHER PUBLICATIONS

Shi et al., "Identification of characteristic flavour precursors from enzymatic hydrolysis-mild thermal oxidation tallow by descriptive sensory analysis and gas chromatography-olfactometry and partial least squares regression," Journal of Chromatography B, 913-914:96-76 (Jan. 2013).

Shu et al., "Parameter Effects on the Thermal Reaction of Cystine and 2,5-Dimethyl-4-hydroxy-3(2H)-furanone," Thermal Generation of Aromas, American Chemical Society, pp. 229-241 (Oct. 1989).

Sister River Foods Parma!, Products and Nutrition Facts, Posted on or before Jun. 2, 2012, retrieved Feb. 11, 2014, http://www.veganstore.com/product/parma-vegan-parmesan/vegan-cheese-and-dairy-alternatives, 6 pages.

Soller, "The Impossible Burger is Ready for Its (Meatless) Close-Up," The Wall Street Journal, Jun. 14, 2016, retrieved Jun. 21, 2016 <http://www.wsj.com/articles/the-impossible-burger-is-ready-for-its-meatless-close-up-1465912323>, 8 pages.

Song, et al., "Contribution of oxidized tallow to aroma characteristics of beeflike process flavour assessed by gas chromatography-mass spectrometry and partial least squares regression," Journal of Chromatography A, 1254:115-124 (Sep. 2012).

Soy Kaas, Products, posted on or before Jan. 20, 2011, retrieved Feb. 11, 2014, http://www.soykaas.com/products, 1 page.

Soyco Cheese Products, Natural Pantry, retrieved Feb. 11, 2014, http://www.natural-pantry.com/search_results.asp?ct=All&site_search_qu=soyco&storeID=D92VLAQVMPDL9L5UHTS2WLU67NADEHUA, 10 pages.

Soymage Cheese Products, Good Earth Natural Foods, retrieved on Feb. 11, 2014, http://www.goodearthnaturalfoods.com/shop/brand2.asp?storeID=PJ102JRNHNGT8G0QMPEQ7LDC7GX6C2W2&alpha=S&brand=Soymage&brand_id=805, 6 pages.

Spence et al., "Multisensory Flavor Perception," Cell 161: 24-35 (2015).

Ste Martaen Cheese, Products and Nutrition Facts, posted on or before May 28, 2009, retrieved Feb. 11, 2014, http://stemartaen.bigcartel.com/, 14 pages.

Sterling, "Welcome to the Era of Plant-Based Meat," Food & Wine, Apr. 13, 2016, Retrieved Apr. 20, 2016, <http://www.foodandwine.com/blogs/welcome-era-plant-based-meat>, 3 pages.

Supplementary Partial European Search Report in European Application No. 14738061 dated Nov. 7, 2016, 11 pages.

Swanson, "Patenting the Quest for a More Perfect Veggie Burger," JDSUPRA Business Advisor, Jun. 21, 2016, retrieved Jun. 23, 2016 <http://www.jdsupra.com/legalnews/patenting-the-quest-for-a-more-perfect-72212/>. 13 pages.

Tang et al., "Flavor chemistry of 2-methyl-3-furanthiol, an intense meaty aroma compound," Journal of Sulfur Chemistry, 11 pages, (2012).

The Daiya Advantage, Products and Nutrition Facts, posted on or before Jan. 26, 2010, retrieved on Feb. 7, 2014, http://us.daiyafoods.com/our-products, 126 pages.

The Good Scents Company, "The Good Scents Company Information System," 2015, retrieved on Dec. 1, 2016, http://www.thegoodscentscompany.com/, 2 pages.

The Vegetarian Express Parma Zaan Sprinkles, posted on or about Oct. 17, 2009, retrieved Feb. 11, 2014, http://www.thevegetarianexpress.com/cart/home.php?cat=250, 2 pages.

Tofu Rella Mozzarella Cheese, Natural Pantry, retrieved Feb. 11, 2014, http://www.natural-pantry.com/shop/product_view.asp?id=24684&StoreID=D92VLAQVMPDL9L5UHTS2WLU67NADEHUA&private_product=0, 2 pages.

Tofutti Cheese Products and Nutrition, posted on or before Jun. 26, 2013, retrieved Feb. 11, 2014, http://www.tofutti.com/dairy-free-cheeses/, 18 pages.

Tofutti Milk Free, "Premium Daily Free Cheeses,", posted on or before Jun. 26, 2013, accessed Jan. 7, 2014, http://www.tofutti.com/daily-free-cheeses/, 2 pages.

Trader Joe's Sliced Soy Cheese Alternative, Fotki, posted Oct. 27, 2008, retrieved Feb. 11, 2014, http://public.fotki.com/harwons/food/tj-sliced-soy-cheese.html, 1 pages.

Trader Joe's Vegan Mozzarella, A(soy) Bean, posted Jun. 7, 2013, retrieved Feb. 11, 2014, http://a-soy-bean.blogspot.com/2013/06/showdown-trader-joes-vegan-mozzarella.html, 13 pages.

Treeline Treenut Cheese, Products and Nutrition Facts, posted on or before Dec. 10, 2013, retrieved on Feb. 11, 2014, http://www.treelinecheese.com/treeline-cheese-products.html, 3 pages.

Tressl et al., "Formation of Amino Acid Specific Maillard Products and Their Contribution to Thermally Generated Aromas," Thermal Generation of Aromas, American Chemical Society, pp. 156-171 (Oct. 1989).

Uauy et al., "Iron Fortification of Foods: Overcoming Technical and Practical Barriers," J. Nutr. 132:849S-852S (2002).

Van Ba et al., "Principles of Meat Aroma flavors and Future Prospect," INTECH Open Science, Open Minds, 2012, Chapter 7, 145-176.

Van Den Ouweland et al., "Process Meat Flavor Development and the Maillard Reaction," In Thermal Generation of Aromas, ACS Symposium Series, American Chemical Society, 1989, 433-441.

VBites, "Cheezly," posted on or before 2013, accessed Jan. 7, 2014, http://www.vbitesfoods.com/meat-free/cheezly.html, 2 pages.

Vegan Sun Artisan Aged Raw Cheese, Vegan Essentials, retrieved Feb. 11, 2014, http://store.veganessentials.com/vegan-sun-artisan-aged-raw-cheese-p4201.aspx, 3 pages.

VegCuisine Soy Cheese Products, The Vegan Store, retrieved on Feb. 11, 2014, http://www.veganstore.com/category/s?keyword=vegcuisine, 5 pages.

Veggie Brothers Mozzarella Sticks, Vegan Essentials, Nov. 9, 2013, retrieved Feb. 11, 2014, http://store.veganessentials.com/vegan-mozzarella-sticks-by-veggie-brothers-p3761.aspx, 2 pages.

Victoria Vegan Sauces, Products and Nutrition Facts, posted on or about Sep. 16, 2012, retrieved Feb. 11, 2014, http://www.victoriafinefoods.com/products/specialty-sauces/victoria-vegan, 9 pages.

Wayfare We Can't say It's Cheese Spread, Products and Nutrition Facts, posted on or about Oct. 12, 2013, retrieved Feb. 11, 2014, http://www.wayfarefoods.com/we-cant-say-its-cheese/, 5 pages.

Welcome to Bute Island Foods, "100% Vegan Cheese—100% Tasty," posted on or before Dec. 5, 2006, accessed Jan. 7, 2014, http://www.buteisland.com, 2 pages.

Welcome to VBites Foods, Cheezly Products and Nutrition Facts, 2013, retrieved on Feb. 7, 2014, http://www.vbitesfoods.com/meat-free/cheezly.html, 26 pages.

Withycombe et al., "Identification of 2-Methyl-3-Furanthiol in the Steam Distillate from Canned Tuna Fish," Journal of Food Science, 53(2):658-660 (1988).

Wortham and Miller, "Venture Capitalists Are Making Bigger Bets on Food Start-Ups," The New York Times Online, Apr. 28, 2013, http://www.nytimes.com/2013/04/29/business/venture-capitalists-are-making-bigger-bets-on-food-start-ups.html?pagewanted=all&_r=1&, 4 pages.

Yancey et al., "Effects of total iron, myoglobin, hemoglobin, and lipid oxidation of uncooked muscles on livery flavor development and volatiles of cooked beef steaks," Meat Science, 73:680-686 (2006).

Yves Veggie Cuisine the Good Slice, ShopWell, retrieved on Feb. 11, 2014, http://www.shopwell.com/yves-veggie-cuisine-the-good-slice-cheese-alternative-cheddar-style/soy-foods/p/6082260001, 1 page.

Cott et al., "The 'Impossible' Veggie Burger: A Tech Industry Answer to the Big Mac," Business Day, Jan. 13, 2017, retrieved on Jan. 17, 2017, <https://mobile.nytimes.com/2017/01/13/business/veggie-burger-impossible-burger.html?referer=http://www.drudgereport.com/>, 7 pages.

Fang et al., "Food Nutrition health theory and technology," China light industry press, p. 448, Jan. 31, 1997 (Chinese Version).

Fourth Chinese Office Action in Chinese Application No. 201280041713.1, dated Nov. 11, 2016, 18 pages (with translation).

Supplementary European Search Report for International No. EP 14737909.3, dated Oct. 7, 2016, 10 pages.

(56) References Cited

OTHER PUBLICATIONS

Zhengnong et al., "Cihai biological fascicle," Shanghai Lexicographical Publishing House, p. 243, Dec. 31, 1987 (Chinese Version).
Lombardi et al., "Total Heme and Non-heme Iron in Raw and Cooked Meats," Journal of Food Science, 67(5):1738-1741 (2002).
Aubrey, "Food for Thought: Saving the Planet, One Burger at a Time: This Juicy Patty Is Meat-Free," The Salt, Feb. 11, 2017, retrieved on Feb. 14, 2017, retrieved from <http://www.npr.org/sections/thesalt/2017/02/11/514544431/saving-the-planet-one-burger-at-a-time-this-juicy-patty-is-meat-free>, 14 pages.
Chau, "Uncanny Patty," The Ringer, Feb. 27, 2017, retrieved on Feb. 28, 2017, retrieved from <https://theringer.com/impossible-burger-last-meal-on-earth-week-food-f9f14acdb99d#.vocb2hi6e>, 19 pages.
Fang et al., "Food Nutrition health theory and technology," China light industry press, p. 448, Jan. 31, 1997 (English Translation).
Zhengnong et al., "Cihai biological fascicle," Shanghai Lexicographical Publishing House, p. 243, Dec. 31, 1987 (English Translation).
Australian Patent Examination Report No. 1 in Australian Application No. 2012281064, dated Jan. 25, 2016, 5 pages.
Australian Patent Examination Report No. 1 in Australian Application No. 2012281069, dated Sep. 25, 2015, 5 pages.
International Preliminary Report on Patentability in Internation Application No. PCT/US2014/011361, dated Jul. 14, 2015, 13 pages.
International Preliminary Report on Patentability in International Application No. PCT/US2012/046560, dated Jan. 23, 2014, 12 pages.
International Preliminary Report on Patentability in International Application No. PCT/US2012/46552, dated Jan. 23, 2014, 9 pages.
International Preliminary Report on Patentability in International Application No. PCT/US14/11362, dated Jul. 23, 2015, 10 pages.
International Search Report and Written Opinion in International Application No. PCT/US2012/046560, dated Dec. 14, 2012, 11 pages.
International Search Report and Written Opinion in International Application No. PCT/US2012/46552, dated Nov. 19, 2012, 12 pages.
International Search Report and Written Opinion in International Application No. PCT/US14/11361, dated Jun. 16, 2014, 26 pages.
International Search Report and Written Opinion in International Application No. PCT/US14/11362, dated Jun. 13, 2014, 19 pages.
International Search Report and Written Opinion in International Application No. PCT/US2015/017147, dated May 1, 2015, 15 pages.
International Search Report and Written Opinion in International Application No. PCT/US2015/023679, dated Aug. 28, 2015, 26 pages.
Invitation to Pay Fees in International Application No. PCT/US14/11361, dated Apr. 10, 2014, 4 pages.
Supplementary European Search Report in European Application No. 15774164, dated Oct. 27, 2017, 11 pages.
Naike, "Food Flavor Chemistry," 1st Edition China Light Industry Press, pp. 236-243 (1996) (English Translation).
Office Action in Chinese Application No. 201480014349.9, dated Jul. 24, 2017, 52 pages (English Translation).
Office Action in Chinese Application No. 201280041713.1, dated Jul. 13, 2017, 28 pages (English Translation).
Office Action in Chinese Application No. 201480013778.4, dated Aug. 8, 2017, 24 pages (English Translation).
Xiaoling, "Practical Technology and Quality Management of Deep Processing of Meat Products," China Textile & Apparel Press, pp. 9 and 10 (English Translation), 10 pages.

\* cited by examiner

FIG. 1

SEQ ID NO:1 *Vigna radiata*
MTTTLERGFTEEQEALVVKSWNVMKKNSGELGLKFFLKIFEIAPSAQKLFSFLRDSTVPLEQNPK
LKPHAVSVFVMTCDSAVQLRKAGKVTVRESNLKKLGATHFRTGVANEHFEVTKFALLETIKEAVP
EMWSPAMKNAWGEAYDQLVDAIKYEMKPPSS SEQ ID NO:2 *Methylacidiphilum infernorum*
MIDQKEKELIKESWKRIEPNKNEIGLLFYANLFKEEPTVSVLFQNPISSQSRKLMQVLGILVQGI
DNLEGLIPTLQDLGRRHKQYGVVDSHYPLVGDCLLKSIQEYLGQGFTEEAKAAWTKVYGIAAQVM
TAE SEQ ID NO:3 *Aquifex aeolicus*
MLSEETIRVIKSTVPLLKEHGTEITARMYELLFSKYPKTKELFAGASEEQPKKLANAIIAYATYI
DRLEELDNAISTIARSHVRRNVKPEHYPLVKECLLQAIEEVLNPGEEVLKAWEEAYDFLAKTLIT
LEKKLYSQP SEQ ID NO:4 *Glycine max*
MGAFTEKQEALVSSSFEAFKANIPQYSVVFYTSILEKAPAAKDLFSFLSNGVDPSNPKLTGHAEK
LFGLVRDSAGQLKANGTVVADAALGSIHAQKAITDPQFVVVKEALLKTIKEAVGDKWSDELSSAW
EVAYDELAAAIKKAF SEQ ID NO:5 *Hordeum vulgare*
MSAAEGAVVFSEEKEALVLKSWAIMKKDSANLGLRFFLKIFEIAPSARQMFPFLRDSDVPLETNP
KLKTHAVSVFVMTCEAAAQLRKAGKITVRETTLKRLGGTHLKYGVADGHFEVTRFALLETIKEAL
PADMWGPEMRNAWGEAYDQLVAAIKQEMKPAE SEQ ID NO:6 *Magnaporthe oryzae*
MDGAVRLDWTGLDLTGHEIHDGVPIASRVQVMVSFPLFKDQHIIMSSKESPSRKSSTIGQSTRNG
SCQADTQKGQLPPVGEKPKPVKENPMKKLKEMSQRPLPTQHGDGTYPTEKKLTGIGEDLKHIRGY
DVKTLLAMVKSKLKGEKLKDDKTMLMERVMQLVARLPTESKKRAELTDSLINELWESLDHPPLNY
LGPEHSYRTPDGSYNHPFNPQLGAAGSRYARSVIPTVTPPGALPDPGLIFDSIMGRTPNSYRKHP
NNVSSILWYWATIIIHDIFWTDPRDINTNKSSSYLDLAPLYGNSQEMQDSIRTFKDGRMKPDCYA
DKRLAGMPPGVSVLLIMFNRFHNHVAENLALINEGGRFNKPSDLLEGEAREAAWKKYDNDLFQVA
RLVTSGLYINITLVDYVRNIVNLNRVDTTWTLDPRQDAGAHVGTADGAERGTGNAVSAEFNLCYR
WHSCISEKDSKFVEAQFQNIFGKPASEVRPDEMWKGFAKMEQNTPADPGQRTFGGFKRGPDGKFD
DDDLVRCISEAVEDVAGAFGARNVPQAMKVVETMGIIQGRKWNVAGLNEFRKHFHLKPYSTFEDI
NSDPGVAEALRRLYDHPDNVELYPGLVAEEDKQPMVPGVGIAPTYTISRVVLSDAVCLVRGDRFY
TTDFTPRNLTNWGYKEVDYDLSVNHGCVFYKLFIRAFPNHFKQNSVYAHYPMVVPSENKRILEAL
GRADLFDFEAPKYIPPRVNITSYGGAEYILETQEKYKVTWHEGLGFLMGEGGLKFMLSGDDPLHA
QQRKCMAAQLYKDGWTEAVKAFYAGMMEELLVSKSYFLGNNKHRHVDIIRDVGNMVHVHFASQVF
GLPLKTAKNPTGVFTEQEMYGILAAIFTTIFFDLDPSKSFPLRTKTREVCQKLAKLVEANVKLIN
KIPWSRGMFVGKPAKDEPLSIYGKTMIKGLKAHGLSDYDIAWSHVVPTSGAMVPNQAQVFAQAVD
YYLSPAGMHYIPEIHMVALQPSTPETDALLLGYAMEGIRLAGTFGSYREAAVDDVVKEDNGRQVP
VKAGDRVFVSFVDAARDPKHFPDPEVVNPRRPAKKYIHYGVGPHACLGRDASQIAITEMFRCLFR
RRNVRRVPGPQGELKKVPRPGGFYVYMREDWGGLFPFPVTMRVMWDDE SEQ ID NO:7 *Fusarium oxysporum*
MKGSATLAFALVQFSAASQLVWPSKWDEVEDLLYMQGGFNKRGFADALRTCEFGSNVPGTQNTAE
WLRTAFHDAITHDAKAGTGGLDASIYWESSRPENPGKAFNNTFGFFSGFHNPRATASDLTALGTV
LAVGACNGPRIPFRAGRIDAYKAGPAGVPEPSTNLKDTFAAFTKAGFTKEEMTAMVACGHAIGGV

FIG. 1-CONT.

HSVDFPEIVGIKADPNNDTNVPFQKDVSSFHNGIVTEYLAGTSKNPLVASKNATFHSDKRIFDND
KATMKKLSTKAGFNSMCADILTRMIDTVPKSVQLTPVLEAYDVRPYITELSLNNKNKIHFTGSVR
VRITNNIRDNNDLAINLIYVGRDGKKVTVPTQQVTFQGGTSFGAGEVFANFEFDTTMDAKNGITK
FFIQEVKPSTKATVTHDNQKTGGYKVDDTVLYQLQQSCAVLEKLPNAPLVVTAMVRDARAKDALT
LRVAHKKPVKGSIVPRFQTAITNFKATGKKSSGYTGFQAKTMFEEQSTYFDIVLGGSPASGVQFL
TSQAMPSQCS

SEQ ID NO:8  Fusarium graminearum
MASATRQFARAATRATRNGFAIAPRQVIRQQGRRYYSSEPAQKSSSAWIWLTGAAVAGGAGYYFY
GNSASSATAKVFNPSKEDYQKVYNEIAARLEEKDDYDDGSYGPVLVRLAWHASGTYDKETGTGGS
NGATMRFAPESDHGANAGLAAARDFLQPVKEKFPWITYSDLWILAGVCAIQEMLGPAIPYRPGRS
DRDVSGCTPDGRLPDASKRQDHLRGIFGRMGFNDQEIVALSGAHALGRCHTDRSGYSGPWTFSPT
VLTNDYFRLLVEEKWQWKKWNGPAQYEDKSTKSLMMLPSDIALIEDKKFKPWVEKYAKDNDAFFK
DFSNVVLRLFELGVPFAQGTENQRWTFKPTHQE SEQ ID NO: 9  Chlamydomonas eugametos
MSLFAKLGGREAVEAAVDKFYNKIVADPTVSTYFSNTDMKVQRSKQFAFLAYALGGASEWKGKDM
RTAHKDLVPHLSDVHFQAVARHLSDTLTELGVPPEDITDAMAVVASTRTEVLNMPQQ SEQ ID NO:10  Tetrahymena pyriformis
MNKPQTIYEKLGGENAMKAAVPLFYKKVLADERVKHFFKNTDMDHQTKQQTDFLTMLLGGPNHYK
GKNMTEAHKGMNLQNLHFDAIIENLAATLKELGVTDAVINEAAKVIEHTRKDMLGK SEQ ID NO:11  Paramecium caudatum
MSLFEQLGGQAAVQAVTAQFYANIQADATVATFFNGIDMPNQTNKTAAFLCAALGGPNAWTGRNL
KEVHANMGVSNAQFTTVIGHLRSALTGAGVAAALVEQTVAVAETVRGDVVTV SEQ ID NO:12  Aspergillus niger
MPLTPEQIKIIKATVPVLQEYGTKITTAFYMNMSTVHPELNAVFNTANQVKGHQARALAGALFAY
ASHIDDLGALGPAVELICNKHASLYIQADEYKIVGKYLLEAMKEVLGDACTDDILDAWGAAYWAL
ADIMINREAALYKQSQG SEQ ID NO:13  Zea mays
MALAEADDGAVVFGEEQEALVLKSWAVMKKDAANLGLRFFLKVFEIAPSAEQMFSFLRDSDVPLE
KNPKLKTHAMSVFVMTCEAAAQLRKAGKVTVRETTLKRLGATHLRYGVADGHFEVTGFALLETIK
EALPADMWSLEMKKAWAEAYSQLVAAIKREMKPDA SEQ ID NO:14  Oryza sativa subsp. japonica
*MALVEGNNGVSGGAVSFSEEQEALVLKSWAIMKKDSANIGLRFFLKIFEVAPSASQMFSFLRNSD*
*VPLEKNPKLKTHAMSVFVMTCEAAAQLRKAGKVTVRDTTLKRLGATHFKYGVGDAHFEVTRFALL*
*ETIKEAVPVDMWSPAMKSAWSEAYNQLVAAIKQEMKPAE*

SEQ ID NO:15  Arabidopsis thaliana
MESEGKIVFTEEQEALVVKSWSVMKKNSAELGLKLFIKIFEIAPTTKKMFSFLRDSPIPAEQNPK
LKPHAMSVFVMCCESAVQLRKTGKVTVRETTLKRLGASHSKYGVVDEHFEVAKYALLETIKEAVP
EMWSPEMKVAWGQAYDHLVAAIKAEMNLSN

FIG. 1-CONT.

SEQ ID NO:16  *Pisum sativum*
MGFTDKQEALVNSSWESFKQNLSGNSILFYTIILEKAPAAKGLFSFLKDTAGVEDSPKLQAHAEQ
VFGLVRDSAAQLRTKGEVVLGNATLGAIHVQRGVTDPHFVVVKEALLQTIKKASGNNWSEELNTA
WEVAYDGLATAIKKAMT SEQ ID NO:17  *Vigna unguiculata*
MVAFSDKQEALVNGAYEAFKANIPKYSVVFYTTILEKAPAAKNLFSFLANGVDATNPKLTGHAEK
LFGLVRDSAAQLRASGGVVADAALGAVHSQKAVNDAQFVVVKEALVKTLKEAVGDKWSDELGTAV
ELAYDELAAAIKKAY SEQ ID NO:18  *Bos taurus*
MGLSDGEWQLVLNAWGKVEADVAGHGQEVLIRLFTGHPETLEKFDKFKHLKTEAEMKASEDLKKH
GNTVLTALGGILKKKGHHEAEVKHLAESHANKHKIPVKYLEFISDAIIHVLHAKHPSDFGADAQA
AMSKALELFRNDMAAQYKVLGFHG SEQ ID NO:19  *Sus scrofa*
MGLSDGEWQLVLNVWGKVEADVAGHGQEVLIRLFKGHPETLEKFDKFKHLKSEDEMKASEDLKKH
GNTVLTALGGILKKKGHHEAELTPLAQSHATKHKIPVKYLEFISEAIIQVLQSKH
PGDFGADAQGAMSKALELFRNDMAAKYKELGFQG SEQ ID NO:20  *Equus caballus*
MGLSDGEWQQVLNVWGKVEADIAGHGQEVLIRLFTGHPETLEKFDKFKHLKTEAEMKASEDLKKH
GTVVLTALGGILKKKGHHEAELKPLAQSHATKHKIPIKYLEFISDAIIHVLHSKH
PGDFGADAQGAMTKALELFRNDIAAKYKELGFQG SEQ ID NO:21  *Nicotiana benthamiana*
MSSFTEEQEALVVKSWDSMKKNAGEWGLKLFLKIFEIAPSAKKLFSFLKDSNVPLEQNAKLKPHS
KSVFVMTCEAAVQLRKAGKVVVRDSTLKKLGATHFKYGVADEHFEVTKFALLETIKEAVPEMWSV
DMKNAWGEAFDQLVNAIKTEMK SEQ ID NO:22  *Bacillus subtilis*
MGQSFNAPYEAIGEELLSQLVDTFYERVASHPLLKPIFPSDLTETARKQKQFLTQYLGGPPLYTE
EHGHPMLRARHLPFPITNERADAWLSCMKDAMDHVGLEGEIREFLFGRLELTARHMVNQTEAEDR
SS SEQ ID NO:23  *Corynebacterium glutamicum*
MTTSENFYDSVGGEETFSLIVHRFYEQVPNDDILGPMYPPDDFEGAEQRLKMFLSQYWGGPKDYQ
EQRGHPRLRMRHVNYPIGVTAAERWLQLMSNALDGVDLTAEQREAIWEHMVRAADMLINSNPDPH
A SEQ ID NO:24  *Synechocystis* PCC6803
MSTLYEKLGGTTAVDLAVDKFYERVLQDDRIKHFFADVDMAKQRAHQKAFLTYAFGGTDKYDGRY
MREAHKELVENHGLNGEHFDAVAEDLLATLKEMGVPEDLIAEVAAVAGAPAHKRDVLNQ SEQ ID NO:25  *Synechococcus* sp. PCC 7335
MDVALLEKSFEQISPRAIEFSASFYQNLFHHHPELKPLFAETSQTIQEKKLIFSLAAIIENLRNP
DILQPALKSLGARHAEVGTIKSHYPLVGQALIETFAEYLAADWTEQLATAWVEAYDVIASTMIEG
ADNPAAYLEPELTFYEWLDLYGEESPKVRNAIATLTHFHYGEDPQDVQRDSRG

FIG. 1-CONT.

SEQ ID NO:26  *Nostoc commune*
MSTLYDNIGGQPAIEQVVDELHKRIATDSLLAPVFAGTDMVKQRNHLVAFLAQIFEGPKQYGGRP
MDKTHAGLNLQQPHFDAIAKHLGERMAVRGVSAENTKAALDRVTNMKGAILNK SEQ ID NO:27  *Bacillus megaterium*
MREKIHSPYELLGGEHTISKLVDAFYTRVGQHPELAPIFPDNLTETARKQKQFLTQYLGGPSLYT
EEHGHPMLRARHLPFEITPSRAKAWLTCMHEAMDEINLEGPERDELYHRLILTAQHMINSPEQTD
EKGFSH

METHODS AND COMPOSITIONS FOR AFFECTING THE FLAVOR AND AROMA PROFILE OF CONSUMABLES

CROSS-REFERENCE TO RELATED APPLICATIONS

This application is a continuation of U.S. application Ser. No. 14/797,006 filed on Jul. 10, 2105 which is a continuation of and claims priority to PCT/US2014/011347 which claims priority to U.S. application Ser. No. 13/941,211, filed Jul. 12, 2013, U.S. Application Ser. No. 61/908,634, filed Nov. 25, 2013, and to U.S. Application Ser. No. 61/751,816, filed Jan. 11, 2013, and is related to the following patent applications: Application Serial No. PCT/US12/46560; Application Serial No PCT/US12/46552; Application Ser. No. 61/876,676, filed Sep. 11, 2013; and Application Ser. No. 61/751,818, filed Jan. 11, 2013, all of which are incorporated herein by reference.

TECHNICAL FIELD

This invention relates to food products and more particularly, to food products that include a highly conjugated heterocyclic ring complexed to iron such as a heme-cofactor and one or more flavor precursor molecules.

BACKGROUND

Food is any substance that is either eaten or drunk by any animal, including humans, for nutrition or pleasure. It is usually of plant or animal origin, and can contain essential nutrients, such as carbohydrates, fats, proteins, vitamins, or minerals. The substance is ingested by an organism and assimilated by the organism's cells in an effort to produce energy, maintain life, or stimulate growth.

Food typically has its origin in a photosynthetic organism, such as a plant. Some food is obtained directly from plants, but even animals that are used as food sources are raised by feeding them food which is typically derived from plants.

In most cases, the plant or animal food source is fractionated into a variety of different portions, depending upon the purpose of the food. Often, certain portions of the plant, such as the seeds or fruits, are more highly prized by humans than others and these are selected for human consumption, while other less desirable portions, such as the stalks of grasses, are typically used for feeding animals.

Current plant-based meat substitutes have largely failed to cause a shift to a vegetarian diet. Meat substitute compositions are typically extruded soy/grain mixtures which largely fail to replicate the experience of cooking and eating meat. Common limitations of plant-based meat substitute products are a texture and mouth-feel that are more homogenous than that of equivalent meat products. Furthermore, as these products must largely be sold pre-cooked, with artificial flavors and aromas pre-incorporated, they fail to replicate the aromas, flavors, and other key features, such as texture and mouth-feel, associated with cooking or cooked meat. As a result, these products appeal largely to a limited consumer base that is already committed to vegetarianism/veganism, but have failed to appeal to the larger consumer segment accustomed to eating meat. It would be useful to have improved plant-based meat substitutes which better replicate the aromas and flavors of meat, particularly during and/or after cooking.

SUMMARY

Provided herein are methods and compositions for modulating the flavor and/or aroma profile of consumable food products, including animal- or non-animal (e.g., plant) based food products, or mixtures of animal- and non-animal-based food products. In some embodiments, the methods and compositions are useful for modulating the flavor and/or aroma profile of a consumable food product during and/or after the cooking process. In some embodiments, the methods and compositions are used to generate one or more chemical compounds that modulate the flavor and/or aroma profile of the consumable food product during and/or after the cooking process.

As provided herein, and without being bound by theory, certain characteristic meaty flavors and/or aromas (e.g., beefy, bacony, umami, savory, bloody, brothy, gravy, metallic, bouillon-like; see Tables 2, 7, and 11), including one or more specific chemical compounds associated with the same (see Tables 3, 8, 9, 12, 14, 16, or 17), are believed to be produced during the cooking process of a consumable food product by chemical reaction of one or more flavor precursor molecules or compositions catalyzed by the presence of a highly conjugated heterocyclic ring complexed to an iron ion (e.g., a heme moiety; or a porphyrin; a porphyrinogen; a corrin; a corrinoid; a chlorin; a bacteriochorophyll; a corphin; a chlorophyllin; a bacteriochlorin; or an isobacteriochlorin moiety complexed to an iron ion). Such highly conjugated heterocycylic moieties include heterocyclic aromatic rings composed of one or more (2, 3, or 4 more) pyrrole, pyrrole-like, and/or pyrroline subunits. The highly conjugated heterocyclic ring complexed to an iron ion is referred to herein as an iron complex. In some embodiments, the heme moiety can be a heme cofactor such as a heme moiety bound to a protein; a heme moiety bound to a non-proteinaceous polymer; a heme moiety bound to a solid support; or a heme moiety encapsulated in a liposome. In some embodiments, the flavors and/or aromas are not generated in the absence of the iron complex (e.g., in the absence of a ferrous chlorin) or are not generated in the absence of a heme-cofactor (e.g., in the absence of a heme-containing protein). Accordingly, as described herein, the iron complexes such as isolated chlorin-iron complexes or heme-cofactors (e.g., heme-containing proteins) can be used to generate meaty flavors and/or aromas in a variety of food products, such as during the cooking process.

Combining one or more iron complexes such as a heme-cofactor (e.g., a heme-containing protein, including, for example a plant-derived heme protein such as a plant leghemoglobin (legH)), with one or more flavor precursor molecules or compositions (see, e.g., Table 1 or Table 13) can generate or provide a range of savory and meaty aromas and tastes (see, e.g., Tables 2, 7, and/or 11) in a cooked consumable food product. Flavor precursor molecules or compositions can be added to the uncooked food product in purified form and/or can be derived from ingredients in the uncooked consumable food product that contain and/or are enriched with one or more of the particular flavor precursors or compositions, including, for example, yeast extract, vegetable oil, corn oil, soybean oil, palm fruit oil, palm kernel oil, safflower oil, flaxseed oil, rice bran oil, cottonseed oil, olive oil, canola oil, sunflower oil, coconut oil, mango oil, or an algal oil. The resultant flavor and/or aroma profile can be modulated by the type and concentration of the flavor precursors, the pH of the reaction, the length of cooking, the type and amount of iron complex (e.g., a heme cofactor such as a heme-containing protein), the temperature of the reaction, and the amount of water activity in the product, among other factors.

One or more flavor precursor molecules or compositions can be added along with a iron complex (e.g., ferrous chlorophyllin or a heme cofactor such as a heme-containing protein), to an uncooked food product, before and/or during the cooking process, to give the cooked consumable food product a particular meaty taste and smell, for example, the taste and smell of beef, bacon, pork, lamb, or chicken. Consumable food products can be animal or non-animal based (e.g., plant) food products, or combinations of an animal and non-animal based food product. For example, a plant based veggie burger or an animal-based burger, such as a chicken burger, can be modified with the compositions and methods of the present disclosure to result in a burger having a cooked flavor and/or aroma profile that is more meat like, e.g., beef-like, lamb-like, pork-like, turkey-like, duck-like, deer-like, yak-like, bison-like or other desirable meat flavor.

Food products for use in the present disclosure include those that have an iron-complex (e.g., a heme cofactor such as a heme-containing protein), and one or more flavor precursor molecules included therein. The iron-complex such as a heme cofactor (e.g., a heme-containing protein) and the one or more flavor precursor molecules can be homogenously or heterogeneously included in the food products. A heme protein can be isolated and purified prior to inclusion in the food product. Non-limiting examples of consumable food products which can include an iron complex such as a heme-cofactor (e.g., a heme-containing protein) and one or more flavor precursor molecules include animal-based or non-animal (e.g., plant-based), or combinations of animal-based and non-animal-based, food products in the form of hot dogs, burgers, ground meat, sausages, steaks, filets, roasts, breasts, thighs, wings, meatballs, meatloaf, bacon, strips, fingers, nuggets, cutlets, or cubes.

Consumable food products for use in the present disclosure can be flavor additive compositions, e.g., for addition to another consumable food product before, during, or after its cooking process. A flavor additive composition can include an iron complex such as a heme-cofactor (e.g., a heme-containing protein), and one or more flavor precursors.

A flavor additive composition can include a heme protein, e.g., an isolated and purified heme protein; such a flavor additive composition can be used to modulate the flavor and/or aroma profile of a consumable food product that comprises one or more flavor precursor molecules or compositions. A flavor additive composition can include one or more flavor precursor molecules or compositions; such a flavor additive composition can be used to modulate the flavor and/or aroma profile of a consumable food product that comprises the heme protein, e.g., an isolated and purified heme protein.

A flavor additive composition can be in the form, of but not limited to, soup or stew bases, bouillon, e.g., powder or cubes, flavor packets, or seasoning packets or shakers. Such flavor additive compositions can be used to modulate the flavor and/or aroma profile for a variety of consumable food products, and can be added to a consumable food product before, during, or after cooking of the consumable food product.

In some embodiments, a flavor additive composition such as one including an iron complex (e.g., ferrous chlorin or a heme protein) and one or more flavor precursors can be reacted (e.g., in vitro) with heating to generate a particular flavor and/or aroma profile of interest and the resultant product mixture can be added to the consumable food product of interest, which can then be eaten as-is or can be additionally modified, e.g., by additional cooking. In some embodiments, the iron complex can be removed from the resultant product mixture before adding the product mixture to the consumable food product of interest. For example, the iron complex can be removed from the product mixture using chromatographic techniques such as column chromatography, e.g., a column containing heme or iron-chlorin.

In some embodiments, the iron complex such as a heme-cofactor, e.g., a heme-protein, and the one or more flavor precursor flavor additive compositions can be soy-free, wheat-free, yeast-free, MSG-free, and free of protein hydrolysis products, and can taste meaty, highly savory, and without off odors or flavors.

In one aspect, this document features a food product that includes an iron complex such as a heme moiety, or a porphyrin, a porphyrinogen, a corrin, a corrinoid, a chlorin, a bacteriochorophyll, a corphin, a chlorophyllin, a bacteriochlorin, or an isobacteriochlorin moiety complexed to an iron ion and one or more flavor precursor molecules selected from the group consisting of glucose, fructose, ribose, arabinose, glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, inosine monophosphate (IMP), guanosine monophosphate (GMP), pyrazine, adenosine monophosphate (AMP), lactic acid, succinic acid, glycolic acid, thiamine, creatine, pyrophosphate, vegetable oil, algal oil, corn oil, soybean oil, palm fruit oil, palm kernel oil, safflower oil, flaxseed oil, rice bran oil, cottonseed oil, sunflower oil, canola oil, olive oil, a free fatty acid, cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, glutathione, an amino acid derivative, a protein hydrolysate, a malt extract, a yeast extract, and a peptone. The heme moiety can be a heme-containing protein, a heme moiety bound to a non-peptidic polymer; or a heme moiety bound to a solid support. The heme-containing protein can be a plant, mammalian, a yeast or filamentous fungi, or bacterial heme-containing protein. The food product can include two to one hundred, two to fifty flavor precursors, two to forty flavor precursors, two to thirty-five flavor precursors, two to ten flavor precursors, or two to six flavor precursors. In some embodiments, the one or more flavor precursor molecules are selected from the group consisting of glucose, ribose, cysteine, a cysteine derivative, thiamine, alanine, methionine, lysine, a lysine derivative, glutamic acid, a glutamic acid derivative, IMP, GMP, lactic acid, maltodextrin, creatine, alanine, arginine, asparagine, aspartate, glutamic acid, glutamine, glycine, histidine, isoleucine, leucine, methionine, phenylalanine, proline, threonine, tryptophan, tyrosine, valine, linoleic acid, and mixtures thereof. The heme-containing protein can be a non-symbiotic hemoglobin or a leghemoglobin (e.g., a plant leghemoglobin such as one from soybean, alfalfa, lupin, pea, cow pea, or lupin). The heme-containing protein can include an amino acid sequence having at least 80% sequence identity to a polypeptide set forth in SEQ ID NOs:1-26. The heme-containing protein can be isolated and purified. The food product further can include a food-grade oil, a seasoning agent, a flavoring agent, a protein, a protein concentrate, an emulsifier, a gelling agent, or a fiber. The food product can be a meat substitute, a soup base, stew base, snack food, bouillon powder, bouillon cube, a flavor packet, or a frozen food product. Any of the food products can be free of animal products. The food product can be sealed within a packet or shaker.

This document also features a method for producing a flavor compound. The method can include combining an iron complex (e.g., a heme moiety, a porphyrin, a porphyrinogen, a corrin, a corrinoid, a chlorin, a bacteriochorophyll, a corphin, a chlorophyllin, a bacteriochlorin, or an isobacteriochlorin complexed to an iron) and one or more flavor precursor molecules to form a mixture, the one or more flavor precursor molecules selected from the group consisting of glucose, fructose, arabinose, ribose glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, inosine monophosphate (IMP), guanosine monophosphate (GMP), pyrazine, adenosine monophosphate (AMP), lactic acid, succinic acid, glycolic acid, thiamine, creatine, pyrophosphate, vegetable oil, algal oil, corn oil, soybean oil, palm fruit oil, palm kernel oil, safflower oil, flaxseed oil, rice bran oil, cottonseed oil, canola oil, olive oil, sunflower oil, flaxseed oil, coconut oil, mango oil, a free fatty acid, cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, glutathione, an amino acid derivative, a protein hydrolysate, a malt extract, a yeast extract, and a peptone; and heating the mixture to form one or more flavor compounds selected from the group consisting of phenylacetaldehyde, 1-octen-3-one, 2-n-heptylfuran, 2-thiophenecarboxaldehyde, 3-thiophenecarboxaldehyde, butyrolactone, 2-undecenal, pyrazine, methyl-, furfural, 2-decanone, pyrrole, 1-octen-3-ol, 2-acetylthiazole, (E)-2-octenal, decanal, benzaldehyde, (E)-2-nonenal, pyrazine, 1-hexanol, 1-heptanol, dimethyl trisulfide, 2-nonanone, 2-pentanone, 2-heptanone, 2,3-butanedione, heptanal, nonanal, 2-octanone, 1-octanol, 3-ethylcyclopentanone, 3-octen-2-one, (E,E)-2,4-heptadienal, (Z)-2-heptenal, 2-heptanone, 6-methyl-, (Z)-4-heptenal, (E,Z)-2,6-nonadienal, 3-methyl-2-butenal, 2-pentyl-furan, thiazole, (E, E)-2,4-decadienal, hexanoic acid, 1-ethyl-5-methylcyclopentene, (E,E)-2,4-nonadienal, (Z)-2-decenal, dihydro-5-pentyl-2(3H)-furanone, trans-3-nonen-2-one, (E,E)-3,5-octadien-2-one, (Z)-2-octen-1-ol, 5-ethyldihydro-2(3H)-furanone, 2-butenal, 1-penten-3-ol, (E)-2-hexenal, formic acid, heptyl ester, 2-pentyl-thiophene, (Z)-2-nonenal, 2-hexyl-thiophene, (E)-2-decenal, 2-ethyl-5-methyl-pyrazine, 3-ethyl-2,5-dimethyl-pyrazine, 2-ethyl-1-hexanol, thiophene, 2-methyl-furan, pyridine, butanal, 2-ethyl-furan, 3-methyl-butanal, trichloromethane, 2-methyl-butanal, methacrolein, 2-methyl-propanal, propanal, acetaldehyde, 2-propyl-furan, dihydro-5-propyl-2(3H)-furanone, 1,3-hexadiene, 4-decyne, pentanal, 1-propanol, heptanoic acid, trimethyl-ethanethiol, 1-butanol, 1-penten-3-one, dimethyl sulfide, 2-ethyl furan, 2-pentyl-thiophene, 2-propenal, 2-tridecen-1-ol, 4-octene, 2-methyl thiazole, methyl-pyrazine, 2-butanone, 2-pentyl-furan, 2-methyl-propanal, butyrolactone, 3-methyl-butanal, methyl-thiirane, 2-hexyl-furan, butanal, 2-methyl-butanal, 2-methyl-furan, furan, octanal, 2-heptenal, 1-octene, formic acid heptyl ester, 3-pentyl-furan, and 4-penten-2-one. The heme moiety can be a heme-containing protein, a heme moiety bound to a non-peptidic polymer; or a heme moiety bound to a solid support. The method can include combining cysteine, ribose, lactic acid, lysine, and/or thiamine with the heme-containing protein.

In another aspect, this document features a method for producing a flavor compound. The method includes combining an iron complex, such as a heme-containing protein, and one or more flavor precursor molecules to form a mixture, the one or more flavor precursor molecules selected from the group consisting of glucose, fructose, ribose, arabinose, glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, IMP, GMP, pyrazine, AMP, lactic acid, succinic acid, glycolic acid, thiamine, creatine, pyrophosphate, vegetable oil, algal oil, corn oil, soybean oil, palm fruit oil, palm kernel oil, safflower oil, flaxseed oil, rice bran oil, cottonseed oil, olive oil, sunflower oil, canola oil, flaxseed oil, coconut oil, mango oil, a free fatty acid, methionine, cysteine, isoleucine, leucine, lysine, phenylalanine, threonine, tryptophan, valine, arginine, histidine, alanine, asparagine, aspartate, glutamate, glutamine, glycine, proline, serine, tyrosine, glutathione, an amino acid derivative, a protein hydrolysate, a malt extract, a yeast extract, and a peptone; and heating the mixture to form one or more flavor compounds set forth in Tables 3, 8, or 9. For example, the flavor precursors can include cysteine, a sugar, and one or more other precursors.

This document also features a method for imparting a meat like flavor (e.g., beef-like, chicken like, pork-like, lamb-like, turkey-like, duck-like, deer-like, or bison-like) to a food product. The method includes contacting the food product with a flavoring composition, the flavoring composition comprising i) an iron complex, such as a heme moiety (e.g., a heme-containing protein); and ii) one or more flavor precursor molecules selected from the group consisting of glucose, fructose, ribose, arabinose, glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, IMP, GMP, pyrazine, AMP, lactic acid, succinic acid, glycolic acid, thiamine, creatine, pyrophosphate, vegetable oil, algal oil, corn oil, soybean oil, palm fruit oil, palm kernel oil, safflower oil, flaxseed oil, rice bran oil, cottonseed oil, olive oil, sunflower oil, canola oil, flaxseed oil, coconut oil, mango oil, a free fatty acid, cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, glutathi one, an amino acid derivative, a protein hydrolysate, a malt extract, a yeast extract, and a peptone; wherein after heating the food product and the flavoring composition together, a meat like flavor (e.g., beef-like, chicken like, pork-like, lamb-like, turkey-like, duck-like, deer-like, or bison-like) is imparted to the food product. In some embodiments, the iron complex is removed from the food product. The flavoring composition further can include a seasoning agent, a flavoring agent, a protein, a protein concentrate, or an emulsifier. The flavoring composition can be sealed within a packet or shaker.

In another aspect, this document features a method of making a food product. The method includes combining an isolated heme-containing protein and one or more flavor precursor molecules to form a mixture, the one or more flavor precursor molecules selected from the group consisting of glucose, fructose, ribose, arabinose, glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, IMP, GMP, pyrazine, AMP, lactic acid, succinic acid, glycolic acid, thiamine, creatine, pyrophosphate, sunflower oil, coconut oil, canola oil, flaxseed oil, mango oil, a free fatty acid, cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, glutathione, an amino acid derivative, a protein hydrolysate, a malt extract, a yeast extract, and a peptone; and heating the mixture.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims. The word "comprising" in the claims may be replaced by "consisting essentially of" or with "consisting of," according to standard practice in patent law.

DESCRIPTION OF THE DRAWINGS

FIG. 1 contains amino acid sequences of exemplary heme-containing proteins.

DETAILED DESCRIPTION

Figure 2:
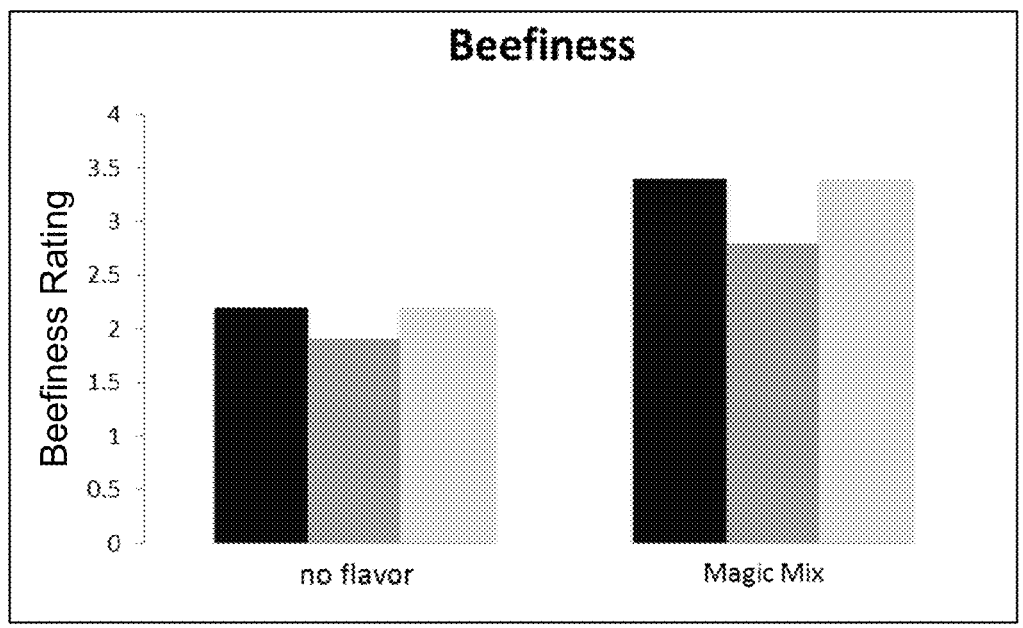
FIG. 2 is a bar graph of the beefiness rating of the meat replica with or without the Magic Mix, both samples in triplicate with 1% w/v LegH protein. Tasters rated beefiness on a scale from 1-7, with 1 being not beefy at all and 7 being exactly like ground beef.

This document is based on methods and materials for modulating the taste and/or aroma profile of food products. As described herein, compositions containing one or more flavor precursors and one or more highly conjugated heterocyclic rings complexed to an iron (referred to herein as an iron complex) can be used to modulate the taste and/or aroma profile of food products. Such iron complexes include heme moieties or other highly conjugated heterocyclic rings complexed to an iron ion (referred to as an iron complex). "Heme" refers to a prosthetic group bound to iron ($Fe^{2+}$ or $Fe^{3+}$) in the center of a porphyrin ring. Thus, an iron complex can be a heme moiety, or a porphyrin, porphyrinogen, corrin, corrinoid, chlorin, bacteriochorophyll, corphin, chlorophyllin, bacteriochlorin, or isobacteriochlorin moiety complexed to iron ion. The heme moiety that can be used to modulate the taste and/or aroma profile of food products can be a heme cofactor such as a heme-containing protein; a heme moiety bound to a non-peptidic polymer or other macromolecule such as a liposome, a polyethylene glycol, a carbohydrate, a polysaccharide, a cyclodextrin, a polyethylenimine, a polyacrylate, or derivatives thereof; a siderophore (i.e., an iron chelating compound); or a heme moiety bound to a solid support (e.g., beads) composed of a chromatography resin, cellulose, graphite, charcoal, or diatomaceous earth.

In some embodiments, the iron complexes catalyze some reactions and produce flavor precursors without heating or cooking. In some embodiments, the iron complex destabilizes upon heating or cooking and releases the iron, e.g., the protein is denatured, so flavor precursors can be generated.

Suitable flavor precursors include sugars, sugar alcohols, sugar derivatives, oils (e.g., vegetable oils), free fatty acids, alpha-hydroxy acids, dicarboxylic acids, amino acids and derivatives thereof, nucleosides, nucleotides, vitamins, peptides, protein hydrolysates, extracts, phospholipids, lecithin, and organic molecules. Non-limiting examples of such flavor precursors are provided in Table 1.

TABLE 1

| Flavor Precursor Molecules |
|---|
| Sugars, sugar alcohols, sugar acids, and sugar derivatives: glucose, fructose, ribose, sucrose, arabinose, glucose-6-phosphate, fructose-6-phosphate, fructose 1,6-diphosphate, inositol, maltose, molasses, maltodextrin, glycogen, galactose, lactose, ribitol, gluconic acid and glucuronic acid, amylose, amylopectin, or xylose |
| Oils: coconut oil, mango oil, sunflower oil, cottonseed oil, safflower oil, rice bran oil, cocoa butter, palm fruit oil, palm oil, soybean oil, canola oil, corn oil, sesame oil, walnut oil, flaxseed, jojoba oil, castor, grapeseed oil, peanut oil, olive oil, algal oil, oil from bacteria or fungi |
| Free fatty acids: caprylic acid, capric acid, lauric acid, myristic acid, palmititic acid, palmitoleic acid, stearic, oleic acid, linoleic acid, alpha linolenic acid, gamma linolenic acid, arachidic acid, arachidonic acid, behenic acid, or erucic acid |
| Amino acids and derivatives thereof: cysteine, cystine, a cysteine sulfoxide, allicin, selenocysteine, methionine, isoleucine, leucine, lysine, phenylalanine, threonine, tryptophan, 5-hydroxytryptophan, valine, arginine, histidine, alanine, asparagine, aspartate, glutamate, glutamine, glycine, proline, serine, or tyrosine |
| Nucleosides and Nucleotides: inosine, inosine monophosphate (IMP), guanosine, guanoside monophosphate (GMP), adenosine, adenosine monophosophate (AMP) |
| Vitamins: thiamine, vitamin C, Vitamin D, Vitamin B6, or Vitamin E |
| Misc: phospholipid, lecithin, pyrazine, creatine, pyrophosphate |
| Acids: acetic acid, alpha hydroxy acids such as lactic acid or glycolic acid, tricarboxylic acids such as citric acid, dicarboxylic acids such as succinic acid or tartaric acid |
| Peptides and protein hydrolysates: glutathione, vegetable protein hydrolysates, soy protein hydrolysates, yeast protein hydrolysates, algal protein hydrolysatess, meat protein hydrolysates |
| Extracts: a malt extract, a yeast extract, and a peptone |

In some embodiments, one flavor precursor or combinations of two to one hundred flavor precursors, two to ninety, two to eighty, two to seventy, two to sixty, or two to fifty flavor precursors are used. For example, combinations of two to forty flavor precursors, two to thirty-five flavor precursors, two to ten flavor precursors, or two to six flavor precursors can be used with the one or more iron complexes (e.g., heme co-factors such as a heme-containing proteins). For example, the one or more flavor precursors can be glucose, ribose, cysteine, a cysteine derivative, thiamine, lysine, a lysine derivative, glutamic acid, a glutamic acid derivative, alanine, methionine, IMP, GMP, lactic acid, and mixtures thereof (e.g., glucose and cysteine; cysteine and ribose; cysteine, glucose or ribose, and thiamine; cysteine, glucose or ribose, IMP, and GMP; cysteine, glucose or ribose, and lactic acid). For example, the one or more flavor precursors can be alanine, arginine, asparagine, aspartate, cysteine, glutamic acid, glutamine, glycine, histidine, isoleucine, leucine, lysine, methionine, phenylalanine, proline, threonine, tryptophan, tyrosine, valine, glucose, ribose, maltodextrin, thiamine, IMP, GMP, lactic acid, and creatine.

As used herein, the term "heme containing protein" can be used interchangeably with "heme containing polypeptide"

or "heme protein" or "heme polypeptide" and includes any polypeptide that can covalently or noncovalently bind a heme moiety. In some embodiments, the heme-containing polypeptide is a globin and can include a globin fold, which comprises a series of seven to nine alpha helices. Globin type proteins can be of any class (e.g., class I, class II, or class III), and in some embodiments, can transport or store oxygen. For example, a heme-containing protein can be a non-symbiotic type of hemoglobin or a leghemoglobin. A heme-containing polypeptide can be a monomer, i.e., a single polypeptide chain, or can be a dimer, a trimer, tetramer, and/or higher order oligomers. The life-time of the oxygenated $Fe^{2+}$ state of a heme-containing protein can be similar to that of myoglobin or can exceed it by 10%, 20%, 30% 50%, 100% or more under conditions in which the heme-protein-containing consumable is manufactured, stored, handled or prepared for consumption. The life-time of the unoxygenated Fe' state of a heme-containing protein can be similar to that of myoglobin or can exceed it by 10%, 20%, 30% 50%, 100% or more under conditions in which the heme-protein-containing consumable is manufactured, stored, handled or prepared for consumption Non-limiting examples of heme-containing polypeptides can include an androglobin, a cytoglobin, a globin E, a globin X, a globin Y, a hemoglobin, a myoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin (e.g., HbN or HbO), a truncated 2/2 globin, a hemoglobin 3 (e.g., Glb3), a cytochrome, or a peroxidase.

Heme-containing proteins that can be used in the compositions and food products described herein can be from mammals (e.g., farms animals such as cows, goats, sheep, pigs, ox, or rabbits), birds, plants, algae, fungi (e.g., yeast or filamentous fungi), ciliates, or bacteria. For example, a heme-containing protein can be from a mammal such as a farm animal (e.g., a cow, goat, sheep, pig, ox, or rabbit) or a bird such as a turkey or chicken. Heme-containing proteins can be from a plant such as *Nicotiana tabacum* or *Nicotiana sylvestris* (tobacco); *Zea mays* (corn), *Arabidopsis thaliana*, a legume such as *Glycine max* (soybean), *Cicer arietinum* (garbanzo or chick pea), *Pisum sativum* (pea) varieties such as garden peas or sugar snap peas, *Phaseolus vulgaris* varieties of common beans such as green beans, black beans, navy beans, northern beans, or pinto beans, *Vigna unguiculata* varieties (cow peas), *Vigna radiata* (Mung beans), *Lupinus albus* (lupin), or *Medicago sativa* (alfalfa); *Brassica napus* (canola); *Triticum* sps. (wheat, including wheat berries, and spelt); *Gossypium hirsutum* (cotton); *Oryza sativa* (rice); *Zizania* sps. (wild rice); *Helianthus annuus* (sunflower); *Beta vulgaris* (sugarbeet); *Pennisetum glaucum* (pearl millet); *Chenopodium* sp. (*quinoa*); *Sesamum* sp. (sesame); *Linum usitatissimum* (flax); or *Hordeum vulgare* (barley). Heme-containing proteins can be isolated from fungi such as *Saccharomyces cerevisiae, Pichia pastoris, Magnaporthe oryzae, Fusarium graminearum, Aspergillus oryzae, Trichoderma reesei, Myceliopthera thermophile, Kluyvera lactis,* or *Fusarium oxysporum*. Heme-containing proteins can be isolated from bacteria such as *Escherichia coli, Bacillus subtilis, Bacillus licheniformis, Bacillus megaterium, Synechocistis* sp., *Aquifex aeolicus, Methylacidiphilum infernorum*, or thermophilic bacteria such as *Thermophilus*. The sequences and structure of numerous heme-containing proteins are known. See for example, Reedy, et al., *Nucleic Acids Research*, 2008, Vol. 36, Database issue D307-D313 and the Heme Protein Database available on the world wide web at hemeprotein.info/heme.php.

For example, a non-symbiotic hemoglobin can be from a plant selected from the group consisting of soybean, sprouted soybean, alfalfa, golden flax, black bean, black eyed pea, northern, garbanzo, moong bean, cowpeas, pinto beans, pod peas, *quinoa*, sesame, sunflower, wheat berries, spelt, barley, wild rice, or rice.

Any of the heme-containing proteins described herein that can be used for producing food products can have at least 70% (e.g., at least 75%, 80%, 85%, 90%, 95%, 97%, 98%, 99%, or 100%) sequence identity to the amino acid sequence of the corresponding wild-type heme-containing protein or fragments thereof that contain a heme-binding motif. For example, a heme-containing protein can have at least 70% sequence identity to an amino acid sequence set forth in FIG. 1, including a non-symbiotic hemoglobin such as that from *Vigna radiata* (SEQ ID NO:1), *Hordeum vulgare* (SEQ ID NO:5), *Zea mays* (SEQ ID NO:13), *Oryza sativa* subsp. *japonica* (rice) (SEQ ID NO:14), or *Arabidopsis thaliana* (SEQ ID NO:15), a Hell's gate globin I such as that from *Methylacidiphilum infernorum* (SEQ ID NO:2), a flavohemoprotein such as that from *Aquifex aeolicus* (SEQ ID NO:3), a leghemoglobin such as that from *Glycine max* (SEQ ID NO:4), *Pisum sativum* (SEQ ID NO:16), or *Vigna unguiculata* (SEQ ID NO:17), a heme-dependent peroxidase such as from *Magnaporthe oryzae*, (SEQ ID NO:6) or *Fusarium oxysporum* (SEQ ID NO:7), a cytochrome c peroxidase from *Fusarium graminearum* (SEQ ID NO:8), a truncated hemoglobin from *Chlamydomonas moewusii* (SEQ ID NO:9), *Tetrahymena pyriformis* (SEQ ID NO:10, group I truncated), *Paramecium caudatum* (SEQ ID NO:11, group I truncated), a hemoglobin from *Aspergillus niger* (SEQ ID NO:12), or a mammalian myoglobin protein such as the *Bos taurus* (SEQ ID NO:18) myoglobin, *Sus scrofa* (SEQ ID NO:19) myoglobin, *Equus caballus* (SEQ ID NO:20) myoglobin, a heme-protein from *Nicotiana benthamiana* (SEQ ID NO:21), *Bacillus subtilis* (SEQ ID NO:22), *Corynebacterium glutamicum* (SEQ ID NO:23), *Synechocystis* PCC6803 (SEQ ID NO:24), *Synechococcus* sp. PCC 7335 (SEQ ID NO:25), or *Nostoc commune* (SEQ ID NO:26).

The percent identity between two amino acid sequences can be determined as follows. First, the amino acid sequences are aligned using the BLAST 2 Sequences (Bl2seq) program from the stand-alone version of BLASTZ containing BLASTP version 2.0.14. This stand-alone version of BLASTZ can be obtained from Fish & Richardson's web site (e.g., www.fr.com/blast/) or the U.S. government's National Center for Biotechnology Information web site (www.ncbi.nlm.nih.gov). Instructions explaining how to use the Bl2seq program can be found in the readme file accompanying BLASTZ. Bl2seq performs a comparison between two amino acid sequences using the BLASTP algorithm. To compare two amino acid sequences, the options of Bl2seq are set as follows: -i is set to a file containing the first amino acid sequence to be compared (e.g., C:\seq1.txt); -j is set to a file containing the second amino acid sequence to be compared (e.g., C:\seq2.txt); -p is set to blastp; -o is set to any desired file name (e.g., C:\output.txt); and all other options are left at their default setting. For example, the following command can be used to generate an output file containing a comparison between two amino acid sequences: C:\Bl2seq-i c:\seq1.txt-j c:\seq2.txt-p blastp-o c:\output.txt. If the two compared sequences share homology, then the designated output file will present those regions of homology as aligned sequences. If the two compared sequences do not share homology, then the designated output file will not present aligned sequences. Similar procedures can be following for nucleic acid sequences except that blastn is used.

Once aligned, the number of matches is determined by counting the number of positions where an identical amino acid residue is presented in both sequences. The percent identity is determined by dividing the number of matches by the length of the full-length polypeptide amino acid sequence followed by multiplying the resulting value by 100. It is noted that the percent identity value is rounded to the nearest tenth. For example, 78.11, 78.12, 78.13, and 78.14 is rounded down to 78.1, while 78.15, 78.16, 78.17, 78.18, and 78.19 is rounded up to 78.2. It also is noted that the length value will always be an integer.

It will be appreciated that a number of nucleic acids can encode a polypeptide having a particular amino acid sequence. The degeneracy of the genetic code is well known to the art; i.e., for many amino acids, there is more than one nucleotide triplet that serves as the codon for the amino acid. For example, codons in the coding sequence for a given enzyme can be modified such that optimal expression in a particular species (e.g., bacteria or fungus) is obtained, using appropriate codon bias tables for that species.

Heme-containing proteins can be extracted from the source material (e.g., extracted from animal tissue, or plant, fungal, algal, or bacterial biomass, or from the culture supernatant for secreted proteins) or from a combination of source materials (e.g., multiple plant species). Leghemoglobin is readily available as an unused by-product of commodity legume crops (e.g., soybean, alfalfa, or pea). The amount of leghemoglobin in the roots of these crops in the United States exceeds the myoglobin content of all the red meat consumed in the United States.

In some embodiments, extracts of heme-containing proteins include one or more non-heme-containing proteins from the source material (e.g., other animal, plant, fungal, algal, or bacterial proteins) or from a combination of source materials (e.g., different animal, plant, fungi, algae, or bacteria).

In some embodiments, heme-containing proteins are isolated and purified from other components of the source material (e.g., other animal, plant, fungal, algal, or bacterial proteins). As used herein, the term "isolated and purified" indicates that the preparation of heme-containing protein is at least 60% pure, e.g., greater than 65%, 70%, 75%, 80%, 85%, 90%, 95%, or 99% pure. Without being bound by theory, isolating and purifying proteins can allow the food products to be made with greater consistency and greater control over the properties of the food product as unwanted material is eliminated. Proteins can be separated on the basis of their molecular weight, for example, by size exclusion chromatography, ultrafiltration through membranes, or density centrifugation. In some embodiments, the proteins can be separated based on their surface charge, for example, by isoelectric precipitation, anion exchange chromatography, or cation exchange chromatography. Proteins also can be separated on the basis of their solubility, for example, by ammonium sulfate precipitation, isoelectric precipitation, surfactants, detergents or solvent extraction. Proteins also can be separated by their affinity to another molecule, using, for example, hydrophobic interaction chromatography, reactive dyes, or hydroxyapatite. Affinity chromatography also can include using antibodies having specific binding affinity for the heme-containing protein, nickel NTA for His-tagged recombinant proteins, lectins to bind to sugar moieties on a glycoprotein, or other molecules which specifically binds the protein.

Heme-containing proteins also can be recombinantly produced using polypeptide expression techniques (e.g., heterologous expression techniques using bacterial cells, insect cells, fungal cells such as yeast, plant cells such as tobacco, soybean, or *Arabidopsis*, or mammalian cells). In some cases, standard polypeptide synthesis techniques (e.g., liquid-phase polypeptide synthesis techniques or solid-phase polypeptide synthesis techniques) can be used to produce heme-containing proteins synthetically. In some cases, in vitro transcription-translation techniques can be used to produce heme-containing proteins.

The protein used in the consumable may be soluble in a solution. In some embodiments, the isolated and purified proteins are soluble in solution at greater than 5, 10, 15, 20, 25, 50, 100, 150, 200, or 250 g/L.

In some embodiments, the isolated and purified protein is substantially in its native fold and water soluble. In some embodiments, the isolated and purified protein is more than 50, 60, 70, 80, or 90% in its native fold. In some embodiments, the isolated and purified protein is more than 50, 60, 70, 80, or 90% water soluble.

Modulating Flavor and/or Aroma Profiles

In some embodiments, the food product contains between 0.01% and 5% by weight of a heme protein. In some embodiments, the food product contains between 0.01% and 5% by weight of leghemoglobin. Some meat also contains myoglobin, a heme protein, which accounts for most of the red color and iron content of some meat. It is understood that these percentages can vary in meat and the food products can be produced to approximate the natural variation in meat.

In some embodiments, the food product comprises about 0.05%, about 0.1%, about 0.2%, about 0.3%, about 0.4%, about 0.5%, about 0.6%, about 0.7%, about 0.8%, about 0.9%, about 5 1%, about 1.1%, about 1.2%, about 1.3%, about 1.4%, about 1.5%, about 1.6%, about 1.7%, about 1.8%, about 1.9%, about 2%, or more than about 2% of an iron-carrying protein (e.g., a heme-containing protein) by dry weight or total weight. In some cases, the iron carrying protein has been isolated and purified from a source.

As described herein, different combinations of flavor precursors can be used with one or more iron complexes (e.g., a ferrous chlorin, a chlorin-iron complex, or a heme-cofactor such as a heme-containing protein or heme bound to a non-peptidic polymer such as polyethylene glycol or to a solid support) to produce different flavor and aroma profiles when the flavor precursors and iron complexes are heated together (e.g., during cooking). The resultant flavor and/or aroma profile can be modulated by the type and concentration of the flavor precursors, the pH of the reaction, the length of cooking, the type and amount of iron complex (e.g., a heme-cofactor such as heme-containing protein, heme bound to non-peptidic polymer or macromolecule, or heme bound to a solid support), the temperature of the reaction, and the amount of water activity in the product, among other factors. In embodiments in which a heme moiety is bound to a solid support such as cellulose or a chromatography resin, graphite, charcoal, or diatomaceous earth, the solid support (e.g., beads) can be incubated with sugars and/or one or more other flavor precursors to generate flavors, and then the solid support with attached heme moiety can be re-used, i.e., incubated again with sugars and/or one or more other flavor precursors to generate flavors.

Table 2 provides non-limiting examples of flavor types that can be generated by combining one or more flavor precursors and one or more heme co-factors (e.g., heme-containing proteins). See also Tables 7 and/or 11.

TABLE 2

| Flavor Types | |
| --- | --- |
| beef | beef broth |
| beef dripping | cheesy |
| cold-cut deli meat | squash |
| bacon | sharp |
| meaty | fruity |
| brothy | floral |
| ramen | musty |
| egg | fried food |
| malty | caramel |
| bready | barbeque |
| sulfur | chocolate |
| fried chicken | sweet |
| browned | potato |
| pretzel | french toast |
| grassy | breadcrust |
| bloody | mushroom |
| broccoli | chicken |
| brothy | cumin |
| buttery | umami |
| metallic | raisin |
| yeasty | goaty |
| vegetable broth | |

Flavor and aroma profiles are created by different chemical compounds formed by chemical reactions between the heme co-factor (e.g., heme-containing protein) and flavor precursors. Gas chromatography-mass spectrometry (GCMS) can be used to separate and identify the different chemical compounds within a test sample. For example, volatile chemicals can be isolated from the head space after heating a heme-containing protein and one or more flavor precursors.

Table 3 provides non-limiting examples of compounds that can be produced. See also Tables 8, 9, 12, and/or 14.

TABLE 3

| Compounds Produced | | |
| --- | --- | --- |
| phenylacetaldehyde | 2-butenal, 2-ethyl- | 1,3-hexadiene |
| 1-octen-3-one | acetonitrile | 4-decyne |
| 2-n-heptylfuran | | pentanal |
| 2-thiophenecarboxaldehyde | (E)-2-Hexenal | 1-propanol |
| 3-thiophenecarboxaldehyde | 4-ethyl-phenol, | heptanoic acid |
| 1-octene | 3-octanone | ethanethiol |
| butyrolactone | styrene | 2-methyl-1-heptene |
| 2-undecenal | furan, 3-pentyl- | (E)-4-octene |
| propyl-cyclopropane | formic acid, heptyl ester | 2-methyl-2-heptene |
| methyl-pyrazine | (E)-2-Heptenal | pentanoic acid |
| 1-hydroxy-propanone | 6-methyl-5-hepten-2-one | nonanoic acid |
| acetic acid | n-caproic acid vinyl ester | 1,3-dimethyl-benzene |
| furfural | 2-ethyl-2-hexenal | |
| 2-decanone | 1-hepten-3-ol | toluene |
| pyrrole | 1-ethyl-1-methyl-cyclopentane | 1-butanol |
| 1-octen-3-ol | 3-ethyl-2-methyl-1,3-hexadiene | 2,3,3-trimethyl-pentane |
| 2-acetylthiazole | 2-pentyl-thiophene | isopropyl alcohol |
| (E)-2-octenal | (Z)-2-nonenal | 2,2,4,6,6-pentamethyl-heptane |
| decanal | 2-n-octylfuran | phenol |
| benzaldehyde | 2-hexyl-thiophene | 1-penten-3-one |
| (E)-2-Nonenal | 4-cyclopentene-1,3-dione | dimethyl sulfide |
| pyrazine | 1-nonanol | thiirane |
| 1-pentanol | (E)-2-decenal | (E)-2-octen-1-ol |
| trans-2-(2-pentenyl)furan | 4-ethyl-benzaldehyde | 2,4-dimethyl-1-heptene |
| 1-hexanol | 1,7-octadien-3-ol | 1,3-bis(1,1-dimethylethyl)-benzene |
| 1-heptanol | octanoic acid | heptane |
| dimethyl trisulfide | 2-ethyl-5-methyl-pyrazine | 4,7-dimethyl-undecane |
| 2-nonanone | 3-ethyl-2,5-dimethyl-pyrazine | acetophenone |
| 2-pentanone | 1,3,5-cycloheptatriene | tridecane |
| 2-heptanone | 2-ethyl-1-hexanol | thiophosphoramide, s-methyl ester |
| 2,3-butanedione | 4-methyl-octanoic acid | 2-methyl-thiazole |
| heptanal | m-aminophenylacetylene | 3-(1-methylethoxy)-propanenitrile, |
| nonanal | benzene | 2,4-bis(1,1-dimethylethyl)-phenol |
| 2-octanone | thiophene | 3-ethyl-2,2-dimethyl-pentane |
| 2-butanone | 2-methyl-furan | 3-ethyl-pentane |
| octanal | pyridine | 2,3,4-trimethyl-pentane |
| 1-octanol | furan | 2,4,6-trimethyl-octane |
| 3-ethylcyclopentanone | butanal | 2,6-dimethyl-nonane |
| 8-methyl-1-undecene | 2-ethyl-furan | 2-hexyl-furan |
| 3-octen-2-one | carbon disulfide | 4-methyl-5-thiazoleethanol |
| 2,4-Heptadienal, (E,E)- | Furan, 2-hexyl-:2 | 4-penten-2-one |
| (Z)-2-heptenal | 3-methyl-butanal | 4-methylthiazole |
| 6-methyl-2-heptanone | 2-methyl-butanal | 2-methyl-3-pentanone |
| (Z)-4-heptenal | methacrolein | 2,3-pentanedione |
| (E,Z)-2,6-nonadienal | octane | (E)-2-tridecen-1-ol |
| 3-methyl-2-butenal | ethanol | 2-thiophenemethanamine |
| 2-pentyl-furan | 2-methyl-propanal | (Z)-2-nonenal, |
| thiazole | acetone | methyl thiolacetate |
| (E,E)-2,4-decadienal | propanal | methyl ethanoate |
| hexanoic acid | methyl-thiirane | isothiazole |
| 1-ethyl-5-methylcyclopentene | acetaldehyde | 3,3-dimethyl-hexane |
| (E,E)-2,4-nonadienal | 2-propenal | 4-methyl-heptane |
| (Z)-2-decenal | 2-propyl-furan | 2,4-dimethyl-heptane |

TABLE 3-continued

Compounds Produced

| | | |
|---|---|---|
| dihydro-5-pentyl-2(3h)-furanone | dihydro-5-propyl-2(3H)-furanone | 2,3,4-trimethyl-heptane |
| trans-3-nonen-2-one | dihydro-3-(2H)-thiophenone | 2-methyl-heptane |
| (E,E)-3,5-octadien-2-one | 2,2,6-trimethyl-decane | 2-methyl-3-furanthiol |
| (Z)-2-octen-1-ol | 3,3'-dithiobis[2-methyl-furan | 4-amino-1,2,5-oxadiazole-3-carbonitrile |
| 5-ethyldihydro-2(3h)-furanone | 1-heptene | 1,2-benzisothiazol-3(2H)-one |
| 2-butenal | 1,3-octadiene | 2-acetyl-propen-2-ol, |
| 1-penten-3-ol | 1-nonene | 1-decen-3-one |
| 1-(ethylthio)-2-(methylthio)-buta-1,3-diene | | |

In some embodiments, an iron complex (e.g., a ferrous chlorin or a heme-cofactor such as a heme-containing protein) described herein is heated in the presence of ground chicken, to increase specific volatile flavor and odorant components typically elevated in beef. For example, propanal, butanal, 2-ethyl-furan, heptanal, octanal, trans-2-(2-pentenyl)furan, (Z)-2-heptenal, (E)-2-octenal, pyrrole, 2,4-dodecadienal, 1-octanal, (Z)-2-decenal, or 2-undecenal can be increased in the presence of the heme-containing protein, which can impart a more beefy flavor to the chicken.

In some embodiments, an iron complex (e.g., a ferrous chlorin or a heme-cofactor such as a heme-containing protein) described herein is heated in the presence of cysteine and glucose or other combinations of flavor precursors to provide a different profile of volatile odorants than when any subset of the three components are used individually. Volatile flavor components that are increased under these conditions include but are not limited to furan, acetone, thiazole, furfural, benzaldehyde, 2-pyridinecarboxaldehyde, 5-methyl-2-thiophenecarboxaldehyde, 3-methyl-2-thiophenecarboxaldehyde, 3-thiophenemethanol and decanol. See, e.g., Tables 8 and 9. Under these conditions, cysteine and glucose alone or in the presence of iron salts such as ferrous glucanate produced a sulfurous, odor, but addition of heme-containing proteins reduced the sulfurous odor and replaced it with flavors including but not limited to chicken broth, burnt mushroom, molasses, and bread.

In some embodiments, an iron complex (e.g., a ferrous chlorin or a heme-cofactor such as a heme-containing protein) described herein is heated in the presence of cysteine and ribose to provide a different profile of volatile odorants. Heating in the presence of ribose created some additional compounds as compared to when a heme-containing protein and glucose were heated together. See Tables 8 and 9.

In some embodiments, an iron complex (e.g., a ferrous chlorophillin or a heme-cofactor such as a heme-containing protein) described herein can be heated in the presence of thiamine and a sugar to affect the formation of 5-Thiazoleethanol, 4-methyl-furan, 3,3'-dithiobis[2-methyl-furan, and/or 4-Methylthiazole. These compounds are known to be present in meat and have beefy, meaty taste notes.

In some embodiments, an iron complex (e.g., a ferrous chlorin or a heme-cofactor such as a heme-containing protein) described herein can be heated in the presence of a nucleotide such as inosine monophosphate and/or guanosine monophosphate to control the formation of flavor compounds such as (E)-4-octene, 2-ethyl-furan, 2-pentanone, 2,3-butanedione, 2-methyl-thiazole, methyl-pyrazine, tridecane, (E)-2-octenal, 2-thiopenecarboxaldehyde, and/or 3-thiopenecarboxaldehyde. These compounds are known to be present in meat and have a beefy, meaty, buttery, and or savory flavor notes.

In some embodiments, an iron complex (e.g., a ferrous chlorin or a heme-cofactor such as a heme-containing protein) described herein can be heated in the presence of lysine, a sugar such as ribose, and cysteine to control the formation of flavor compounds such as dimethyl trisulfide, nonanal, 2-pentyl thiophene, 2-nonenal furfural, 1-octanol, 2-nonenal, thiazole, 2-acetylthiazole, phenylacetaldehyde, and/or 2-acetylthiazole. These compounds are known to be present in meat and some have a beefy, meaty, and or savory flavor.

In some embodiments, an iron complex (e.g., a ferrous chlorin or a heme-cofactor such as a heme-containing protein) described herein can be heated in the presence of lactic acid, a sugar such as ribose, and cysteine to control the formation of the flavor compounds nonanal, thiazole, 2-acetylthiazole, and/or 8-methyl 1-undecene. These compounds are known to be present in meat and have beefy, savory, browned, bready, and malty notes.

In some embodiments, an iron complex (e.g., a ferrous chlorin or a heme-cofactor such as a heme-containing protein) described herein can be heated in the presence of amino acids, sugars such as glucose, ribose, and maltodextrin, lactic acid, thiamine, IMP, GMP, creatine, and salts such as potassium chloride and sodium chloride, to control the formation of flavor compounds such as 1,3-bis(1,1-dimethylethyl)-benzene, 2-methyl 3-furanthiol, and/or bis(2-methyl-4,5-dihydro-3-furyl) disulfide. These compounds are known to be present in meat and have beefy notes. See also Table 14.

In some embodiments, a particular type of heme-containing protein is chosen to control the formation of flavor compounds. See, for example, the results of Table 9, which shows that the addition of different types of heme-proteins (LegH, Barley, B. myoglobin, or A. aeolicus) in flavor reaction mixtures containing one or more flavor precursor compounds results in many of the same key meat flavors, including but not limited to pentanone, 3-methyl butanal, 2-methyl butanal, 2-heptenal, 1-octene, nonanal, 2-propenal, 2-decenal, 2-nonanone, 2-octanone, 2-tridecen-1-ol, 2-octanone, 2-octenal, 4-methyl-2-heptanone, octanal, 2-undecenal, butyrolactone, 1-octen-3-one, 3-methylheptyl acetate, and 2-pentyl-thiophene. These differences in flavor compounds can change the overall taste profile.

In some embodiments, an iron complex (e.g., a ferrous chlorin or a heme-cofactor such as a heme-containing protein) described herein and one or more flavor precursors can be reacted (e.g., in vitro) with heating to generate a particular flavor and/or aroma profile of interest and the resultant flavor additive composition can be added to the consumable food product of interest, which can then be eaten as-is or can be additionally modified, e.g., by additional cooking.

In some embodiments, any undesirable flavors can be minimized by deodorizing with activated charcoal or by removing enzymes such as lipoxygenases (LOX), which can be present in trace amounts when using preparations of plant proteins, and which can convert unsaturated triacylglycerides (such as linoleic acid or linolenic acid) into smaller and more volatile molecules. LOX are naturally present in legumes such as peas, soybeans, and peanuts, as well as rice, potatoes, and olives. When legume flours are fractionated into separate protein fractions, LOX can act as undesirable "time-bombs" that can cause undesirable flavors on aging or storage. Compositions containing plant proteins (e.g., from ground plant seeds) can be subjected to purification to remove LOX using, for example, an affinity resin that binds to LOX and removes it from the protein sample. The affinity resin can be linoleic acid, linolenic acid, stearic acid, oleic acid, propyl gallate, or epigalloccatechin gallate attached to a solid support such as a bead or resin. See, e.g., WO2013138793. In addition, depending on the protein component of the food product, certain combinations of antioxidants and/or LOX inhibitors can be used as effective agents to minimize off-flavor or off-odor generation especially in the presence of fats and oils. Such compounds can include, for example, one or more of β-carotene, α-tocopherol, caffeic acid, propyl gallate, or epigallocatechin gallate.

In some embodiments, specific flavor compounds, such as those described in Tables 3, 8, 9, 12, 14, 16, or 17 can be isolated and purified from the flavor additive composition. These isolated and purified compounds can be used as an ingredient to create flavors useful to the food and fragrance industry.

A flavor additive composition can be in the form, of but not limited to, soup or stew bases, bouillon, e.g., powder or cubes, flavor packets, or seasoning packets or shakers. Such flavor additive compositions can be used to modulate the flavor and/or aroma profile for a variety of food products, and can be added to a consumable food product before, during, or after cooking of the food product.

Food Products

Food products containing one or more flavor precursors and one or more heme-so containing proteins can be used as a base for formulating a variety of additional food products, including meat substitutes, soup bases, stew bases, snack foods, bouillon powders, bouillon cubes, flavor packets, or frozen food products. Meat substitutes can be formulated, for example, as hot dogs, burgers, ground meat, sausages, steaks, filets, roasts, breasts, thighs, wings, meatballs, meatloaf, bacon, strips, fingers, nuggets, cutlets, or cubes.

In addition, food products described herein can be used to modulate the taste and/or aroma profile of other food products (e.g., meat replicas, meat substitutes, tofu, mock duck or other gluten based vegetable product, textured vegetable protein such as textured soy protein, pork, fish, lamb, or poultry products such as chicken or turkey products) and can be applied to the other food product before or during cooking. Using the food products described herein can provide a particular meaty taste and smell, for example, the taste and smell of beef or bacon, to a non-meat product or to a poultry product.

Food products described herein can be packaged in various ways, including being sealed within individual packets or shakers, such that the composition can be sprinkled or spread on top of a food product before or during cooking.

Food products described herein can include additional ingredients including food-grade oils such as canola, corn, sunflower, soybean, olive or coconut oil, seasoning agents such as edible salts (e.g., sodium or potassium chloride) or herbs (e.g., rosemary, thyme, basil, sage, or mint), flavoring agents, proteins (e.g., soy protein isolate, wheat glutin, pea vicilin, and/or pea legumin), protein concentrates (e.g., soy protein concentrate), emulsifiers (e.g., lecithin), gelling agents (e.g., k-carrageenan or gelatin), fibers (e.g., bamboo filer or inulin), or minerals (e.g., iodine, zinc, and/or calcium).

Food products described herein also can include a natural coloring agent such as turmeric or beet juice, or an artificial coloring agent such as azo dyes, triphenylmethanes, xanthenes, quinines, indigoids, titanium dioxide, red #3, red #40, blue #1, or yellow #5.

Food products described herein also can include meat shelf life extenders such as carbon monoxide, nitrites, sodium metabisulfite, Bombal, vitamin E, rosemary extract, green tea extract, catechins and other anti-oxidants.

Food products described herein can be free of animal products (e.g., animal heme-containing proteins or other animal products).

In some embodiments, the food products can be soy-free, wheat-free, yeast-free, MSG-free, and/or free of protein hydrolysis products, and can taste meaty, highly savory, and without off odors or flavors.

Assessment of Food Products

Food products described herein can be assessed using trained human panelists. The evaluations can involve eyeing, feeling, chewing, and tasting of the product to judge product appearance, color, integrity, texture, flavor, and mouth feel, etc. Panelists can be served samples under red or under white light. Samples can be assigned random three-digit numbers and rotated in ballot position to prevent bias. Sensory judgments can be scaled for "acceptance" or "likeability" or use special terminology. For example, letter scales (A for excellent, B for good, C for poor) or number scales may be used (1=dislike, 2=fair, 3=good; 4=very good; 5=excellent). A scale can be used to rate the overall acceptability or quality of the food product or specific quality attributes such beefiness, texture, and flavor. Panelists can be encouraged to rinse their mouths with water between samples, and given opportunity to comment on each sample.

In some embodiments, a food product described herein can be compared to another food product (e.g., meat or meat substitute) based upon olfactometer readings. In various embodiments, the olfactometer can be used to assess odor concentration and odor thresholds, odor suprathresholds with comparison to a reference gas, hedonic scale scores to determine the degree of appreciation, or relative intensity of odors.

In some embodiments, an olfactometer allows the training and automatic evaluation of expert panels. In some embodiments, a food product described herein causes similar or identical olfactometer readings. In some embodiments, the differences between flavors generated using the methods of the invention and meat are sufficiently small to be below the detection threshold of human perception.

In some embodiments, volatile chemicals identified using GCMS can be evaluated. For example, a human can rate the experience of smelling the chemical responsible for a certain peak. This information could be used to further refine the profile of flavor and aroma compounds produced using a heme-containing protein and one or more flavor precursors.

Characteristic flavor and fragrance components are mostly produced during the cooking process by chemical reactions molecules including amino acids, fats and sugars which are found in plants as well as meat. Therefore, in some embodiments, a food product is tested for similarity to meat during or after cooking. In some embodiments human ratings, human evaluation, olfactometer readings, or GCMS measurements, or combinations thereof, are used to create an olfactory map of the food product. Similarly, an olfactory map of the food product, for example, a meat replica, can be created. These maps can be compared to assess how similar the cooked food product is to meat.

In some embodiments, the olfactory map of the food product during or after cooking is similar to or indistinguishable from that of cooked or cooking meat. In some embodiments the similarity is sufficient to be beyond the detection threshold of human perception. The food product can be created so its characteristics are similar to a food product after cooking, but the uncooked food product may have properties that are different from the predicate food product prior to cooking.

These results will demonstrate that the compositions of the invention are judged as acceptably equivalent to real meat products. Additionally, these results can demonstrate that compositions of the invention are preferred by panelist over other commercially available meat substitutes. So, in some embodiments the present invention provides for consumables that are significantly similar to traditional meats and are more meat like than previously known meat alternatives.

The invention will be further described in the following examples, which do not limit the scope of the invention described in the claims.

EXAMPLES

Example 1: Addition of Heme-Protein Increases Beefy Qualities of Replica Burgers Replica burgers containing the ingredients in Table 4 and the flavor precursors cysteine (10 mM), glutamic acid (10 mM), glucose (10 mM), and thiamine (1 mM) were prepared. Water was added to make up the balance. See, for example, U.S. Provisional Application No. 61/751,816, filed Jan. 11, 2013. Control burgers were prepared as in Table 4 with precursors cysteine (10 mM), glutamic acid (10 mM), glucose (10 mM), and thiamine (1 mM) except LegH was omitted.

After cooking for 5 minutes at 150 C, the replica burgers were evaluated by a trained sensory panel. Panelists were served samples under red lights and each panelist individually evaluated the samples. Samples were assigned a random three-digit number and rotated in ballot position to prevent bias. Panelists were asked to evaluate cooked replica burger samples on multiple flavor, aroma, taste, texture and appearance attributes including but not limited to: beefiness, bloody quality, savory quality, and overall acceptability using a 7-point scale from 1=dislike extremely, to 7=like extremely. Panelists were encouraged to rinse their mouths with water between samples, and to fill out a survey to record their evaluation of each sample.

When replica burgers containing the LegH were compared to the control replica burgers without LegH, the samples containing LegH were rated significantly beefier, bloodier, more savory, and overall preferred compared to those that did not include LegH. See Table 5.

TABLE 4

| Replica Burger Ingredients | |
|---|---|
| Replica burger | % precooked w/w |
| Pea vicilin | 3.86 |
| Soy protein concentrate (SPC) | 2.52 |
| Bamboo fiber | 0.34 |
| NaCl | 0.54 |
| Pea legumin | 2 |

TABLE 4-continued

| Replica Burger Ingredients | |
|---|---|
| Replica burger | % precooked w/w |
| Soy Protein Isolate (SPI) (Solae, St. Louis, MO) | 4.68 |
| Wheat gluten | 4.68 |
| Coconut oil | 15 |
| Soy lecithin | 0.1 |
| k-carrageenan | 1 |
| LegH | 1 |

TABLE 5

Sensory evaluation of replica burger with Heme

| Attribute | Beef 20/80 | No Heme | 1% Heme |
|---|---|---|---|
| Beefyness | | | |
| mean | 5.33 | 1.30 | 3.20 |
| STDEV | 1.58 | 0.67 | 0.79 |
| Bloody | | | |
| mean | 4.00 | 1.10 | 2.78 |
| STDEV | 1.32 | 0.32 | 1.64 |
| Savory | | | |
| mean | 4.67 | 3.00 | 5.10 |
| STDEV | 1.22 | 1.63 | 0.57 |

Example 2: Replica Burgers with a Flavor Precursor Mixture Taste Beefy and Bloody Replica burgers containing a flavor precursor mixture of glucose, cysteine, thiamine, and glutamic acid and 1% LegH pre-cooked w/w (see Table 4) were prepared as described in Example 1, and evaluated by a trained sensory panel after the burgers were cooked for 5 minutes at 150 C. Control burgers included LegH and all other ingredients except for the flavor precursor mixture.

Panelists were asked to evaluate the samples overall improvement in taste and descriptively analyze each sample using a 5-point scale from 1=dislike extremely, to 5=like extremely. Panelists were encouraged to rinse their mouths with water between samples, and to fill out a survey to record their evaluation of each sample. The replicate burgers which included LegH and the flavor precursor mixture were described as having bouillon, gravy, meaty, bloody, savory, and beefy notes on taste, and were preferred to the same replica burger with LegH but no added flavor precursor mixture. See, Table 6

TABLE 6

Improvement of overall taste with precursors added to LegH burgers

| | with precursors | without precursors |
|---|---|---|
| Average | 3.5 | 1.8 |
| STDV | 0.6 | 0.5 |

Example 3: Replica Burgers with Flavor Precursor Mixture Resulting in a Bacon Taste Replica burgers (see Table 4) were cooked with different precursor mixes (see Table 7) and 1% LegH and evaluated by a trained sensory panel after the burgers were cooked for 5 minutes at 150 C. Control burgers contained LegH and all of the other ingredients except for the flavor precursors. Panelists were asked to evaluate each sample and descriptively analyze of each sample. 5-point scale from 1=dislike extremely, to 5=like extremely. Panelists were encouraged to rinse their mouths with water between samples, and to fill out a survey to record their evaluation of each sample. A replica burger with a precursor mixture of 10 mM glucose, 10 mM ribose, 10 mM cysteine, 1 mM thiamine, 1 mM glutamic acid, 1 mM GMP, and LegH was described as having a bacon aroma and taste, and overall meatiness, savory quality, a very umami quality, a brothy quality, and slight beefy notes. See Table 7 for a summary of the flavor description for the various combinations of flavor precursors and heme-containing protein.

to be present in meat; see Table 8. Similarly, a flavor reaction mixture made when LegH heme protein at 1% was mixed with cysteine (10 mM) and ribose (20 mM) at pH 6 and heated to 150 C for 3 minutes created flavor compounds known to be in meat; see Table 8.

The characteristic flavor and fragrance components were mostly produced during the cooking process when the flavor precursor molecules reacted with the heme-protein. Gas chromatography-mass spectrometry (GCMS) is a method that combines the features of gas-liquid chromatography and mass spectrometry to separate and identify different substances within a test sample. Samples were evaluated by GCMS to identify the flavor compounds generated after heating and also evaluated for their sensory profiles. Volatile chemicals were isolated from the head space around the flavor reactions. The profile of the volatile chemicals in the

TABLE 7

Flavors generated by addition of precursors to LegH (1%)

| | | Precursor (concentration) | | | Flavor Description |
|---|---|---|---|---|---|
| | ribose (10 mM) | cysteine (10 mM) | | | some kind of cold-cut/sliced deli meat |
| | ribose (10 mM) | cysteine (10 mM) | | IMP (2 mM) | bread crust with beef drippings, sweet, grassy, umami |
| | ribose (10 mM) | cysteine (10 mM) | | lactic acid (1 mM) | bready, malty, browned, breadcrust |
| | ribose (10 mM) | cysteine (10 mM) | | lysine (5 mM) | savory, beefy, little grassy, brothy, bread |
| | ribose (10 mM) | cysteine (10 mM) | | alanine (5 mM) | savory, weak beefy, brothy, little metallic |
| | ribose (10 mM) | cysteine (10 mM) | | I + G (2 mM) | savory, weak beefy, brothy, sweet |
| | ribose (10 mM) | cysteine (10 mM) | | methionine | cooked potato |
| | ribose (10 mM) | cysteine (10 mM) | glutamic acid (5 mM) | | little meaty, pretzel, brothy, savory, sweet, chocolate |
| glucose (10 mM) | ribose (10 mM) | cysteine (10 mM) | thiamine (2 mM) | glutamic acid (5 mM) | slight beefy, browned, grasssy, |
| glucose (10 mM) | ribose (10 mM) | cysteine (10 mM) | thiamine (2 mM) | glutamic acid (5 mM) IMP (2 mM) | bacon, very umami, savory, brothy, slight beef |
| glucose (10 mM) | | cysteine (10 mM) | thiamine (2 mM) | glutamic acid (5 mM) | beef jerky, bloody, meaty, brothy |
| glucose (10 mM) | | cysteine (10 mM) | thiamine (2 mM) | glutamic acid (5 mM) lactic acid (1 mM) | savory, beefy, bloody, meaty, savory, gravy |
| glucose (10 mM) | | cysteine (10 mM) | thiamine (2 mM) | glutamic acid (5 mM) lysine (5 mM) | roast beef |
| glucose (10 mM) | | cysteine (10 mM) | thiamine (2 mM) | glutamic acid (5 mM) alanine (5 mM) | boiled beef, sweet |
| glucose (10 mM) | | cysteine (10 mM) | thiamine (2 mM) | glutamic acid (5 mM) I + G (2 mM) | beefy with a sulfury note |
| glucose (10 mM) | | cysteine (10 mM) | | | sweet, malty, umami, meaty |
| glucose (10 mM) | | | | I + G (2 mM) | savory, roast beef, grassy |
| glucose (10 mM) | | | | glutamic acid (5 mM) | umami, savory, meaty, sweaty, fermented |

Example 4: Type of Sugar Modulates Flavor Compounds Created in the Presence of Hemeprotein The addition of different sugars to flavor reaction mixtures containing a hemeprotein and one or more flavor precursor compounds resulted in distinct differences in the flavor compounds generated and the overall flavor profile. LegH heme protein at 1% pre-cooked w/w/ was mixed with cysteine (10 mM) and glucose (20 mM) at pH 6 in phosphate buffer to form a flavor reaction mixture and heated to 150 C for 3 minutes; this reaction created flavor compounds known headspace around the flavor reaction mixtures is shown in Table 8. In particular, the use of ribose created some additional compounds as compared to glucose, as shown in Table 8.

Notably, the control mixtures of cysteine with ribose or glucose heated in the absence of the LegH heme-protein did not generate the same set of flavor compounds. The flavor reaction mixtures containing LegH also were evaluated by a blinded trained sensory panel, which described the samples with ribose as having beefy, savory, brothy, and gravy-like notes, and the samples with glucose as savory, bloody, metallic, raw meat, and bouillon-like.

TABLE 8

Flavor compounds generated with cysteine, LegH, and either glucose or ribose in the flavor reaction mixture.

| Compounds created | LegH 1% | |
|---|---|---|
| | cysteine (10 mM), glucose (20 nM) | cysteine (10 mM), ribose (20 mM) |
| benzaldehyde | X | X |
| 2-butanone | X | X |
| dimethyl trisulfide | X | X |
| 2-pentyl-furan | X | X |
| 2-methyl-propanal | X | X |
| thiazole | X | X |
| butyrolactone | X | X |
| 2-acetylthiazole | X | X |
| pentanal | X | X |
| 3-methyl-butanal | X | X |
| methyl-thiirane | X | X |
| nonanal | X | X |
| heptanal | X | X |
| 2,3-butanedione | X | X |
| 1,3,5-cycloheptatriene | X | X |
| propyl-cyclopropane | X | X |
| 2-hexyl-furan | X | X |
| butanal | X | X |
| 2-methyl-butanal | X | |
| 2-ethyl-furan | | X |
| 2-octanone | X | X |
| propanal | X | X |
| trichloromethane | X | |
| 2-methyl-furan | X | X |
| furan | X | X |
| pyrazine | X | X |
| thiophene | X | X |
| 1,3-dimethyl-benzene | X | X |
| octane | | X |
| octanal | X | X |
| thiazole | X | X |
| 2-pentanone | | X |
| furfural | X | X |
| 2-nonanone | X | X |
| (Z)-2-heptenal | X | X |
| (E)-2-heptenal | X | X |
| 1-octene | X | X |
| formic acid, heptyl ester | X | X |
| 2-pentyl-thiophene | | X |
| 1-octen-3-one | X | X |
| 3-pentyl-furan | X | X |
| 2-propenal | | X |
| (E)-2-tridecen-1-ol | | X |
| benzene | | X |
| (E)-4-octene | | X |
| 1-penten-3-one | | X |
| 4-penten-2-one | X | X |
| 2-methyl-thiazole | | X |
| methyl-pyrazine | | X |
| trans-2-(2-pentenyl)furan | | X |
| 3-ethylcyclopentanone | | X |
| pyrrole | X | X |
| 2-thiophenecarboxaldehyde | | X |
| 3-thiophenecarboxaldehyde | | X |

Example 5: Heme-Protein in the Presence of Thiamine Affects the Production of Certain Flavor Compounds The addition of thiamine in a flavor reaction mixtures with a heme protein and other flavor precursors affected the formation of 5-Thiazoleethanol, 4-methyl-furan, 3,3'-dithiobis[2-methyl-thiazole, and 4-methylthiazole. These compounds are known to be present in meat and have beefy, meaty taste notes.

Flavor reaction mixtures at pH 6 containing LegH (1%), cysteine (10 mM), thiamine (1 mM), either glucose or ribose (20 mM), and with or without glutamic acid (10 mM) were prepared and subsequently heated to 150 C for 3 minutes. These flavor reaction samples then were evaluated by GCMS for the flavor compounds generated and evaluated by a trained panel for their sensory profiles. Volatile chemicals were isolated from the head space around the flavor reactions. GCMS showed 4-methyl-5-thiazoleethanol, 3,3'-dithiobis[2-methyl]-furan, and 4-methylthiazole compounds were created by a mixture of LegH with thiamine, a sugar (either glucose or ribose), and cysteine. The same flavor reaction mixtures without thiamine did not generate these compounds; additionally these compounds were not generated when heme-proteins were not present in the flavor reaction mixtures.

The flavor reaction samples also were evaluated by a blinded trained sensory panel, which described the samples with the addition of thiamine as more complex in taste and more beefy, meaty, and savory.

Example 6: Heme-Proteins with Nucleotides Controls Particular Flavor Compound Production The addition of inosine monophosphate and guanosine monophosphate in mixes with heme protein and other precursors controlled the formation of flavor compounds (E)-4-octene, 2-ethyl-furan, 2-pentanone, 2,3-butanedione, 2-methyl-thiazole, methyl-pyrazine, tridecane, (E)-2-octenal, 2-thiophenecarboxaldehyde, and 3-thiophenecarboxaldehyde. These compounds are known to be present in meat and have a beefy, meaty, buttery, and or savory flavor notes.

Reactions containing heme protein at 1% (LegH) with cysteine (10 mM), and glucose (20 mM), 1 mM IMP and 1 mM GMP, at pH 6.0 were prepared and heated to 150 C for 3 minutes. Characteristic flavor and fragrance components were mostly produced during the cooking process where precursors reacting heme-protein. These samples were evaluated by GCMS for the flavor compounds generated and evaluated for the sensory experience. Volatile chemicals were isolated from the head space around the flavor reaction and identified using GCMS, creating a profile of the volatile chemicals in the headspace around the flavor reaction mixture. GCMS showed 4-octene, 2-ethyl furan, 2-pentanone, 2,3-butanedione, 2-methyl-thiazole, methyl-pyrazine, tridecane, 2-octenal, 2-thiophenecarboxaldehyde, 3-thiophenecarboxaldehyde compounds were created by a mixture of hemeprotein LegH with IMP, GMP, glucose, and cysteine. The same samples without IMP and GMP did not generate these compounds, additionally these compounds were also not created when heme-proteins were not present, just precursor molecules. Sensory evaluation by blinded trained panelist found the samples with the addition of inosine and guanosine as described as having more complexity in taste and more beefy, meaty, brothy and savory. FIG. 2 shows the abundance of the novel flavor compounds created with heme protein at 1% was mixed in a reaction at pH 6, with cysteine (10 mM), and glucose (20 mM), IMP (1 mM) and GMP (1 mM), and detected by solid phase microextraction (SPME) and then detected by GCMS.

Example 7: Flavor Generation with the Addition of a Particular Organic Acid

The addition of lactic acid in mixes with heme protein, ribose, and cysteine controlled the formation of the flavor compounds nonanal, thiazole, 2-acetylthiazole, and 8-methyl-1-undecene. These compounds are known to be present in meat.

Reactions containing heme protein at 1%, cysteine (10 mM), and ribose (20 mM), and lactic acid (1 mM), pH 6.0, were prepared and heated to 150 C for 3 minutes. Characteristic flavor and fragrance components were mostly produced during the cooking process where precursors reacting heme-protein. These samples were evaluated by GCMS for the flavor compounds generated and evaluated for the sensory experience. Volatile chemicals were isolated from the head space around the flavor reaction and identified using GCMS, creating a profile of the generated compounds. Nonanal, thiazole, 2-acetylthiazole, and 8-methyl-1-undecene compounds were created by a mixture of LegH with lactic acid, ribose, and cysteine. The same samples without lactic acid did not generate these compounds, additionally these compounds were not created in the absence of heme-proteins.

Sensory evaluation by blinded trained panelist found the samples with the addition of lactic acid as described as beefy, savory, browned, bready, and having malty notes. The sample with everything but lactic acid rated lower in browned, bready and malty notes.

Example 8: Flavor Generated with the Addition of a Particular Amino Acid

The addition of lysine in mixes with heme protein ribose, and cysteine controlled the formation of flavor compounds dimethyl trisulfide, nonanal, 2-pentyl-thiophene, furfural, 2-nonenal, 1-octanol, 2-nonenal, thiazole, 2-acetylthiazole, phenyl acetaldehyde, 2-acetylthiazole. These compounds are known to be present in meat and some have a beefy, meaty, and or savory flavor.

Reactions containing heme protein at 1%, cysteine (10 mM), and ribose (20 mM), and lysine (1 mM), at pH 6.0, were prepared and heated to 150 C for 3 minutes. These samples were evaluated by GCMS for the flavor compounds generated and evaluated for the sensory experience. Characteristic flavor and fragrance components were mostly produced during the cooking process where precursors could react with the heme-protein. These samples were evaluated by GCMS for the flavor compounds generated and evaluated for the sensory experience. Volatile chemicals were isolated from the head space around the flavor reaction. Dimethyl trisulfide, nonanal, 2-pentyl-thiophene, furfural, 2-nonenal, 1-octanol, 2-nonenal, thiazole, 2-acetylthiazole, phenyl acetaldehyde, 2-acetylthiazole compounds were created by a mixture of LegH with lactic acid, ribose, and cysteine. The same samples without lactic acid did not generate these compounds, additionally these compounds were not created when heme-proteins were not present, just precursor molecules. Sensory evaluation by blinded trained panelist found the samples with the addition of lysine as described as roast beefy, savory, and browned. The addition of lysine increased the roasted browned notes.

Example 9—Flavor Compound Production by Different Heme-Proteins

The addition of different types of heme-proteins (LegH, Barley, B. myoglobin, or A. aeolicus) in flavor reaction mixtures containing one or more flavor precursor compounds results in many of the same key meat flavors, including but not limited to 2-pentyl-furan, 2,3-Butanedione, Thiophene, 2-methyl-thiazole, Pyrazine, Furan, Pyrrole, 2-methyl-furan and distinct differences in the flavor compounds, including but not limited to 2-pentyl-thiophene, Nonanal, 2-Nonanone, and 1-Octen-3-one. These differences in flavor compounds can change the overall taste profile. The different types of heme-protein were LegH, Barley, B. myoglobin, or A. aeolicus used at 1% w/w in a reaction mixed with cysteine (10 mM) and ribose (10 mM) at pH 6. The pre-reaction mixture was heated to 150 C for 3 minutes; this reaction created flavor compounds known to be present in meat; see Table 9. The characteristic flavor and fragrance components are mostly produced during the cooking process where the flavor precursor molecules react with the heme-protein. Samples were evaluated by GCMS to identify the flavor compounds generated after heating and also evaluated for their sensory profiles. Volatile chemicals were isolated from the head space around the flavor reactions. Table 9 shows the similarity and differences in volatile flavor compounds created by the different types of heme-proteins.

TABLE 9

Flavor compounds created by different heme-protein when heated with ribose and cysteine.

| Name | LegH | Barley | B. myoglobin | A. aeolicus |
|---|---|---|---|---|
| Furan | x | x | x | x |
| Thiazole | x | x | x | x |
| benzaldehyde | x | x | x | x |
| 2-acetylthiazole | x | x | x | x |
| 2-methyl-propanal | x | x | x | x |
| furfural | x | x | x | x |
| 2,3-butanedione | x | x | x | x |
| 2-pentyl-furan | x | x | x | x |
| 2-pentanone | x | x | | |
| pyrazine | x | x | x | x |
| dimethyl trisulfide | x | x | x | x |
| 3-methyl-butanal | x | x | | x |
| 2-methyl-thiazole | x | x | x | x |
| pentanal | x | x | x | x |
| 1,3,5-cycloheptatriene | x | x | x | x |
| methacrolein | x | x | x | x |
| heptanal | x | x | x | x |
| 2-methyl-butanal | x | x | | x |
| isothiazole | x | x | x | x |
| thiophene | x | x | x | x |
| propanal | x | x | x | x |
| 2-heptenal | x | | x | x |
| methyl-pyrazine | x | x | x | x |
| 1-octene | x | | x | x |
| butanal | x | x | x | x |
| 2-acetyl-propen-2-ol | x | x | x | x |
| pyrrole | x | x | x | x |
| 2-methyl-furan | x | x | x | x |
| nonanal | | x | x | x |
| 2-propenal | | x | x | x |
| 2-decenal | | x | x | |
| 2-nonanone | | x | | |
| 2-octanone | | x | x | x |
| 2-tridecen-1-ol, | | | x | x |
| 2-octanone | | | x | |
| 2-octenal | | | x | x |
| 4-methyl-2-heptanone | | | x | x |
| octanal | | | x | x |
| 2-undecenal | | | | x |
| butyrolactone | | | | x |
| 1-octen-3-one | | | | x |
| 3-methylheptyl acetate | | | | x |
| 2-pentyl-thiophene | | | | x |

Example 10—Generation of Meat Flavors from Different Lipids

Several different samples including oils (canola oil or coconut oil), free fatty acids (FFA) (linoleic acid (C18:2), oleic acid (C18:1), stearic acid (C18:0), or myristic acid (C14:0)) and phospholipids (PL) (beef heart polar lipids extract, Biolipon95 (from Perimond), or NatCholinePC40 (from Perimond)) were tested for their ability to produce beefy flavor in the absence and in the presents of other precursors. Oils, FFAs, and PLs were added to 50 mM potassium phosphate buffer (PPB) pH 6.0 or a Maillard reaction mix (MRM) containing 50 mM potassium phosphate pH 6.0, 5 mM Cysteine, 10 mM Glucose, 0.1 mM Thiamine, and 0.1% (w/v) LegHemoglobin. Lipids in combination with MRM were designed to capture the cross reactions of lipid degradation and Maillard reaction productions while lipids in phosphate buffer functioned as a lipid control. The oils were added at 3% of the total 1 mL volume of solution while FFAs and PLs were added at 1% of the total 1 mL volumes. All samples were cooked at 150° C. for 3 mins, cooled to 50° C. and then analyzed using GCMS (SPME fiber sampling of headspace). After all samples were analyzed by GCMS the caps were removed and samples were smelled by a trained flavor scientist and aromas recorded.

TABLE 10

Legend showing components of each sample

| Sample Name | Solution | Additives |
|---|---|---|
| MRM None | Maillard Reaction Mix | None |
| MRM_Linoelic Acid | Maillard Reaction Mix | 1% linoelic acid |
| MRM_Oleic Acid | Maillard Reaction Mix | 1% oleic acid |
| MRM_C14 | Maillard Reaction Mix | 1% C14:0 free fatty acid |
| MRM_C18 | Maillard Reaction Mix | 1% C18:0 free fatty acid |
| MRM_Canola | Maillard Reaction Mix | 3% Canola Oil |
| MRM_Coconut | Maillard Reaction Mix | 3% Coconut Oil |
| MRM_BeefHeart | Maillard Reaction Mix | 1% Beef Heart Polar Lipids Extract |
| MRM_Biolipon95 | Maillard Reaction Mix | 1% Biolipon95 (emulsifier) |
| MRM_NatCholinePC40 | Maillard Reaction Mix | 1% NatCholinePC40 (emulsifier) |
| KPhos6_Linoelic Acid | PPB, pH 6 | 1% linoelic acid |
| KPhos6_Oleic Acid | PPB, pH 6 | 1% oleic acid |
| KPhos6_C14 | PPB, pH 6 | 1% C14:0 free fatty acid |
| KPhos6_C18 | PPB, pH 6 | 1% C18:0 free fatty acid |
| KPhos6_Canola | PPB, pH 6 | 3% Canola Oil |
| KPhos6_Coconut | PPB, pH 6 | 3% Coconut Oil |
| KPhos6_BeefHeart | PPB, pH 6 | 1% Beef Heart Polar Lipids Extract |
| KPhos6_Biolipon95 | PPB, pH 6 | 1% Biolipon95 (emulsifier) |
| KPhos6_NatCholinePC40 | PPB, pH 6 | 1% NatCholinePC40 (emulsifier) |

Table 11 contains the aroma descriptions and Table 12 contains the GCMS data from the most interesting samples analyzed. Many of the lipids introduced a "fatty" aroma to MRM that was otherwise absent. The combinations of Linoleic Acid or NatCholinePC40 in MRM produced the greatest abundance of fatty compounds suggesting that these lipids may improve the flavor perception of beef tallow. Linoleic Acid and NatCholinePC40 also showed high abundance of earthy-mushroom aromas. The addition of lipids to MRM significantly increased the abundance of "nutty & roasted" aromas. Less desirable "green" aroma compounds were most prominent in samples with unsaturated free fatty acids (linoleic acid or oleic acid) or phospholipids. In general, the addition of lipids significantly increased the number of target beef compounds made.

TABLE 11

Aroma descriptions of each sample after it was cooked.

| Sample Names | Aroma Descriptions |
|---|---|
| MRM_Only | brothy, malty, beef stew |
| KPhos6_BeefHeart | fatty, creamy, beef tallow, slight sweet, slight roasted nutty |
| MRM_BeefHeart | fatty, beef tallow, old meat, mushroom |
| KPhos6_Biolipon95 | fatty, fresh |
| MRM_Biolipon95 | fatty, brothy, hay, malty green |
| KPhos6_NatCholinePC40 | light fatty, fresh |
| MRM_NatCholinePC40 | fatty, beef tallow, brothy |
| K-Phos6_C14 | light/faint plastic/waxy |
| MRM_C14 | brothy, beefy, minty, fresh |
| K-Phos6_C18 | light/faint plastic/waxy |
| MRM_C18 | beefy with cucumber &/or pepper aroma |
| K-Phos6_Canola | fresh, cucumber |
| MRM_Canola | fatty, brothy, oil, roasted nuts |
| K-Phos6_Coconut | nothing |
| MRM_Coconut | brothy, beefy, slight fatty, crackers |
| K-Phos6_Oleic Acid | fresh, cucumber, camphorous/minty-like |
| MRM_Oleic Acid | herbal, plastic, slight cheesy, brothy |
| K-Phos6_Linoelic Acid | light plastic |
| MRM_Linoelic Acid | fatty, light waxy, brothy, herbal |

TABLE 12

List of aromatic compounds found in Beef by GCMS and a chart showing which were detected in each lipid plus MRM sample.

| Compounds in Beef | MRM only | MRM_ BeefHeart | MRM_ NatCholinePC40 | MRM_ Linoleic acid |
|---|---|---|---|---|
| (s)-isopropyl lactate | N | N | N | N |
| 1-ethyl-5-methylcyclopentene | Y | Y | Y | Y |
| 1-heptanol | N | Y | N | N |
| 1-hepten-3-ol | N | Y | Y | Y |
| 1-heptene | N | Y | Y | Y |
| 2-methyl-1-heptene | N | N | N | N |
| 1-hexanol | N | Y | Y | Y |
| 2-ethyl-1-hexanol | N | N | N | N |
| 1-nonanol | N | N | Y | N |
| 1-nonene | N | Y | Y | Y |
| 1-octanol | N | Y | Y | N |
| 1-octen-3-ol | N | Y | Y | Y |
| 1-octen-3-one | Y | Y | Y | Y |
| 1-octene | N | N | N | N |
| 1-pentanol | N | Y | Y | Y |
| 1-penten-3-ol | N | Y | Y | N |
| 1-propanol | N | N | N | N |
| 8-methyl-1-undecene | N | Y | Y | Y |
| 1,3-hexadiene | N | N | N | Y |
| 3-ethyl-2-methyl-1,3-hexadiene | N | Y | Y | Y |
| 1,3-octadiene | Y | N | N | Y |
| 1,3,5-cycloheptatriene | N | N | N | N |
| 2,3-dihydro-5,6-dimethyl-1,4-dioxin | N | N | N | N |
| 1,7-octadien-3-ol | N | Y | N | N |
| 1h-pyrrole-2-carboxaldehyde | N | N | N | N |
| 2-methyl-1H-pyrrole | N | N | N | N |
| 2-acetyl-2-thiazoline | Y | N | N | N |
| 2-acetylthiazole | Y | Y | Y | Y |
| 2-butanone | N | Y | Y | Y |
| 2-butenal | N | Y | Y | Y |
| 2-ethyl-2-butenal | N | N | N | Y |
| 3-methyl-2-butenal | N | N | Y | Y |
| 3-methyl-2-cyclohexen-1-one | N | N | N | N |
| 2-decanone | Y | Y | Y | N |
| (E)-2-decenal | N | N | N | N |

TABLE 12-continued

List of aromatic compounds found in Beef by GCMS and a chart showing which were detected in each lipid plus MRM sample.

| Compounds in Beef | MRM only | MRM_BeefHeart | MRM_NatCholin ePC40 | MRM_Linoleic acid |
|---|---|---|---|---|
| (Z)-2-decenal | Y | Y | Y | Y |
| 2-furanmethanol | N | N | N | N |
| 2-heptanone | Y | Y | Y | Y |
| 6-methyl-2-heptanone | N | N | Y | N |
| (E)-2-heptenal | N | Y | Y | Y |
| (Z)-2-heptenal | N | N | N | Y |
| (E)-2-hexenal | N | Y | Y | Y |
| 2-ethyl-2-hexenal | N | N | N | N |
| 2-methyl-2-heptene | Y | N | N | N |
| 2-n-heptylfuran | Y | N | N | N |
| 2-n-octylfuran | Y | Y | Y | N |
| 2-nonanone | N | Y | Y | N |
| (E)-2-nonenal | Y | Y | Y | Y |
| (Z)-2-nonenal | N | N | N | Y |
| 2-octanone | Y | Y | Y | Y |
| (Z)-2-octen-1-ol | Y | Y | Y | Y |
| (E)-2-octenal | N | Y | Y | Y |
| 2-pentanone | N | Y | Y | N |
| 1-propoxy-2-propanol | N | N | N | N |
| 1-(acetyloxy)-2-propanone | Y | N | N | N |
| 1-hydroxy-2-propanone | Y | N | N | N |
| 2-propenal | N | N | N | Y |
| 2-thiophenecarboxaldehyde | Y | Y | Y | Y |
| 2-undecenal | N | Y | Y | Y |
| 2,3-butanedione | N | N | N | Y |
| 2,3-pentanedione | N | N | N | N |
| (E,E)-2,4-decadienal | N | Y | Y | Y |
| 2,4-decadienal | N | N | N | Y |
| (E,E)-2,4-heptadienal | N | Y | Y | Y |
| (E,E)-2,4-nonadienal | N | Y | Y | Y |
| 2,6-dimethylpyrazine | N | N | N | N |
| (E,Z)-2,6-nonadienal | N | N | Y | N |
| 5-ethyldihydro-2(3H)-furanone | N | Y | Y | Y |
| 5-methyl-2(3H)-furanone | N | N | N | N |
| dihydro-5-pentyl-2(3H)-furanone | N | N | Y | Y |
| dihydro-5-propyl-2(3H)-furanone | N | N | N | N |
| 2(5H)-furanone | N | N | N | N |
| tetrahydro-6-methyl-2H-pyran-2-one | N | N | N | N |
| 3-ethylcyclopentanone | N | Y | Y | Y |
| 3-hexanone | N | N | N | N |
| 3-methyl-2-thiophenecarboxaldehyde | N | N | N | N |
| 3-octanone | Y | Y | N | Y |
| 3-octen-2-one | N | Y | Y | Y |
| 3-thiophenecarboxaldehyde | N | Y | Y | Y |
| (E,E)-3,5-octadien-2-one | N | N | Y | Y |
| dihydro-2-methyl-3(2H)-furanone | N | N | N | N |
| 4-cyanocyclohexene | N | N | N | N |
| 4-cyclopentene-1,3-dione | N | N | Y | N |
| 4-decyne | N | Y | N | N |
| (Z)-4-heptenal | N | Y | Y | Y |
| 4-methyloctanoic acid | N | N | N | N |
| (E)-4-octene | N | N | N | N |
| 2,3-dihydro-3,5-dihydroxy-6-methyl-4(H)-pyran-4-one | Y | N | N | N |
| 6-methyl-5-hepten-2-one | Y | N | N | N |
| acetaldehyde | N | N | N | Y |
| acetic acid | N | N | N | N |
| acetic acid ethenyl ester | Y | N | N | N |
| acetoin | Y | N | N | N |
| acetone | Y | N | N | Y |
| acetonitrile | N | N | N | Y |
| benzaldehyde | Y | Y | Y | Y |
| 4-ethyl-benzaldehyde | N | Y | N | N |
| benzene | Y | N | N | N |
| benzoic acid, hydrazide | Y | N | N | N |
| butanal | Y | N | N | Y |
| 2-methyl-butanal | N | N | N | N |
| 3-methyl-butanal | Y | N | N | N |
| butanoic acid | N | N | N | N |
| butyrolactone | Y | Y | N | Y |
| caprolactam | N | N | N | N |
| carbon disulfide | N | N | N | Y |
| 1-ethyl-1-methyl-cyclopentane | Y | Y | Y | Y |
| propyl-cyclopropane | N | N | Y | Y |
| decanal | N | Y | Y | N |
| dihydro-3-(2H)-thiophenone | N | N | N | N |
| Dimethyl sulfide | Y | N | N | N |
| dimethyl sulfone | N | N | N | N |
| dimethyl trisulfide | Y | Y | N | N |
| ethanethiol | N | N | N | N |
| ethanol | N | N | N | Y |
| 1-(1(H)-pyrrol-2-yl)-ethanone | N | N | N | N |
| 1-(2-furanyl)-ethanone | N | N | N | N |
| ethosuximide | Y | N | N | N |
| formic acid, heptyl ester | Y | Y | N | N |
| furan | Y | N | N | Y |
| 2-ethyl-furan | Y | N | N | N |
| 2-hexyl-furan | Y | N | N | Y |
| 2-methyl-furan | N | N | N | Y |
| 2-pentyl-furan | N | Y | Y | Y |
| 2-propyl-furan | N | N | Y | Y |
| 3-methyl-furan | Y | N | N | N |
| 3-pentyl-furan | Y | Y | Y | Y |
| furfural | N | Y | Y | Y |
| heptanal | N | Y | Y | Y |
| heptanoic acid | N | N | N | Y |
| 2-methyl-hex-2-yn-4-one | N | N | N | N |
| hexanoic acid | N | N | N | Y |
| hydrogen sulfide | N | N | N | N |
| m-aminophenylacetylene | N | N | N | N |
| maleic anhydride | N | N | N | N |
| methacrolein | N | N | N | N |
| methanethiol | N | N | N | N |
| methyl ethanoate | N | N | N | N |
| methyl isobutyl ketone | Y | N | N | N |
| n-caproic acid vinyl ester | N | Y | Y | N |
| nonanal | N | Y | Y | Y |
| 3-methyl-nonane | Y | N | N | N |
| nonanoic acid | Y | N | N | N |
| octanal | N | Y | Y | Y |
| octane | N | N | N | Y |
| octanoic acid | N | N | N | Y |
| oxalic acid, isobutyl pentyl ester | Y | N | N | N |
| p-cresol | N | N | N | N |
| pentanal | N | N | N | Y |
| pentanoic acid | Y | N | N | Y |
| 4-ethyl-phenol | N | Y | Y | N |
| phenylacetaldehyde | Y | Y | Y | Y |
| (p-hydroxyphenyl)-phosphonic acid | Y | N | N | N |
| propanal | N | N | N | Y |
| 2-methyl-propanal | N | N | N | N |
| propanoic acid | N | N | N | N |
| 2-methyl-propanoic acid | Y | N | N | N |
| propanoic acid, ethenyl ester | N | N | N | N |
| pyrazine | N | Y | N | Y |
| 2-ethyl-5-methyl-pyrazine | N | N | N | N |
| 2-ethyl-6-methyl-pyrazine | N | N | N | N |
| 2,3-dimethyl-pyrazine | N | N | N | N |
| 2,5-dimethyl-pyrazine | N | N | N | N |
| 3-ethyl-2,5-dimethyl-pyrazine | Y | N | N | N |
| ethyl-pyrazine | N | N | N | N |
| methyl-pyrazine | N | N | N | N |
| trimethyl-pyrazine | Y | N | N | N |

TABLE 12-continued

List of aromatic compounds found in Beef by GCMS and a chart showing which were detected in each lipid plus MRM sample.

| Compounds in Beef | MRM only | MRM_ BeefHeart | MRM_ NatCholinePC40 | MRM_ Linoleic acid |
|---|---|---|---|---|
| pyridine | Y | N | Y | N |
| pyrrole | Y | Y | Y | Y |
| styrene | Y | N | Y | N |
| thiazole | Y | Y | Y | Y |
| methyl-thiirane | N | N | N | N |
| thiophene | N | N | N | Y |
| 2-hexyl-thiophene | Y | N | Y | N |
| 2-pentyl-thiophene | N | Y | N | N |
| trans-2-(2-pentenyl)furan | N | Y | Y | N |
| trans-3-nonen-2-one | N | Y | Y | Y |
| undecanoic acid | N | N | N | N |
| Total # of Compounds Detected: | 54 | 63 | 66 | 76 |

In samples having fatty or creamy aromas, 2,4-decadienal, (E,E)-2,4-nonadienal, (E,E)-2,4-heptadienal, and/or (E,E)-2,4-decadienal were detected in the KPhos6_BeefHeart, MRM_BeefHeart, MRM_BioLipon95, MRM_NatCholinePC40, Kphos6_Canola, MRM_Canola, KPhos6_Oleic Acid, KPhos6_Linoleic acid and MRM_Linoleic acid samples. For (E,E)-2,4-decadienal, the strongest signal intensity was in the MRM_NatCholinePC40 sample, followed by the MRM_Linoleic acid, KPhos6_Linoleic acid, MRM_BeefHeart, MRM_BioLipon95, KPhos6_BeefHeart, MRM_Oleic Acid, and KPhos6_Oleic Acid samples. For (E,E)-2,4-heptadienal, the strongest signal intensity was in the MRM_NatCholinePC40 sample followed by the MRM_Canola sample. (E,E)-2,4-heptadienal also was detected in the MRM_BioLipon95, MRM_BeefHeart, and MRM_Linoleic acid samples. For (E,E)-2,4-nonadienal, the strongest signal intensity was in the MRM_Canola and MRM_Linoleic acid samples. (E,E)-2,4-nonadienal also was detected in the Kphos6_Canola, MRM_NatCholinePC40, MRM_BioLipon95, MRM_BeefHeart, and KPhos6_Linoleic acid samples. For 2,4-decadienal, the strongest signal intensity was in the MRM_Linoleic acid sample. 2,4-decadienal also was detected in KPhos6_Linoleic acid, MRM_Canola, and KPhos6_Oleic Acid samples.

In samples having earthy or mushroom aromas, 3-octen-2-one, 1-octen-3-one, 3-octanone, and/or 1-octen-3-ol were detected in the KPhos6_BeefHeart, MRM_BeefHeart, Kphos_BioLipon95, MRM_BioLipon95, Kphos_NatCholinePC40, MRM_NatCholinePC40, MRM_Canola, KPhos6_Oleic Acid, MRM_Oleic Acid, KPhos6_Linoleic acid, and MRM_Linoleic acid samples. For 1-octen-3-ol, the strongest signal intensity was in the MRM_Linoleic acid sample, followed by MRM_NatCholinePC40, KPhos6_Linoleic acid, MRM_BeefHeart, KPhos6_BeefHeart, MRM_Canola, MRM_BioLipon95, KPhos6_Oleic Acid, and MRM_Oleic Acid samples. 3-octanone was detected in the MRM_Oleic Acid, KPhos6_Linoleic acid, and MRM_Linoleic acid samples. For 1-octen-3-one, the strongest signal intensity was in the MRM_Linoleic acid and MRM_BeefHeart samples, followed by KPhos6_Linoleic acid, MRM_NatCholinePC40, KPhos6_BeefHeart, MRM_BioLipon95, MRM_Oleic Acid, and KPhos6_Oleic Acid samples. For 3-octen-2-one, the strongest signal intensity was in the KPhos6_Linoleic acid sample, followed by MRM_Linoleic acid, MRM_NatCholinePC40, KPhos6_BeefHeart, KPhos6_Oleic Acid, MRM_Oleic Acid, MRM_BeefHeart, MRM_BioLipon95, MRM_Canola, Kphos6_BioLipon95, and Kphos_NatCholinePC40. Pyrazine was detected in the MRM_Coconut, MRM_C18, MRM_C14, and MRM_BioLipon95 samples.

In samples having a nutty and roasted aroma, thiazole and 2-acetylthiazole were the most abundant compounds detected, along with pyrazine, methyl pyrazine, trimethyl pyrazine, and 3-ethyl-2,5-dimethylpyrazine. 2-acetylthiazole was detected in all samples with MRM and most abundant in samples with MRM_Beefheat, MRM_biolipon95, MRM_Canola, and MRM_coconut. Thiazole was created in samples with MRM-Coconut, MRM_BeefHeat, MRM_Biolipon95, MRM_C14, MRM_C18, MRM_Canola, MRM_Oleic acid and MRM_Linoleic acid and MRM_NatCholinePC40. Pyrazine was present in the largest amount in samples with MRM-Coconut, followed by samples MRM_BeefHeat, MRM_Biolipon95, MRM_C14, MRM_C18, MRM_Canola having roughly equal amount, MRM_Oleic acid and MRM_Linoleic acid sample had even less. Methyl-pyrazine was present in MRM_Biolipon95 and MRM_Coconut. 3-ethyl-2,5-dimethyl-pyrazine and trimethyl-pyrazine, were present only without phospholipids in the MRM.

In samples having green, vegetable, or grass aromas, 1-heptanol, 1-hepten-3-ol, 1-hexanol, (E)-2-heptenal, (Z)-2-heptenal, (E)-2-hexenal, 2-pentyl-furan, and/or heptanal were detected in the KPhos6_BeefHeart, MRM_BeefHeart, Kphos_BioLipon95, MRM_BioLipon95, Kphos_NatCholinePC40, MRM_NatCholinePC40, Kphos_C14, MRM_C14, Kphos_C18, MRM_C18, MRM_Canola, MRM_Coconut, KPhos6_Oleic Acid, MRM_Oleic Acid, KPhos6_Linoleic acid, and MRM_Linoleic acid samples. For 2-pentyl-furan, the strongest signal intensity was in the KPhos6_BeefHeart sample, followed by the KPhos6_Linoleic acid, MRM_BioLipon95, MRM_Linoleic acid, MRM_BeefHeart, MRM_Oleic Acid, MRM_NatCholinePC40, MRM_Canola, KPhos6_Oleic Acid, and Kphos_NatCholinePC40 samples. For (E)-2-heptenal, the strongest signal intensity was in the MRM_BeefHeart, MRM_Canola, MRM_Oleic Acid, and KPhos6_Linoleic acid samples, followed by the KPhos6_Oleic Acid, MRM_BioLipon95, KPhos6_BeefHeart, MRM_Linoleic acid, MRM_NatCholinePC40, Kphos_BioLipon95, and Kphos_NatCholinePC40 samples. For (Z)-2-heptenal, the strongest signal intensity was in the MRM_Linoleic acid sample. MRM_Linoleic acid also was detected in the KPhos6_Linoleic acid sample. For heptanal, the strongest signal intensity was in the MRM_Oleic Acid sample, followed by the KPhos6_Oleic Acid, MRM_C14, MRM_C18, MRM_Canola, MRM_BeefHeart, MRM_NatCholinePC40, MRM_Linoleic acid, and KPhos6_BeefHeart samples. For, (E)-2-hexenal, the strongest signal intensity was in the MRM_Linoleic acid sample, followed by the MRM_NatCholinePC40, KPhos6_Linoleic acid, and MRM_Oleic Acid samples.

Example 11—Creation of Beefy Flavors Using Complex Precursor Mixtures

A formulation was prepared (the "magic mix," see Table 13 containing the estimated concentrations of amino acids, sugars, and other small molecules in beef based on their values reported in literature. The magic mix was tested for its ability to produce beefy flavors in the presence of LegHemoglobin (LegH). The magic mix and 1% w/v LegH were added to the meat replica, pH 6.0 (see Table 4) and baked in a convection oven for 7 minutes at 160° C. A control sample was prepared by adding 1% w/v LegH to the meat replica, pH 6.0 and baking in a convection oven for 7 minutes at 160° C.

The meat replica sample containing only LegH, was compared to the meat replica sample containing the magic mix and LegH by a sensory panel and GCMS analysis. Five tasters rated the flavored meat replicas for beefiness, bitterness, and levels of savory flavors, and off flavors. Each property was rated on a 7 point scale in which 7 was the highest amount of the specified property (e.g., a standard 80:20 ground beef would be rated 7 on the beefy scale). The Magic Mix flavor was rated one point higher in beefy character than the LegH only sample (FIG. 2).

To determine which chemical products were produced upon heating, a solution of Magic Mix was prepared with 1% w/v LegH at pH 6.0. The samples were cooked with shaking at 150° C. for three minutes, then Solid Phase Micro Extraction (SPME) was performed for twelve minutes at 50° C. to extract the volatile compounds above the headspace of the reaction. A search algorithm was used to analyze the retention time and mass fingerprint information of the volatile compounds and assign chemical names to peaks. Table 14 shows the compounds identified in both the Magic Mix+LegH (MM, average of two samples) and in the LegH alone in buffer (LegH, average of five samples) samples. The compounds in Table 14 are listed in order of the retention time (R.T., in seconds), and are designated as having a zero peak area (0), or a small (S), medium (M), or large (L) average peak area. Hundreds of compounds were identified between the samples, many of which are characteristic of beefy aroma, including but not limited to 1,3-bis(1,1-dimethylethyl)-benzene, 2-methyl 3-furanthiol, and Bis(2-methyl-4,5-dihydro-3-furyl) disulfide, which increased in the samples containing the Magic Mix and LegH.

TABLE 13

Chemical entities added to the Magic Mix

| Chemical entity | mM |
| --- | --- |
| Alanine | 5.6 |
| Arginine | 0.6 |
| Asparagine | 0.8 |
| Aspartate | 0.8 |
| Cysteine | 0.8 |
| Glutamic acid | 3.4 |
| Glutamine | 0.7 |
| Glycine | 1.3 |
| Histidine | 0.6 |
| Isoleucine | 0.8 |
| Leucine | 0.8 |
| Lysine | 0.7 |
| Methionine | 0.7 |
| Phenylalanine | 0.6 |
| Proline | 0.9 |
| Threonine | 0.8 |
| Tryptophan | 0.5 |
| Tyrosine | 0.6 |
| Valine | 0.9 |
| glucose | 5.6 |
| Ribose | 6.7 |
| Maltodextrin | 5.0 |
| Thiamine | 0.5 |
| GMP | 0.24 |
| IMP | 0.6 |
| Lactic acid | 1.0 |
| creatine | 1.0 |
| NaCl | 10 |
| KCl | 10 |
| Kphos pH 6.0 | 10 |

TABLE 14

Compounds identified with GC-MS analysis in samples with MM and LegH, or LegH alone (average of five samples)

| R.T.(s) | Name | MM with LegH | LegH alone |
| --- | --- | --- | --- |
| 248 | acetaldehyde | L | S |
| 256.3 | carbon disulfide | L | S |
| 264.3 | dimethyl sulfide | S | 0 |
| 265 | oxalic acid, isobutyl pentyl ester | M | 0 |
| 268.1 | 2,3,4-trimethyl-pentane | M | 0 |
| 269.2 | methanethiol | S | 0 |
| 283.4 | propanal | M | 0 |
| 285.4 | octane | M | 0 |
| 287.1 | furan | M | 0 |
| 295.3 | 2-methyl-propanal | L | S |
| 297.6 | acetone | L | S |
| 319.3 | 2-propenal | M | S |
| 338.1 | 2-methyl-furan | M | S |
| 342.1 | butanal | L | S |
| 344.2 | 2,4-dimethyl-1-heptene | M | 0 |
| 346.3 | methacrolein | M | 0 |
| 357.4 | methyl-thiirane | L | 0 |
| 360.2 | 3-methyl-furan | S | 0 |
| 363.7 | butanone | L | S |
| 368.9 | 2,3-dihydro-5-methyl-furan | M | S |
| 376.4 | 2-methyl-butanal | L | M |
| 381.1 | 3-methyl-butanal | L | M |
| 390.6 | isopropyl alcohol | 0 | S |
| 399.6 | ethanol | L | M |
| 406.2 | 2-propenoic acid, methyl ester | M | 0 |
| 408.2 | benzene | S | 0 |
| 414.4 | methyl vinyl ketone | M | 0 |
| 416.4 | 2,2,4,6,6-pentamethyl-heptane | M | 0 |
| 422.6 | 2-ethyl-furan | S | 0 |
| 438.4 | 2-ethylacrolein | M | 0 |
| 449.9 | 2-pentanone | S | 0 |
| 453.2 | pentanal/2,3-butanedione | L | 0 |
| 453.8 | 2,3-butanedione | L | M |
| 472.8 | 4,7-dimethyl-undecane | M | S |
| 485.9 | 2-methyl-pentanal | M | 0 |
| 492.6 | 2-methyl-1-penten-1-one | S | 0 |
| 496.6 | (E)-3-penten-2-one | M | 0 |
| 508.6 | 1-penten-3-one | M | 0 |
| 510.6 | trichloromethane | M | M |
| 520.4 | p-dithiane-2,5-diol | M | 0 |
| 525.5 | 3-methyl-pentanal | M | 0 |
| 535.1 | (E)-5-decene | M | 0 |
| 536.5 | toluene | M | S |
| 537.9 | 2-butenal | M | S |
| 543.8 | 4-penten-2-one | M | 0 |
| 550.8 | methyl thiolacetate | M | 0 |
| 683.7 | p-xylene | S | 0 |
| 727.4 | dimethyl selenone | M | 0 |
| 738.3 | methyl isopropyl disulphide | M | 0 |
| 755 | 2-heptanone | M | 0 |
| 758.7 | heptanal | L | 0 |
| 781.9 | 1,3-diisopropoxy-1,3-dimethyl-1,3-disilacyclobutane | S | M |
| 789.4 | 3-methyl-2-butenal | M | 0 |
| 793.4 | 4-methyl-2-heptanone | M | 0 |
| 810.4 | pyrazine | M | 0 |
| 818.8 | isothiazole | S | 0 |
| 827.1 | acetyl valeryl | M | 0 |
| 831.8 | 2-pentyl-furan | L | 0 |
| 851 | 2-methyl-thiazole | S | 0 |
| 853.3 | isothiocyanato-methane | S | 0 |
| 870.9 | thiazole | L | 0 |
| 879.2 | styrene | M | 0 |
| 890.7 | 1-(methylthio)-propane | M | 0 |
| 895.6 | methyl-pyrazine | M | 0 |
| 910.5 | thiocyanic acid, methyl ester | S | 0 |
| 918.6 | 4-methylthiazole | M | 0 |
| 921.4 | 2-octanone | M | 0 |
| 923.9 | 2-methyl-cyclopentanone | M | 0 |
| 927.9 | octanal | L | S |
| 934.3 | tridecane | M | 0 |
| 948.8 | trans-2-(2-pentenyl)furan | S | 0 |
| 961.9 | 1-hydroxy-2-propanone | M | 0 |
| 974.5 | (E)-2-heptenal | M | 0 |
| 987.4 | 5-methyl-1-undecene | M | 0 |
| 993.8 | 2-hexyl-furan | M | 0 |

TABLE 14-continued

Compounds identified with GC-MS analysis in samples with MM and LegH, or LegH alone (average of five samples)

| R.T.(s) | Name | MM with LegH | LegH alone |
|---|---|---|---|
| 1007.8 | 7-methyl-(E)-5-undecene | M | 0 |
| 1024.1 | 2-methyl-5-(methylthio)-furan, | S | 0 |
| 1058.6 | 2-butyl-1-decene | M | 0 |
| 1079.3 | dimethyl trisulfide | L | S |
| 1085.3 | 2-nonanone | M | 0 |
| 1093.2 | nonanal | L | M |
| 1142.3 | 1,3-bis(1,1-dimethylethyl)-benzene | M | 0 |
| 1149.6 | (E)-2-octenal | M | 0 |
| 1164.5 | 1-heptanol | M | 0 |
| 1193.5 | methional | L | 0 |
| 1198.8 | acetic acid | M | S |
| 1207.2 | furfural | M | 0 |
| 1242.1 | 2-decanone | M | 0 |
| 1250.8 | decanal | M | 0 |
| 1265.2 | 1-decen-3-one | M | 0 |
| 1283.3 | pyrrole | M | 0 |
| 1292.6 | 5-ethenyl-4-methyl-thiazole | M | 0 |
| 1294.3 | benzaldehyde | L | M |
| 1303.7 | 2-n-octylfuran | M | 0 |
| 1305.6 | (E)-2-nonenal | M | 0 |
| 1341.4 | 1-octanol | M | 0 |
| 1361.1 | 2-methyl-1(H)-pyrrole | S | 0 |
| 1391.7 | 2-undecanone | M | 0 |
| 1401.2 | (E)-2-octen-1-ol | M | 0 |
| 1448 | butyrolactone | S | S |
| 1456.3 | (E)-2-decenal | M | 0 |
| 1462.4 | phenylacetaldehyde | L | S |
| 1466.3 | 2-acetylthiazole | L | 0 |
| 1471.3 | acetophenone | M | S |
| 1475.4 | 1-nonanol | M | 0 |
| 1487 | methyl (methylthio)methyl disulfide | M | 0 |
| 1497.1 | 5-(2-chloroethyl)-4-methylthiazole | L | 0 |
| 1497.5 | 1-(ethylthio)-2-(methylthio)-buta-1,3-diene | L | S |
| 1512 | 3-thiophenecarboxaldehyde | M | 0 |
| 1518.8 | 2-nonen-4-one | M | 0 |
| 1531.7 | 2-thiophenecarboxaldehyde | S | 0 |
| 1543.9 | dodecanal | M | 0 |
| 1551.6 | 4-ethyl-2-methyl-pyrrole | S | 0 |
| 1558.2 | 3-(methylthio)-propanenitrile | S | 0 |
| 1561.2 | 3-decen-2-one | M | 0 |
| 1613.1 | bis(2-methyl-4,5-dihydro-3-furyl) disulfide | M | 0 |
| 1615.6 | 1,10-undecadiene | M | 0 |
| 1619.5 | 2-undecenal | S | 0 |
| 1668.9 | 2-phenylpropenal | M | 0 |
| 1692.3 | (Z)-3-decen-1-ol, acetate | M | 0 |
| 1733.1 | 3-phenyl-furan | S | 0 |
| 1739.7 | 4-nitrophenyl 2-thiophenecarboxylic acid ester | S | 0 |
| 1741.2 | 5-formyl-4-methylthiazole | M | 0 |
| 1749.7 | pentanoic acid, 2,2,4-trimethyl-3-hydroxy-, isobutyl ester | M | 0 |
| 1765.5 | benzyl alcohol | S | 0 |
| 1774.2 | pentanoic acid, 2,2,4-trimethyl-3-hydroxy-, isobutyl ester | S | 0 |
| 1796.9 | dodecanal | M | 0 |
| 1806.1 | (1-ethyl-1-propenyl)-benzene | S | 0 |
| 1825.6 | 1-undecanol | M | S |
| 1827.9 | 2-methyl-3-furanthiol | M | 0 |
| 1828.3 | 2-methyl-3-(methylthio) furan | M | 0 |
| 1836.1 | 4-chloro-2,6-bis(1,1-dimethylethyl)-phenol | S | 0 |
| 1844.1 | phenol | S | S |
| 1845.3 | [(methylsulfonyl)methyl]-benzene | S | 0 |
| 1850.3 | (e)-tridecen-1-ol | M | 0 |
| 1859.9 | 1-heptyl-1,2,3,4-tetrahydro-4-methyl-naphthalene | S | 0 |
| 1863.2 | 2,4-decadienal | S | 0 |
| 1905.1 | 3,3'-dithiobis[2-methyl-furan | M | 0 |
| 1906.9 | 3,5-di-tert-butylbenzoic acid | S | 0 |
| 1909.6 | 4-ethoxy-benzoic acid, ethyl ester | S | 0 |
| 1921.5 | 3-(phenylmethyl)-2,5-piperazinedione | S | 0 |
| 1944.5 | 9-octadecenal | M | 0 |
| 1959.7 | 3,5-bis(1,1-dimethylethyl)-phenol | M | S |
| 1968.4 | 4-methyl-5-thiazoleethanol | M | S |
| 2007.8 | 1,1'-(1,2-cyclobutanediyl)bis-cis-benzene | S | 0 |
| 2019.8 | benzoic acid | S | S |
| 2026.4 | 4-quinolinecarboxaldehyde | S | 0 |
| 2027.8 | m-aminophenylacetylene | M | 0 |

Example 12—Ferrous Chlorin Catalyzes Production of Meat-Like Flavor Compounds Fresh green spinach (10 lb) was added to 500 mL water and finely ground in a Vitamix blender to yield 2 L of green suspension. Acetone (8 L) was added with mixing and the material was allowed to extract for 1 hour. The material was filtered through Whatman filter paper and the acetone was removed on a rotary evaporator (Buchi). To the residual green suspension (500 mL) was added 2 mL of 10 M HCl, causing the suspension to turn brown. To this was added 1 g of $FeCl_2 \cdot 4H_2O$ in 10 mL $H_2O$. The solution was shaken then left at 4° C. for 16 hours. This suspension was extracted with diethyl ether (3×50 mL) to give a bright green organic phase, the combined organics were washed with saturated sodium chloride solution, dried over sodium sulfate, filtered and evaporated to leave a black paste (1.1 g). The pellet was dissolved in chloroform for fractionation.

Chlorophyll and Ferrous chlorin crude fractions were stored at −20° C. Crude extracts were fractionated by reverse-phase high-pressure liquid chromatography (RP-HPLC). HPLC conditions are outlined in Table 15. Both chlorophyll and ferrous chlorophyll were eluted from the column with a peak retention time of 7.6 minutes. Eluted material was collected from 7.3-8.0 minutes. Collected fractions were pooled and stored on ice. Collected fractions were re-chromatographed and showed a single peak with retention time 7.6 minutes. The desired fractions were pooled, then 10% sunflower oil was added, methanol was removed on a rotary evaporator (Buchi).

TABLE 15

HPLC conditions for purification of chlorophyll and ferrous chlorin from crude extract.

| | |
|---|---|
| Sample: | Chlorophyll or Fe-chlorin (~2 mg/mL in $CHCl_3$) |
| System: | Agilent 1100 with Chemstation |
| Column: | Zorbax Bonus-RP (4.6 × 250 mm, 5 uM) |
| Mobile phase: | acetonitrile, methanol, ethyl acetate (60:20:20) isocratic flow |
| Temperature: | 30° C. |
| Flow Rate: | 1.0 mL per minute |
| Injection volume: | 0.05 mL |

Preparation of Flavor Reaction Containing Ferrous Chlorin or Leghemoglobin

A solution of ferrous chlorophyll was mixed with the Magic Mix (Table 13) to a final concentration of 0.35% ferrous chlorin, 1% glycerol, 0.005% tween-20, 5% sunflower oil, 100 mM NaCl, 20 mM phosphate at pH 6. Leghemoglobin (0.35%) at pH 6 in phosphate buffer (20 mM), 100 mM NaCl, was mixed with the Magic Mix (Table 13), 1% glycerol, and 0.005% tween-20. The flavor reaction mixtures were heated to 150° C. for 3 minutes; this reaction created flavor compounds known to be present in meat, created by hemoglobin and also created by ferrous chlorin; see Table 16.

The characteristic flavor and fragrance components were mostly produced during the cooking process when the flavor precursor molecules reacted with the heme-protein or the ferrous chlorophyll. Samples were evaluated by GCMS to identify the flavor compounds generated after heating. Volatile chemicals were isolated from the headspace around the flavor reactions. The profile of the volatile chemicals in the headspace around the flavor reaction mixtures that were similar between heme-protein and ferrous chlorin are shown in Table 16. Notably, many of the compounds created by the ferrous chlorin are important in the flavor of meat.

TABLE 16

Flavor Compounds created by both Ferrous Chlorin and LegH with Magic Mix.

| | |
|---|---|
| 1-heptanol | acetone |
| 1-hexanol | acetonitrile |
| 1-octanol | benzaldehyde |
| 1-octen-3-ol | butanal |
| 1-octen-3-one | 2-methyl-butanal |
| 1-pentanol | dimethyl trisulfide |
| 2-acetylthiazole | ethyl acetate |
| 2-butenal | furan |
| 3-methyl-2-butenal, | 2-ethyl-furan |
| (Z)-2-decenal | 2-hexyl furan |
| 6-methyl-2-heptanone | 2-pentyl-furan |
| (E)-2-heptenal | furfural |
| (E)-2-hexenal | heptanal |
| 2-methyl-3-furanthiol | aminophenylacetylene |
| (E)-2-nonenal | methacrolein |
| (E)-2-octenal | methional |
| 2-pentanone | octanal |
| 1-hydroxy-2-propanone | octane |
| 2-thiophenecarboxaldehyde | oxalic acid, diallyl ester |
| 2-undecenal | 2,3-butanedione |
| 3-methyl-3-buten-2-one | 2-methyl-propanal |
| 3-thiophenecarboxaldehyde | pyrazine |
| (E)-4-octene, | 2,3-dimethyl-pyrazine |
| methyl-pyrazine | 2,5-dimethyl-pyrazine |
| thiazole | |

Example 13—Flavor Creation by Immobilized Hemin

Preparation of Hemin Linked CM Sepharose.

200 mg of bovine hemin (Sigma Aldrich) was loaded into a scintillation vial. A small magnetic stir bar, 800 µL acetonitrile, 64 µL 4-methylmorpholine, and 71 mg of N-hydroxysuccinimide were added in that order. The vial was placed in an ice bath and chilled then 118 mg of N-(3-dimethylaminopropyl)-N'-ethyl-carbodiimide hydrochloride was added with stirring, followed by 845 µL of Jeffamine ED900. This was stirred while allowing the black mixture to warm to ambient temperature. Chloroform (10 mL) was added to the mixture followed by water (4 mL). A flashlight was used to distinguish between organic and aqueous layers since both were black and the organic layer was pipetted off and concentrated to a dark black oil. The oil was dissolved in a 4:1 mixture of acetonitrile and ethanol to make an approximately 10% strength solution that was inky black in color.

2 mL of water swelled and equilibrated CM Sepharose was equilibrated in a BioRad minicolumn with 3 volumes of acetonitrile. The resin was resuspended in 1 mL acetonitrile and pipetted into a scintillation vial. This was followed with 44 microliters 4-methylmorpholine, 23 mg N-hydroxysuccinimide, and 39 mg of solid N-(3-dimethylaminopropyl)-N'-ethyl-carbodiimide hydrochloride. The mixture was vortexed vigorously and then shaken for three hours. To this white solid was added 570 microliters of inky black 20% strength hemin coupled diamine. The black solid was vortexed and shaken for an hour. The slurry strongly resembled Turkish coffee. The mixture was poured into a BioRad minicolumn and filtered, washed with acetonitrile until what came out no longer resembled espresso, then switched to deionized water, and finally 20 mM pH 9 sodium carbonate buffer. The black solid was washed until the effluent ran clear and then resuspended in 2 mL of buffer for storage until use.

Flavor Reaction

The flavor reaction was created with heme protein (equine myoglobin-Sigma) at 0.35% in a phosphate buffer (20 mM) at pH 6.0 with 100 mM NaCl, this was mixed with Magic Mix (Table 13). Another flavor reaction was created with Immobilized Hemin at 0.35% in a phosphate buffer (20 mM) at pH 6.0 with 100 mM NaCl, this was mixed with Magic Mix (Table 13). The flavor reaction mixtures were heated to 150° C. for 3 minutes; this reaction created flavor compounds known to be present in meat.

The characteristic flavor and fragrance components were mostly produced during the cooking process when the flavor precursor molecules reacted with the Heme-protein or the immobilized Hemin. Samples were evaluated by GCMS to identify the flavor compounds generated after heating. Volatile chemicals were isolated from the headspace around the flavor reactions. As can be seen in Table 17, immobilized hemin catalyzed production of compounds similar to those whose production was catalyzed by myoglobin free in solution. Notably, the profiles of flavor compounds, measured by GCMS, produced by cooking mixtures containing the immobilized hemin and the heme-protein, respectively, were very similar.

TABLE 17

Flavor compounds produced by cooking mixtures containing either myoglobin free in solution or hemin coupled to a solid support

| Flavor compound | myoglobin | hemin-linker-resin |
|---|---|---|
| 2-methyl-5-(methylthio)-thiophene | Low | |
| dihydro-5-propyl-2(3H)-furanone | Low | |
| octane | Low | |
| pyrrole | Low | Low |
| methanethiol | Low | Low |
| 2-thiophenecarboxaldehyde | Low | Low |
| methyl-pyrazine | Low | Low |
| 1-hydroxy-2-propanone | Low | Low |
| propanal | Low | Low |
| thiophene | Low | medium |
| pyridine | Low | Low |
| 2-methyl-furan | Low | medium |
| oxalic acid, butyl propyl ester | Low | Low |
| pyrazine | medium | Low |
| oxalic acid, diallyl ester | medium | medium |
| 2-butenal | medium | large |
| furfural | medium | medium |
| nonanal | medium | medium |
| 2-ethyl-furan | medium | Low |
| ethanol | medium | very large |
| tert-butanol | medium | |
| 3,3'-dithiobis[2-methyl]-furan | medium | medium |
| m-aminophenylacetylene | medium | medium |
| 2,5-dihydro-3,4-dimethyl-furan | medium | medium |
| 2-acetylthiazole | medium | medium |
| cyclohexane | medium | |
| ethyl tert-butyl ether | medium | |
| carbon disulfide | medium | medium |
| thiazole | medium | medium |
| acetonitrile | medium | large |
| 2-pentyl-furan | medium | Low |
| 3-thiophenecarboxaldehyde | medium | medium |
| 2-methyl-butanal | medium | medium |
| thiazole | medium | large |
| 2-methyl-3-furanthiol | large | large |
| 2-propenal | large | large |
| 3-methyl-2-butenal | large | medium |
| 2-methyl-3-(methylthio) furan | large | large |
| ethyl acetate | large | medium |

TABLE 17-continued

Flavor compounds produced by cooking mixtures containing either myoglobin free in solution or hemin coupled to a solid support

| Flavor compound | myoglobin | hemin-linker-resin |
|---|---|---|
| methacrolein | large | medium |
| methyl-thiirane | large | large |
| methional | large | large |
| methyl alcohol | large | medium |
| 2-butanone | large | Low |
| 2,3-butanedione | large | medium |
| acetone | large | large |
| furan | large | medium |
| benzaldehyde | large | medium |
| methyl thiolacetate | large | medium |
| acetaldehyde | very large | very large |
| 2-methyl-propanal | very large | very large |
| dimethyl trisulfide | very large | very large |
| 3-methyl-butanal | very large | very large |
| propyl-cyclopropane |  | medium |
| (E)-2-octenal |  | medium |
| 2-n-propylaziridine |  | medium |
| thiirane |  | medium |
| ethyl formate |  | medium |
| methyl vinyl ketone |  | medium |
| 2-propenoic acid, ethyl ester |  | medium |
| 1-nonanol |  | large |
| 1-octene |  | large |
| 1-heptanol |  | large |
| 1-dodecene |  | large |
| phorone |  | very large |

Example 14. The Combination of Precursors with Heme Protein Drives Flavor Reactions Three samples were compared: precursor mix alone, 1% heme protein alone, and precursor mix with 1% heme. The precursor mix was made of glucose (20 mM), ribose (20 mM), cysteine (10 mM), thiamine (1 mM), and glutamic acid (1 mM). Reactions were all at pH 6.0, prepared and heated to 150° C. for 3 minutes. These three samples were run in duplicate. These samples were evaluated by GCMS for the flavor compounds generated. Characteristic flavor and fragrance components were mostly produced during the cooking process where precursors could react with the heme-protein. These samples were evaluated by GCMS for the flavor compounds generated and evaluated for the sensory experience. Volatile chemicals were isolated from the head space around the flavor reaction. The flavor compounds created in each sample is indicated in Table 18. As shown most of the flavor molecules were created on when the precursors are combined with the heme protein.

TABLE 18

Flavor molecules created by the combination of LegH and precursor mix.

| Compound | Precursor mix | LegH | Precursor mix + Leg H |
|---|---|---|---|
| carbon disulfide | medium | medium | high |
| isopropyl alcohol | medium | medium | low |
| 2-methyl-furan | low |  | low |
| butanal | low |  | medium |
| thiophene | low |  | low |
| 2,3-butanedione | low | low | high |
| furan | low |  | medium |
| 2,4-dimethyl-1-heptene |  | high | high |
| acetone |  | high | high |
| dimethyl trisulfide |  | medium | medium |
| 2-methyl-heptane |  | medium | medium |
| 2-pentanone |  | medium |  |
| pentanal |  | medium | medium |
| 2-pentyl-furan |  | medium | medium |
| 2-methyl-propanal |  | low | high |
| 2-acetatyl-1-propene |  | low | low |
| 2-methyl-butanal |  | low | medium |
| 1,3-dimethyl-benzene |  | low | low |
| octane |  | low | low |
| benzene |  | low | low |
| benzaldehyde |  |  | very high |
| 2-butanone |  |  | very high |
| furfural |  |  | very high |
| thiazole |  |  | high |
| nonanal |  |  | high |
| thiazole |  |  | high |
| 2-acetylthiazole |  |  | medium |
| 3-methyl-butanal |  |  | medium |
| (Z)-2-heptenal |  |  | medium |
| heptanal |  |  | medium |
| methyl-thiirane |  |  | medium |
| 3-ethyl-pentane |  |  | medium |
| phenylacetaldehyde |  |  | medium |
| 2-hexyl-furan |  |  | medium |
| 2-nonanone |  |  | medium |
| propanal |  |  | medium |
| pyrazine |  |  | medium |
| (Z)-2-heptenal |  |  | medium |
| 2-methyl-1-heptene |  |  | medium |
| 2-ethyl-furan |  |  | medium |
| octanal |  |  | medium |
| (E)-4-octene |  |  | low |
| (E)-2-octenal |  |  | low |
| 2-methyl-thiazole |  |  | low |
| 2-propenal |  |  | low |
| 1-octen-3-one |  |  | low |
| 1-octene |  |  | low |
| 2-octanone |  |  | low |
| dimethyl sulfide |  |  | low |
| 3-pentyl-furan |  |  | low |
| 2-n-octylfuran |  |  | low |
| 2-pentyl-thiophene |  |  | low |

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A food flavor additive composition comprising:
   a) an isolated heme-containing protein;
   b) a compound selected from glucose, ribose, fructose, lactose, xylose, arabinose, glucose-6-phosphate, maltose, maltodextrin, and galactose, and mixtures of two or more thereof; and
   c) a compound selected from cysteine, cystine, thiamine, methionine, and mixtures of two or more thereof;
   wherein the flavor additive composition contains no animal products; and
   wherein cooking the food flavor additive composition results in the production of at least two volatile compounds which have a meat-associated aroma.

2. The food flavor additive composition of claim 1, wherein the heme-containing protein is selected from the group consisting of a androglobin, a cytoglobin, a globin E, a globin X, a globin Y, a hemoglobin, a myoglobin, a leghemoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin, a truncated 2/2 globin, and a hemoglobin 3.

3. The food flavor additive composition of claim 1, wherein the heme-containing protein comprises amino acid sequence having at least 80% sequence identity to a polypeptide set forth in SEQ ID NOs: 1-26.

4. The food flavor additive composition of claim 1, wherein the food flavor additive composition is a powder or a liquid composition.

5. The food flavor additive composition of claim 1, wherein the heme-containing protein is a plant, a yeast or filamentous fungi, or bacterial heme-containing protein.

6. The food flavor additive composition of claim 1, further comprising one or more of an extract or hydrolysate selected from a vegetable protein hydrolysate, a soy protein hydrolysate, a yeast extract, a yeast protein hydrolysate, and an algal protein hydrolysate.

7. The food flavor additive composition of claim 1, further comprising one or more of a compound selected from alanine, arginine, asparagine, aspartate, glutamic acid, glutamine, glycine, histidine, isoleucine, leucine, lysine, phenylalanine, proline, threonine, tryptophan, tyrosine, valine, maltodextrin, thiamine, IMP, GMP, lactic acid, and creatine.

8. The food flavor additive composition of claim 1, further comprising one or more of an oil selected from coconut oil, mango oil, sunflower oil, cottonseed oil, safflower oil, rice bran oil, cocoa butter, palm fruit oil, palm oil, soybean oil, canola oil, corn oil, sesame oil, walnut oil, flaxseed, jojoba oil, castor, grapeseed oil, peanut oil, olive oil, algal oil, and oil from bacteria or fungi.

9. The food flavor additive composition of claim 1, further comprising one or more of albumin or a globulin.

10. A food flavor additive composition prepared by a process of:
   a) combining an isolated heme-containing protein; a compound selected from glucose, fructose, lactose, xylose, arabinose, glucose-6-phosphate, maltose and glactose, and mixtures of two or more thereof and a compound selected from cysteine, cysteine, thiamine, methionine, and mixtures of two or more thereof, to form a heme flavor reaction mixture, and
   b) heating the heme flavor reaction mixture to at least 150° C. for at least 1 minute to result in a food flavor additive composition;
   wherein the food flavoring additive composition contains no animal products; and
   wherein the heme flavor reaction mixture has a meaty flavor and/or meaty aroma during the heating of step b) and the food flavoring additive composition has a meaty flavor and/or meaty aroma after the heating of step b).

11. A food flavor additive composition of claim 10, wherein the food flavoring wherein the food flavoring additive composition further comprises a compound selected from the group consisting of 2-methyl-furan, bis(2-methyl-3-furyl)disulfide, 2-pentyl-furan, 3,3'-dithiobis-2-methyl-furan, 2,5-dimethyl-pyrazine, 2-methyl-3-furanthiol, bis(2-methyl-4,5-dihydro-3-furyl) disulfide, dihydro-3-(2H)-thiophenone, 5-methyl-2-thiophenecarboxaldehyde, 3-methyl-2-thiophenecarboxaldehyde, 2-methyl-thiazole, dimethyl sulfide, decanal, 5-ethyldihydro-2(3H)-furanone, dihydro-5-pentyl-2(3H)-furanone, 2-octanone, 3,5-octadien-2-one, p-Cresol, and hexanoic acid.

12. The food flavor additive composition of claim 11, wherein the compound is detectable in the headspace above the heme flavor reaction mixture during the heating of step b) or in the headspace above the food flavoring additive composition after the heating of step b).

13. The food flavor additive composition of claim 10, where the process further comprises removing the heme-containing protein from the food flavoring additive composition after the heating in step b) of the heme flavor reaction mixture.

14. The food flavor additive composition of claim 10, wherein the heme-containing protein is present in an amount between about 0.01% and about 5% by weight in the heme flavor reaction mixture.

15. The food flavor additive composition of claim 10, wherein the heme-containing protein is selected from the group consisting of an androglobin, a cytoglobin, a globin E, a globin X, a globin Y, a hemoglobin, a myoglobin, a leghemoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin, a truncated 2/2 globin, and a hemoglobin 3.

16. The food flavor additive composition of claim 10, wherein the heme-containing protein comprises an amino acid sequence having at least 80% sequence identity to a polypeptide set forth in SEQ ID NOs: 1-26.

17. The food flavor additive composition of claim 10, wherein the heme flavor reaction mixture further comprises one or more oils selected from coconut oil, mango oil, sunflower oil, cottonseed oil, safflower oil, rice bran oil, cocoa butter, palm fruit oil, palm oil, soybean oil, canola oil, corn oil, sesame oil, walnut oil, flaxseed, jojoba oil, castor, grapeseed oil, peanut oil, olive oil, algal oil, and oil from bacteria or fungi.

18. The food flavor additive composition of claim 10, further comprising an ingredient selected from an emulsifier and a gelling agent.

19. The food flavor additive composition of claim 10, the process further comprising adding an emulsifier and a gelling agent to the heme flavor reaction mixture prior to the heating of step b).

20. The food flavor additive composition of claim 10, wherein the heme flavor reaction mixture is an aqueous solution.

21. The food flavor additive composition of claim 10, wherein the heme flavor reaction mixture is an oil-based mixture.

22. The food flavor additive composition of claim 10, further comprising one or more of an extract or hydrolysate selected from a vegetable protein hydrolysate, a soy protein hydrolysate, a yeast extract, a yeast protein hydrolysate, and an algal protein hydrolysate, and or a globulin.

23. A process for imparting a meaty flavor and/or meaty aroma to a consumable food product, comprising:
   adding to the consumable food product a food flavor additive composition of claim 1; and
   heating the consumable food product after the adding step.

24. The food flavor additive composition of claim 1, in the form of a soup, stew base, a bouillon powder, bouillon cube, flavor packets or seasoning packet.

* * * * *

UNITED STATES PATENT AND TRADEMARK OFFICE
CERTIFICATE OF CORRECTION

PATENT NO. : 9,943,096 B2
APPLICATION NO. : 15/398479
DATED : April 17, 2018
INVENTOR(S) : Rachel Fraser et al.

It is certified that error appears in the above-identified patent and that said Letters Patent is hereby corrected as shown below:

In the Specification

In Column 1, Line 8, delete "10, 2105" and insert --10, 2015--, therefor.

In the Claims

In Column 73, Line 65, In Claim 2, delete "histoglobin," and insert --histaglobin--, therefor.

In Column 75, Line 11, In Claim 10, after "glucose," insert --ribose,--.

In Column 75, Line 12, In Claim 10, delete "glactose," and insert --galactose,--, therefor.

In Column 75, Line 13, In Claim 10, delete "thereof" and insert --thereof;--, therefor.

In Column 75, Line 14, In Claim 10, delete "cysteine," and insert --cystine,--, therefor.

In Column 75, Line 18, In Claim 10, delete "a" and insert --the--, therefor.

In Column 75, Line 28, In Claim 11, after "flavoring" delete "wherein the food flavoring".

In Column 76, Line 7, In Claim 15, delete "histoglobin," and insert --histaglobin,--, therefor.

In Column 76, Line 40, In Claim 22, delete "and or" and insert --and/or--, therefor.

Signed and Sealed this
Twenty-ninth Day of May, 2018

Andrei Iancu
*Director of the United States Patent and Trademark Office*

(12) INTER PARTES REVIEW CERTIFICATE (3845th)
United States Patent
Fraser et al.

(10) Number: US 9,943,096 K1
(45) Certificate Issued: Dec. 24, 2024

(54) METHODS AND COMPOSITIONS FOR AFFECTING THE FLAVOR AND AROMA PROFILE OF CONSUMABLES

(71) Applicants: Rachel Fraser; Patrick O'Reilly Brown; Jessica Karr; Celeste Holz-Schietinger; Elysia Cohn

(72) Inventors: Rachel Fraser; Patrick O'Reilly Brown; Jessica Karr; Celeste Holz-Schietinger; Elysia Cohn

(73) Assignee: IMPOSSIBLE FOODS INC.

Trial Number:

IPR2023-00206 filed Dec. 7, 2022

Inter Partes Review Certificate for:

Patent No.: 9,943,096
Issued: Apr. 17, 2018
Appl. No.: 15/398,479
Filed: Jan. 4, 2017

The results of IPR2023-00206 are reflected in this inter partes review certificate under 35 U.S.C. 318(b).

INTER PARTES REVIEW CERTIFICATE
U.S. Patent 9,943,096 K1
Trial No. IPR2023-00206
Certificate Issued Dec. 24, 2024

AS A RESULT OF THE INTER PARTES REVIEW PROCEEDING, IT HAS BEEN DETERMINED THAT:

Claims 1-12 and 14-24 are cancelled.

\* \* \* \* \*

SEQUENCE LISTING

```
<160> NUMBER OF SEQ ID NOS: 27

<210> SEQ ID NO 1
<211> LENGTH: 161
<212> TYPE: PRT
<213> ORGANISM: Vigna radiata
```

-continued

```
<400> SEQUENCE: 1

Met Thr Thr Thr Leu Glu Arg Gly Phe Thr Glu Glu Gln Glu Ala Leu
 1               5                  10                  15

Val Val Lys Ser Trp Asn Val Met Lys Lys Asn Ser Gly Glu Leu Gly
             20                  25                  30

Leu Lys Phe Phe Leu Lys Ile Phe Glu Ile Ala Pro Ser Ala Gln Lys
         35                  40                  45

Leu Phe Ser Phe Leu Arg Asp Ser Thr Val Pro Leu Glu Gln Asn Pro
 50                  55                  60

Lys Leu Lys Pro His Ala Val Ser Val Phe Val Met Thr Cys Asp Ser
 65                  70                  75                  80

Ala Val Gln Leu Arg Lys Ala Gly Lys Val Thr Val Arg Glu Ser Asn
                 85                  90                  95

Leu Lys Lys Leu Gly Ala Thr His Phe Arg Thr Gly Val Ala Asn Glu
            100                 105                 110

His Phe Glu Val Thr Lys Phe Ala Leu Leu Glu Thr Ile Lys Glu Ala
        115                 120                 125

Val Pro Glu Met Trp Ser Pro Ala Met Lys Asn Ala Trp Gly Glu Ala
    130                 135                 140

Tyr Asp Gln Leu Val Asp Ala Ile Lys Tyr Glu Met Lys Pro Pro Ser
145                 150                 155                 160

Ser

<210> SEQ ID NO 2
<211> LENGTH: 133
<212> TYPE: PRT
<213> ORGANISM: Methylacidiphilum infernorum

<400> SEQUENCE: 2

Met Ile Asp Gln Lys Glu Lys Glu Leu Ile Lys Glu Ser Trp Lys Arg
 1               5                  10                  15

Ile Glu Pro Asn Lys Asn Glu Ile Gly Leu Leu Phe Tyr Ala Asn Leu
             20                  25                  30

Phe Lys Glu Glu Pro Thr Val Ser Val Leu Phe Gln Asn Pro Ile Ser
         35                  40                  45

Ser Gln Ser Arg Lys Leu Met Gln Val Leu Gly Ile Leu Val Gln Gly
     50                  55                  60

Ile Asp Asn Leu Glu Gly Leu Ile Pro Thr Leu Gln Asp Leu Gly Arg
 65                  70                  75                  80

Arg His Lys Gln Tyr Gly Val Val Asp Ser His Tyr Pro Leu Val Gly
                 85                  90                  95

Asp Cys Leu Leu Lys Ser Ile Gln Glu Tyr Leu Gly Gln Gly Phe Thr
            100                 105                 110

Glu Glu Ala Lys Ala Ala Trp Thr Lys Val Tyr Gly Ile Ala Ala Gln
        115                 120                 125

Val Met Thr Ala Glu
    130

<210> SEQ ID NO 3
<211> LENGTH: 139
<212> TYPE: PRT
<213> ORGANISM: Aquifex aeolicus
```

```
<400> SEQUENCE: 3

Met Leu Ser Glu Glu Thr Ile Arg Val Ile Lys Ser Thr Val Pro Leu
1               5                   10                  15

Leu Lys Glu His Gly Thr Glu Ile Thr Ala Arg Met Tyr Glu Leu Leu
                20                  25                  30

Phe Ser Lys Tyr Pro Lys Thr Lys Glu Leu Phe Ala Gly Ala Ser Glu
            35                  40                  45

Glu Gln Pro Lys Lys Leu Ala Asn Ala Ile Ile Ala Tyr Ala Thr Tyr
        50                  55                  60

Ile Asp Arg Leu Glu Glu Leu Asp Asn Ala Ile Ser Thr Ile Ala Arg
65                  70                  75                  80

Ser His Val Arg Arg Asn Val Lys Pro Glu His Tyr Pro Leu Val Lys
                85                  90                  95

Glu Cys Leu Leu Gln Ala Ile Glu Glu Val Leu Asn Pro Gly Glu Glu
            100                 105                 110

Val Leu Lys Ala Trp Glu Glu Ala Tyr Asp Phe Leu Ala Lys Thr Leu
        115                 120                 125

Ile Thr Leu Glu Lys Lys Leu Tyr Ser Gln Pro
    130                 135

<210> SEQ ID NO 4
<211> LENGTH: 145
<212> TYPE: PRT
<213> ORGANISM: Glycine max

<400> SEQUENCE: 4

Met Gly Ala Phe Thr Glu Lys Gln Glu Ala Leu Val Ser Ser Ser Phe
1               5                   10                  15

Glu Ala Phe Lys Ala Asn Ile Pro Gln Tyr Ser Val Val Phe Tyr Thr
                20                  25                  30

Ser Ile Leu Glu Lys Ala Pro Ala Ala Lys Asp Leu Phe Ser Phe Leu
            35                  40                  45

Ser Asn Gly Val Asp Pro Ser Asn Pro Lys Leu Thr Gly His Ala Glu
        50                  55                  60

Lys Leu Phe Gly Leu Val Arg Asp Ser Ala Gly Gln Leu Lys Ala Asn
65                  70                  75                  80

Gly Thr Val Val Ala Asp Ala Ala Leu Gly Ser Ile His Ala Gln Lys
                85                  90                  95

Ala Ile Thr Asp Pro Gln Phe Val Val Lys Glu Ala Leu Leu Lys
            100                 105                 110

Thr Ile Lys Glu Ala Val Gly Asp Lys Trp Ser Asp Glu Leu Ser Ser
        115                 120                 125

Ala Trp Glu Val Ala Tyr Asp Glu Leu Ala Ala Ala Ile Lys Lys Ala
    130                 135                 140

Phe
145

<210> SEQ ID NO 5
<211> LENGTH: 162
<212> TYPE: PRT
<213> ORGANISM: Hordeum vulgare
```

<400> SEQUENCE: 5

Met Ser Ala Ala Glu Gly Ala Val Val Phe Ser Glu Glu Lys Glu Ala
1 5 10 15

Leu Val Leu Lys Ser Trp Ala Ile Met Lys Lys Asp Ser Ala Asn Leu
20 25 30

Gly Leu Arg Phe Phe Leu Lys Ile Phe Glu Ile Ala Pro Ser Ala Arg
35 40 45

Gln Met Phe Pro Phe Leu Arg Asp Ser Asp Val Pro Leu Glu Thr Asn
50 55 60

Pro Lys Leu Lys Thr His Ala Val Ser Val Phe Val Met Thr Cys Glu
65 70 75 80

Ala Ala Ala Gln Leu Arg Lys Ala Gly Lys Ile Thr Val Arg Glu Thr
85 90 95

Thr Leu Lys Arg Leu Gly Gly Thr His Leu Lys Tyr Gly Val Ala Asp
100 105 110

Gly His Phe Glu Val Thr Arg Phe Ala Leu Leu Glu Thr Ile Lys Glu
115 120 125

Ala Leu Pro Ala Asp Met Trp Gly Pro Glu Met Arg Asn Ala Trp Gly
130 135 140

Glu Ala Tyr Asp Gln Leu Val Ala Ala Ile Lys Gln Glu Met Lys Pro
145 150 155 160

Ala Glu

<210> SEQ ID NO 6
<211> LENGTH: 1153
<212> TYPE: PRT
<213> ORGANISM: Magnaporthe oryzae

<400> SEQUENCE: 6

Met Asp Gly Ala Val Arg Leu Asp Trp Thr Gly Leu Asp Leu Thr Gly
1 5 10 15

His Glu Ile His Asp Gly Val Pro Ile Ala Ser Arg Val Gln Val Met
20 25 30

Val Ser Phe Pro Leu Phe Lys Asp Gln His Ile Ile Met Ser Ser Lys
35 40 45

Glu Ser Pro Ser Arg Lys Ser Ser Thr Ile Gly Gln Ser Thr Arg Asn
50 55 60

Gly Ser Cys Gln Ala Asp Thr Gln Lys Gly Gln Leu Pro Pro Val Gly
65 70 75 80

Glu Lys Pro Lys Pro Val Lys Glu Asn Pro Met Lys Lys Leu Lys Glu
85 90 95

Met Ser Gln Arg Pro Leu Pro Thr Gln His Gly Asp Gly Thr Tyr Pro
100 105 110

Thr Glu Lys Lys Leu Thr Gly Ile Gly Glu Asp Leu Lys His Ile Arg
115 120 125

Gly Tyr Asp Val Lys Thr Leu Leu Ala Met Val Lys Ser Lys Leu Lys
130 135 140

Gly Glu Lys Leu Lys Asp Asp Lys Thr Met Leu Met Glu Arg Val Met
145 150 155 160

Gln Leu Val Ala Arg Leu Pro Thr Glu Ser Lys Lys Arg Ala Glu Leu
165 170 175

Thr Asp Ser Leu Ile Asn Glu Leu Trp Glu Ser Leu Asp His Pro Pro
180 185 190

```
Leu Asn Tyr Leu Gly Pro Glu His Ser Tyr Arg Thr Pro Asp Gly Ser
            195                 200                 205

Tyr Asn His Pro Phe Asn Pro Gln Leu Gly Ala Ala Gly Ser Arg Tyr
        210                 215                 220

Ala Arg Ser Val Ile Pro Thr Val Thr Pro Pro Gly Ala Leu Pro Asp
225                 230                 235                 240

Pro Gly Leu Ile Phe Asp Ser Ile Met Gly Arg Thr Pro Asn Ser Tyr
                245                 250                 255

Arg Lys His Pro Asn Asn Val Ser Ser Ile Leu Trp Tyr Trp Ala Thr
            260                 265                 270

Ile Ile Ile His Asp Ile Phe Trp Thr Asp Pro Arg Asp Ile Asn Thr
        275                 280                 285

Asn Lys Ser Ser Ser Tyr Leu Asp Leu Ala Pro Leu Tyr Gly Asn Ser
290                 295                 300

Gln Glu Met Gln Asp Ser Ile Arg Thr Phe Lys Asp Gly Arg Met Lys
305                 310                 315                 320

Pro Asp Cys Tyr Ala Asp Lys Arg Leu Ala Gly Met Pro Pro Gly Val
                325                 330                 335

Ser Val Leu Leu Ile Met Phe Asn Arg Phe His Asn His Val Ala Glu
            340                 345                 350

Asn Leu Ala Leu Ile Asn Glu Gly Gly Arg Phe Asn Lys Pro Ser Asp
        355                 360                 365

Leu Leu Glu Gly Glu Ala Arg Glu Ala Ala Trp Lys Lys Tyr Asp Asn
        370                 375                 380

Asp Leu Phe Gln Val Ala Arg Leu Val Thr Ser Gly Leu Tyr Ile Asn
385                 390                 395                 400

Ile Thr Leu Val Asp Tyr Val Arg Asn Ile Val Asn Leu Asn Arg Val
                405                 410                 415

Asp Thr Thr Trp Thr Leu Asp Pro Arg Gln Asp Ala Gly Ala His Val
            420                 425                 430

Gly Thr Ala Asp Gly Ala Glu Arg Gly Thr Gly Asn Ala Val Ser Ala
        435                 440                 445

Glu Phe Asn Leu Cys Tyr Arg Trp His Ser Cys Ile Ser Glu Lys Asp
        450                 455                 460

Ser Lys Phe Val Glu Ala Gln Phe Gln Asn Ile Phe Gly Lys Pro Ala
465                 470                 475                 480

Ser Glu Val Arg Pro Asp Glu Met Trp Lys Gly Phe Ala Lys Met Glu
                485                 490                 495

Gln Asn Thr Pro Ala Asp Pro Gly Gln Arg Thr Phe Gly Gly Phe Lys
            500                 505                 510

Arg Gly Pro Asp Gly Lys Phe Asp Asp Asp Leu Val Arg Cys Ile
        515                 520                 525

Ser Glu Ala Val Glu Asp Val Ala Gly Ala Phe Gly Ala Arg Asn Val
530                 535                 540

Pro Gln Ala Met Lys Val Val Glu Thr Met Gly Ile Ile Gln Gly Arg
545                 550                 555                 560

Lys Trp Asn Val Ala Gly Leu Asn Glu Phe Arg Lys His Phe His Leu
                565                 570                 575

Lys Pro Tyr Ser Thr Phe Glu Asp Ile Asn Ser Asp Pro Gly Val Ala
            580                 585                 590

Glu Ala Leu Arg Arg Leu Tyr Asp His Pro Asp Asn Val Glu Leu Tyr
        595                 600                 605
```

```
Pro Gly Leu Val Ala Glu Glu Asp Lys Gln Pro Met Val Pro Gly Val
610                 615                 620

Gly Ile Ala Pro Thr Tyr Thr Ile Ser Arg Val Val Leu Ser Asp Ala
625                 630                 635                 640

Val Cys Leu Val Arg Gly Asp Arg Phe Tyr Thr Thr Asp Phe Thr Pro
                645                 650                 655

Arg Asn Leu Thr Asn Trp Gly Tyr Lys Glu Val Asp Tyr Asp Leu Ser
                660                 665                 670

Val Asn His Gly Cys Val Phe Tyr Lys Leu Phe Ile Arg Ala Phe Pro
                675                 680                 685

Asn His Phe Lys Gln Asn Ser Val Tyr Ala His Tyr Pro Met Val Val
                690                 695                 700

Pro Ser Glu Asn Lys Arg Ile Leu Glu Ala Leu Gly Arg Ala Asp Leu
705                 710                 715                 720

Phe Asp Phe Glu Ala Pro Lys Tyr Ile Pro Pro Arg Val Asn Ile Thr
                725                 730                 735

Ser Tyr Gly Gly Ala Glu Tyr Ile Leu Glu Thr Gln Glu Lys Tyr Lys
                740                 745                 750

Val Thr Trp His Glu Gly Leu Gly Phe Leu Met Gly Glu Gly Gly Leu
                755                 760                 765

Lys Phe Met Leu Ser Gly Asp Asp Pro Leu His Ala Gln Gln Arg Lys
                770                 775                 780

Cys Met Ala Ala Gln Leu Tyr Lys Asp Gly Trp Thr Glu Ala Val Lys
785                 790                 795                 800

Ala Phe Tyr Ala Gly Met Met Glu Glu Leu Leu Val Ser Lys Ser Tyr
                805                 810                 815

Phe Leu Gly Asn Asn Lys His Arg His Val Asp Ile Ile Arg Asp Val
                820                 825                 830

Gly Asn Met Val His Val His Phe Ala Ser Gln Val Phe Gly Leu Pro
                835                 840                 845

Leu Lys Thr Ala Lys Asn Pro Thr Gly Val Phe Thr Glu Gln Glu Met
850                 855                 860

Tyr Gly Ile Leu Ala Ala Ile Phe Thr Thr Ile Phe Phe Asp Leu Asp
865                 870                 875                 880

Pro Ser Lys Ser Phe Pro Leu Arg Thr Lys Thr Arg Glu Val Cys Gln
                885                 890                 895

Lys Leu Ala Lys Leu Val Glu Ala Asn Val Lys Leu Ile Asn Lys Ile
                900                 905                 910

Pro Trp Ser Arg Gly Met Phe Val Gly Lys Pro Ala Lys Asp Glu Pro
                915                 920                 925

Leu Ser Ile Tyr Gly Lys Thr Met Ile Lys Gly Leu Lys Ala His Gly
930                 935                 940

Leu Ser Asp Tyr Asp Ile Ala Trp Ser His Val Val Pro Thr Ser Gly
945                 950                 955                 960

Ala Met Val Pro Asn Gln Ala Gln Val Phe Ala Gln Ala Val Asp Tyr
                965                 970                 975

Tyr Leu Ser Pro Ala Gly Met His Tyr Ile Pro Glu Ile His Met Val
                980                 985                 990

Ala Leu Gln Pro Ser Thr Pro Glu Thr Asp Ala Leu Leu Leu Gly Tyr
                995                 1000                1005

Ala Met Glu Gly Ile Arg Leu Ala Gly Thr Phe Gly Ser Tyr Arg Glu
                1010                1015                1020
```

```
Ala Ala Val Asp Asp Val Val Lys Glu Asp Asn Gly Arg Gln Val Pro
1025                1030                1035                1040

Val Lys Ala Gly Asp Arg Val Phe Val Ser Phe Val Ala Ala Arg
            1045                1050                1055

Asp Pro Lys His Phe Pro Asp Pro Glu Val Val Asn Pro Arg Arg Pro
        1060                1065                1070

Ala Lys Lys Tyr Ile His Tyr Gly Val Gly Pro His Ala Cys Leu Gly
    1075                1080                1085

Arg Asp Ala Ser Gln Ile Ala Ile Thr Glu Met Phe Arg Cys Leu Phe
1090                1095                1100

Arg Arg Arg Asn Val Arg Arg Val Pro Gly Pro Gln Gly Glu Leu Lys
1105                1110                1115                1120

Lys Val Pro Arg Pro Gly Gly Phe Tyr Val Tyr Met Arg Glu Asp Trp
                1125                1130                1135

Gly Gly Leu Phe Pro Phe Pro Val Thr Met Arg Val Met Trp Asp Asp
                1140                1145                1150

Glu

<210> SEQ ID NO 7
<211> LENGTH: 530
<212> TYPE: PRT
<213> ORGANISM: Fusarium oxysporum

<400> SEQUENCE: 7

Met Lys Gly Ser Ala Thr Leu Ala Phe Ala Leu Val Gln Phe Ser Ala
1               5                   10                  15

Ala Ser Gln Leu Val Trp Pro Ser Lys Trp Asp Glu Val Glu Asp Leu
            20                  25                  30

Leu Tyr Met Gln Gly Gly Phe Asn Lys Arg Gly Phe Ala Asp Ala Leu
        35                  40                  45

Arg Thr Cys Glu Phe Gly Ser Asn Val Pro Gly Thr Gln Asn Thr Ala
    50                  55                  60

Glu Trp Leu Arg Thr Ala Phe His Asp Ala Ile Thr His Asp Ala Lys
65                  70                  75                  80

Ala Gly Thr Gly Gly Leu Asp Ala Ser Ile Tyr Trp Glu Ser Ser Arg
                85                  90                  95

Pro Glu Asn Pro Gly Lys Ala Phe Asn Thr Phe Gly Phe Phe Ser
            100                 105                 110

Gly Phe His Asn Pro Arg Ala Thr Ala Ser Asp Leu Thr Ala Leu Gly
        115                 120                 125

Thr Val Leu Ala Val Gly Ala Cys Asn Gly Pro Arg Ile Pro Phe Arg
130                 135                 140

Ala Gly Arg Ile Asp Ala Tyr Lys Ala Gly Pro Ala Gly Val Pro Glu
145                 150                 155                 160

Pro Ser Thr Asn Leu Lys Asp Thr Phe Ala Ala Phe Thr Lys Ala Gly
                165                 170                 175

Phe Thr Lys Glu Glu Met Thr Ala Met Val Ala Cys Gly His Ala Ile
            180                 185                 190

Gly Gly Val His Ser Val Asp Phe Pro Glu Ile Val Gly Ile Lys Ala
        195                 200                 205

Asp Pro Asn Asn Asp Thr Asn Val Pro Phe Gln Lys Asp Val Ser Ser
    210                 215                 220

Phe His Asn Gly Ile Val Thr Glu Tyr Leu Ala Gly Thr Ser Lys Asn
225                 230                 235                 240
```

Pro Leu Val Ala Ser Lys Asn Ala Thr Phe His Ser Asp Lys Arg Ile
                245                 250                 255

Phe Asp Asn Asp Lys Ala Thr Met Lys Lys Leu Ser Thr Lys Ala Gly
            260                 265                 270

Phe Asn Ser Met Cys Ala Asp Ile Leu Thr Arg Met Ile Asp Thr Val
        275                 280                 285

Pro Lys Ser Val Gln Leu Thr Pro Val Leu Glu Ala Tyr Asp Val Arg
    290                 295                 300

Pro Tyr Ile Thr Glu Leu Ser Leu Asn Asn Asn Lys Ile His Phe
305                 310                 315                 320

Thr Gly Ser Val Arg Val Arg Ile Thr Asn Asn Ile Arg Asp Asn Asn
                325                 330                 335

Asp Leu Ala Ile Asn Leu Ile Tyr Val Gly Arg Asp Gly Lys Lys Val
            340                 345                 350

Thr Val Pro Thr Gln Gln Val Thr Phe Gln Gly Gly Thr Ser Phe Gly
        355                 360                 365

Ala Gly Glu Val Phe Ala Asn Phe Glu Phe Asp Thr Thr Met Asp Ala
    370                 375                 380

Lys Asn Gly Ile Thr Lys Phe Phe Ile Gln Glu Val Lys Pro Ser Thr
385                 390                 395                 400

Lys Ala Thr Val Thr His Asp Asn Gln Lys Thr Gly Gly Tyr Lys Val
                405                 410                 415

Asp Asp Thr Val Leu Tyr Gln Leu Gln Gln Ser Cys Ala Val Leu Glu
            420                 425                 430

Lys Leu Pro Asn Ala Pro Leu Val Val Thr Ala Met Val Arg Asp Ala
        435                 440                 445

Arg Ala Lys Asp Ala Leu Thr Leu Arg Val Ala His Lys Lys Pro Val
    450                 455                 460

Lys Gly Ser Ile Val Pro Arg Phe Gln Thr Ala Ile Thr Asn Phe Lys
465                 470                 475                 480

Ala Thr Gly Lys Lys Ser Ser Gly Tyr Thr Gly Phe Gln Ala Lys Thr
                485                 490                 495

Met Phe Glu Glu Gln Ser Thr Tyr Phe Asp Ile Val Leu Gly Gly Ser
            500                 505                 510

Pro Ala Ser Gly Val Gln Phe Leu Thr Ser Gln Ala Met Pro Ser Gln
        515                 520                 525

Cys Ser
    530

<210> SEQ ID NO 8
<211> LENGTH: 358
<212> TYPE: PRT
<213> ORGANISM: Fusarium graminearum

<400> SEQUENCE: 8

Met Ala Ser Ala Thr Arg Gln Phe Ala Arg Ala Ala Thr Arg Ala Thr
1               5                   10                  15

Arg Asn Gly Phe Ala Ile Ala Pro Arg Gln Val Ile Arg Gln Gln Gly
                20                  25                  30

Arg Arg Tyr Tyr Ser Ser Glu Pro Ala Gln Lys Ser Ser Ala Trp
            35                  40                  45

Ile Trp Leu Thr Gly Ala Ala Val Ala Gly Ala Gly Tyr Tyr Phe
        50                  55                  60

Tyr Gly Asn Ser Ala Ser Ser Ala Thr Ala Lys Val Phe Asn Pro Ser
65                  70                  75                  80

```
Lys Glu Asp Tyr Gln Lys Val Tyr Asn Glu Ile Ala Ala Arg Leu Glu
                85                  90                  95

Glu Lys Asp Asp Tyr Asp Asp Gly Ser Tyr Gly Pro Val Leu Val Arg
            100                 105                 110

Leu Ala Trp His Ala Ser Gly Thr Tyr Asp Lys Glu Thr Gly Thr Gly
        115                 120                 125

Gly Ser Asn Gly Ala Thr Met Arg Phe Ala Pro Glu Ser Asp His Gly
    130                 135                 140

Ala Asn Ala Gly Leu Ala Ala Arg Asp Phe Leu Gln Pro Val Lys
145                 150                 155                 160

Glu Lys Phe Pro Trp Ile Thr Tyr Ser Asp Leu Trp Ile Leu Ala Gly
                165                 170                 175

Val Cys Ala Ile Gln Glu Met Leu Gly Pro Ala Ile Pro Tyr Arg Pro
            180                 185                 190

Gly Arg Ser Asp Arg Asp Val Ser Gly Cys Thr Pro Asp Gly Arg Leu
        195                 200                 205

Pro Asp Ala Ser Lys Arg Gln Asp His Leu Arg Gly Ile Phe Gly Arg
    210                 215                 220

Met Gly Phe Asn Asp Gln Glu Ile Val Ala Leu Ser Gly Ala His Ala
225                 230                 235                 240

Leu Gly Arg Cys His Thr Asp Arg Ser Gly Tyr Ser Gly Pro Trp Thr
                245                 250                 255

Phe Ser Pro Thr Val Leu Thr Asn Asp Tyr Phe Arg Leu Leu Val Glu
            260                 265                 270

Glu Lys Trp Gln Trp Lys Lys Trp Asn Gly Pro Ala Gln Tyr Glu Asp
        275                 280                 285

Lys Ser Thr Lys Ser Leu Met Met Leu Pro Ser Asp Ile Ala Leu Ile
    290                 295                 300

Glu Asp Lys Lys Phe Lys Pro Trp Val Glu Lys Tyr Ala Lys Asp Asn
305                 310                 315                 320

Asp Ala Phe Phe Lys Asp Phe Ser Asn Val Val Leu Arg Leu Phe Glu
                325                 330                 335

Leu Gly Val Pro Phe Ala Gln Gly Thr Glu Asn Gln Arg Trp Thr Phe
            340                 345                 350

Lys Pro Thr His Gln Glu
        355

<210> SEQ ID NO 9
<211> LENGTH: 122
<212> TYPE: PRT
<213> ORGANISM: Chlamydomonas eugametos

<400> SEQUENCE: 9

Met Ser Leu Phe Ala Lys Leu Gly Gly Arg Glu Ala Val Glu Ala Ala
  1               5                  10                  15

Val Asp Lys Phe Tyr Asn Lys Ile Val Ala Asp Pro Thr Val Ser Thr
            20                  25                  30

Tyr Phe Ser Asn Thr Asp Met Lys Val Gln Arg Ser Lys Gln Phe Ala
        35                  40                  45

Phe Leu Ala Tyr Ala Leu Gly Gly Ala Ser Glu Trp Lys Gly Lys Asp
    50                  55                  60

Met Arg Thr Ala His Lys Asp Leu Val Pro His Leu Ser Asp Val His
65                  70                  75                  80

Phe Gln Ala Val Ala Arg His Leu Ser Asp Thr Leu Thr Glu Leu Gly
                85                  90                  95
```

```
Val Pro Pro Glu Asp Ile Thr Asp Ala Met Ala Val Ala Ser Thr
            100                 105                 110

Arg Thr Glu Val Leu Asn Met Pro Gln Gln
            115                 120

<210> SEQ ID NO 10
<211> LENGTH: 121
<212> TYPE: PRT
<213> ORGANISM: Tetrahymena pyriformis

<400> SEQUENCE: 10

Met Asn Lys Pro Gln Thr Ile Tyr Glu Lys Leu Gly Gly Glu Asn Ala
  1               5                  10                  15

Met Lys Ala Ala Val Pro Leu Phe Tyr Lys Lys Val Leu Ala Asp Glu
            20                  25                  30

Arg Val Lys His Phe Phe Lys Asn Thr Asp Met Asp His Gln Thr Lys
        35                  40                  45

Gln Gln Thr Asp Phe Leu Thr Met Leu Leu Gly Gly Pro Asn His Tyr
    50                  55                  60

Lys Gly Lys Asn Met Thr Glu Ala His Lys Gly Met Asn Leu Gln Asn
65                  70                  75                  80

Leu His Phe Asp Ala Ile Ile Glu Asn Leu Ala Ala Thr Leu Lys Glu
                85                  90                  95

Leu Gly Val Thr Asp Ala Val Ile Asn Glu Ala Ala Lys Val Ile Glu
            100                 105                 110

His Thr Arg Lys Asp Met Leu Gly Lys
        115                 120

<210> SEQ ID NO 11
<211> LENGTH: 117
<212> TYPE: PRT
<213> ORGANISM: Paramecium caudatum

<400> SEQUENCE: 11

Met Ser Leu Phe Glu Gln Leu Gly Gly Gln Ala Ala Val Gln Ala Val
  1               5                  10                  15

Thr Ala Gln Phe Tyr Ala Asn Ile Gln Ala Asp Ala Thr Val Ala Thr
            20                  25                  30

Phe Phe Asn Gly Ile Asp Met Pro Asn Gln Thr Asn Lys Thr Ala Ala
        35                  40                  45

Phe Leu Cys Ala Ala Leu Gly Gly Pro Asn Ala Trp Thr Gly Arg Asn
    50                  55                  60

Leu Lys Glu Val His Ala Asn Met Gly Val Ser Asn Ala Gln Phe Thr
65                  70                  75                  80

Thr Val Ile Gly His Leu Arg Ser Ala Leu Thr Gly Ala Gly Val Ala
                85                  90                  95

Ala Ala Leu Val Glu Gln Thr Val Ala Val Ala Glu Thr Val Arg Gly
            100                 105                 110

Asp Val Val Thr Val
        115

<210> SEQ ID NO 12
<211> LENGTH: 147
<212> TYPE: PRT
<213> ORGANISM: Aspergillus niger
```

```
<400> SEQUENCE: 12

Met Pro Leu Thr Pro Glu Gln Ile Lys Ile Lys Ala Thr Val Pro
1               5                   10                  15

Val Leu Gln Glu Tyr Gly Thr Lys Ile Thr Thr Ala Phe Tyr Met Asn
            20                  25                  30

Met Ser Thr Val His Pro Glu Leu Asn Ala Val Phe Asn Thr Ala Asn
        35                  40                  45

Gln Val Lys Gly His Gln Ala Arg Ala Leu Ala Gly Ala Leu Phe Ala
    50                  55                  60

Tyr Ala Ser His Ile Asp Asp Leu Gly Ala Leu Gly Pro Ala Val Glu
65                  70                  75                  80

Leu Ile Cys Asn Lys His Ala Ser Leu Tyr Ile Gln Ala Asp Glu Tyr
                85                  90                  95

Lys Ile Val Gly Lys Tyr Leu Leu Glu Ala Met Lys Glu Val Leu Gly
            100                 105                 110

Asp Ala Cys Thr Asp Asp Ile Leu Asp Ala Trp Gly Ala Ala Tyr Trp
            115                 120                 125

Ala Leu Ala Asp Ile Met Ile Asn Arg Glu Ala Ala Leu Tyr Lys Gln
    130                 135                 140

Ser Gln Gly
145

<210> SEQ ID NO 13
<211> LENGTH: 165
<212> TYPE: PRT
<213> ORGANISM: Zea mays

<400> SEQUENCE: 13

Met Ala Leu Ala Glu Ala Asp Asp Gly Ala Val Val Phe Gly Glu Glu
1               5                   10                  15

Gln Glu Ala Leu Val Leu Lys Ser Trp Ala Val Met Lys Lys Asp Ala
            20                  25                  30

Ala Asn Leu Gly Leu Arg Phe Phe Leu Lys Val Phe Glu Ile Ala Pro
        35                  40                  45

Ser Ala Glu Gln Met Phe Ser Phe Leu Arg Asp Ser Asp Val Pro Leu
    50                  55                  60

Glu Lys Asn Pro Lys Leu Lys Thr His Ala Met Ser Val Phe Val Met
65                  70                  75                  80

Thr Cys Glu Ala Ala Ala Gln Leu Arg Lys Ala Gly Lys Val Thr Val
                85                  90                  95

Arg Glu Thr Thr Leu Lys Arg Leu Gly Ala Thr His Leu Arg Tyr Gly
            100                 105                 110

Val Ala Asp Gly His Phe Glu Val Thr Gly Phe Ala Leu Leu Glu Thr
            115                 120                 125

Ile Lys Glu Ala Leu Pro Ala Asp Met Trp Ser Leu Glu Met Lys Lys
    130                 135                 140

Ala Trp Ala Glu Ala Tyr Ser Gln Leu Val Ala Ala Ile Lys Arg Glu
145                 150                 155                 160

Met Lys Pro Asp Ala
                165

<210> SEQ ID NO 14
<211> LENGTH: 169
<212> TYPE: PRT
<213> ORGANISM: Oryza sativa subsp. japonica
```

-continued

<400> SEQUENCE: 14

Met Ala Leu Val Glu Gly Asn Asn Gly Val Ser Gly Ala Val Ser
1               5                   10                  15

Phe Ser Glu Glu Gln Glu Ala Leu Val Leu Lys Ser Trp Ala Ile Met
            20                  25                  30

Lys Lys Asp Ser Ala Asn Ile Gly Leu Arg Phe Phe Leu Lys Ile Phe
            35                  40                  45

Glu Val Ala Pro Ser Ala Ser Gln Met Phe Ser Phe Leu Arg Asn Ser
50                  55                  60

Asp Val Pro Leu Glu Lys Asn Pro Lys Leu Lys Thr His Ala Met Ser
65                  70                  75                  80

Val Phe Val Met Thr Cys Glu Ala Ala Gln Leu Arg Lys Ala Gly
                85                  90                  95

Lys Val Thr Val Arg Asp Thr Thr Leu Lys Arg Leu Gly Ala Thr His
                100                 105                 110

Phe Lys Tyr Gly Val Gly Asp Ala His Phe Glu Val Thr Arg Phe Ala
            115                 120                 125

Leu Leu Glu Thr Ile Lys Glu Ala Val Pro Val Asp Met Trp Ser Pro
130                 135                 140

Ala Met Lys Ser Ala Trp Ser Glu Ala Tyr Asn Gln Leu Val Ala Ala
145                 150                 155                 160

Ile Lys Gln Glu Met Lys Pro Ala Glu
                165

<210> SEQ ID NO 15
<211> LENGTH: 160
<212> TYPE: PRT
<213> ORGANISM: Arabidopsis thaliana

<400> SEQUENCE: 15

Met Glu Ser Glu Gly Lys Ile Val Phe Thr Glu Glu Gln Ala Leu
1               5                   10                  15

Val Val Lys Ser Trp Ser Val Met Lys Lys Asn Ser Ala Glu Leu Gly
            20                  25                  30

Leu Lys Leu Phe Ile Lys Ile Phe Glu Ile Ala Pro Thr Thr Lys Lys
            35                  40                  45

Met Phe Ser Phe Leu Arg Asp Ser Pro Ile Pro Ala Glu Gln Asn Pro
50                  55                  60

Lys Leu Lys Pro His Ala Met Ser Val Phe Val Met Cys Cys Glu Ser
65                  70                  75                  80

Ala Val Gln Leu Arg Lys Thr Gly Lys Val Thr Val Arg Glu Thr Thr
                85                  90                  95

Leu Lys Arg Leu Gly Ala Ser His Ser Lys Tyr Gly Val Val Asp Glu
                100                 105                 110

His Phe Glu Val Ala Lys Tyr Ala Leu Leu Glu Thr Ile Lys Glu Ala
            115                 120                 125

Val Pro Glu Met Trp Ser Pro Glu Met Lys Val Ala Trp Gly Gln Ala
130                 135                 140

Tyr Asp His Leu Val Ala Ala Ile Lys Ala Glu Met Asn Leu Ser Asn
145                 150                 155                 160

<210> SEQ ID NO 16
<211> LENGTH: 147
<212> TYPE: PRT
<213> ORGANISM: Pisum sativum

<400> SEQUENCE: 16

Met Gly Phe Thr Asp Lys Gln Glu Ala Leu Val Asn Ser Ser Trp Glu
1               5                   10                  15

Ser Phe Lys Gln Asn Leu Ser Gly Asn Ser Ile Leu Phe Tyr Thr Ile
            20                  25                  30

Ile Leu Glu Lys Ala Pro Ala Ala Lys Gly Leu Phe Ser Phe Leu Lys
        35                  40                  45

Asp Thr Ala Gly Val Glu Asp Ser Pro Lys Leu Gln Ala His Ala Glu
    50                  55                  60

Gln Val Phe Gly Leu Val Arg Asp Ser Ala Ala Gln Leu Arg Thr Lys
65                  70                  75                  80

Gly Glu Val Val Leu Gly Asn Ala Thr Leu Gly Ala Ile His Val Gln
                85                  90                  95

Arg Gly Val Thr Asp Pro His Phe Val Val Lys Glu Ala Leu Leu
            100                 105                 110

Gln Thr Ile Lys Lys Ala Ser Gly Asn Asn Trp Ser Glu Glu Leu Asn
            115                 120                 125

Thr Ala Trp Glu Val Ala Tyr Asp Gly Leu Ala Thr Ala Ile Lys Lys
    130                 135                 140

Ala Met Thr
145

<210> SEQ ID NO 17
<211> LENGTH: 145
<212> TYPE: PRT
<213> ORGANISM: Vigna unguiculata

<400> SEQUENCE: 17

Met Val Ala Phe Ser Asp Lys Gln Glu Ala Leu Val Asn Gly Ala Tyr
1               5                   10                  15

Glu Ala Phe Lys Ala Asn Ile Pro Lys Tyr Ser Val Val Phe Tyr Thr
            20                  25                  30

Thr Ile Leu Glu Lys Ala Pro Ala Ala Lys Asn Leu Phe Ser Phe Leu
        35                  40                  45

Ala Asn Gly Val Asp Ala Thr Asn Pro Lys Leu Thr Gly His Ala Glu
    50                  55                  60

Lys Leu Phe Gly Leu Val Arg Asp Ser Ala Ala Gln Leu Arg Ala Ser
65                  70                  75                  80

Gly Gly Val Val Ala Asp Ala Ala Leu Gly Ala Val His Ser Gln Lys
                85                  90                  95

Ala Val Asn Asp Ala Gln Phe Val Val Lys Glu Ala Leu Val Lys
            100                 105                 110

Thr Leu Lys Glu Ala Val Gly Asp Lys Trp Ser Asp Glu Leu Gly Thr
            115                 120                 125

Ala Val Glu Leu Ala Tyr Asp Glu Leu Ala Ala Ile Lys Lys Ala
    130                 135                 140

Tyr
145

<210> SEQ ID NO 18
<211> LENGTH: 154
<212> TYPE: PRT
<213> ORGANISM: Bos taurus

<400> SEQUENCE: 18

Met Gly Leu Ser Asp Gly Glu Trp Gln Leu Val Leu Asn Ala Trp Gly
1               5                   10                  15

Lys Val Glu Ala Asp Val Ala Gly His Gly Gln Glu Val Leu Ile Arg
            20                  25                  30

Leu Phe Thr Gly His Pro Glu Thr Leu Glu Lys Phe Asp Lys Phe Lys
        35                  40                  45

His Leu Lys Thr Glu Ala Glu Met Lys Ala Ser Glu Asp Leu Lys Lys
    50                  55                  60

His Gly Asn Thr Val Leu Thr Ala Leu Gly Gly Ile Leu Lys Lys Lys
65                  70                  75                  80

Gly His His Glu Ala Glu Val Lys His Leu Ala Glu Ser His Ala Asn
                85                  90                  95

Lys His Lys Ile Pro Val Lys Tyr Leu Glu Phe Ile Ser Asp Ala Ile
            100                 105                 110

Ile His Val Leu His Ala Lys His Pro Ser Asp Phe Gly Ala Asp Ala
        115                 120                 125

Gln Ala Ala Met Ser Lys Ala Leu Glu Leu Phe Arg Asn Asp Met Ala
    130                 135                 140

Ala Gln Tyr Lys Val Leu Gly Phe His Gly
145                 150

<210> SEQ ID NO 19
<211> LENGTH: 154
<212> TYPE: PRT
<213> ORGANISM: Sus scrofa

<400> SEQUENCE: 19

Met Gly Leu Ser Asp Gly Glu Trp Gln Leu Val Leu Asn Val Trp Gly
1               5                   10                  15

Lys Val Glu Ala Asp Val Ala Gly His Gly Gln Glu Val Leu Ile Arg
            20                  25                  30

Leu Phe Lys Gly His Pro Glu Thr Leu Glu Lys Phe Asp Lys Phe Lys
        35                  40                  45

His Leu Lys Ser Glu Asp Glu Met Lys Ala Ser Glu Asp Leu Lys Lys
    50                  55                  60

His Gly Asn Thr Val Leu Thr Ala Leu Gly Gly Ile Leu Lys Lys Lys
65                  70                  75                  80

Gly His His Glu Ala Glu Leu Thr Pro Leu Ala Gln Ser His Ala Thr
                85                  90                  95

Lys His Lys Ile Pro Val Lys Tyr Leu Glu Phe Ile Ser Glu Ala Ile
            100                 105                 110

Ile Gln Val Leu Gln Ser Lys His Pro Gly Asp Phe Gly Ala Asp Ala
        115                 120                 125

Gln Gly Ala Met Ser Lys Ala Leu Glu Leu Phe Arg Asn Asp Met Ala
    130                 135                 140

Ala Lys Tyr Lys Glu Leu Gly Phe Gln Gly
145                 150

<210> SEQ ID NO 20
<211> LENGTH: 154
<212> TYPE: PRT
<213> ORGANISM: Equus caballus -continued

<400> SEQUENCE: 20

Met Gly Leu Ser Asp Gly Glu Trp Gln Gln Val Leu Asn Val Trp Gly
1               5                   10                  15

Lys Val Glu Ala Asp Ile Ala Gly His Gly Gln Glu Val Leu Ile Arg
            20                  25                  30

Leu Phe Thr Gly His Pro Glu Thr Leu Glu Lys Phe Asp Lys Phe Lys
        35                  40                  45

His Leu Lys Thr Glu Ala Glu Met Lys Ala Ser Glu Asp Leu Lys Lys
    50                  55                  60

His Gly Thr Val Val Leu Thr Ala Leu Gly Gly Ile Leu Lys Lys Lys
65                  70                  75                  80

Gly His His Glu Ala Glu Leu Lys Pro Leu Ala Gln Ser His Ala Thr
                85                  90                  95

Lys His Lys Ile Pro Ile Lys Tyr Leu Glu Phe Ile Ser Asp Ala Ile
            100                 105                 110

Ile His Val Leu His Ser Lys His Pro Gly Asp Phe Gly Ala Asp Ala
        115                 120                 125

Gln Gly Ala Met Thr Lys Ala Leu Glu Leu Phe Arg Asn Asp Ile Ala
    130                 135                 140

Ala Lys Tyr Lys Glu Leu Gly Phe Gln Gly
145                 150

<210> SEQ ID NO 21
<211> LENGTH: 152
<212> TYPE: PRT
<213> ORGANISM: Nicotiana benthamiana

<400> SEQUENCE: 21

Met Ser Ser Phe Thr Glu Glu Gln Glu Ala Leu Val Val Lys Ser Trp
1               5                   10                  15

Asp Ser Met Lys Lys Asn Ala Gly Glu Trp Gly Leu Lys Leu Phe Leu
            20                  25                  30

Lys Ile Phe Glu Ile Ala Pro Ser Ala Lys Lys Leu Phe Ser Phe Leu
        35                  40                  45

Lys Asp Ser Asn Val Pro Leu Glu Gln Asn Ala Lys Leu Lys Pro His
    50                  55                  60

Ser Lys Ser Val Phe Val Met Thr Cys Glu Ala Ala Val Gln Leu Arg
65                  70                  75                  80

Lys Ala Gly Lys Val Val Arg Asp Ser Thr Leu Lys Lys Leu Gly
                85                  90                  95

Ala Thr His Phe Lys Tyr Gly Val Ala Asp Glu His Phe Glu Val Thr
            100                 105                 110

Lys Phe Ala Leu Leu Glu Thr Ile Lys Glu Ala Val Pro Glu Met Trp
        115                 120                 125

Ser Val Asp Met Lys Asn Ala Trp Gly Glu Ala Phe Asp Gln Leu Val
    130                 135                 140

Asn Ala Ile Lys Thr Glu Met Lys
145                 150

<210> SEQ ID NO 22
<211> LENGTH: 132
<212> TYPE: PRT
<213> ORGANISM: Bacillus subtilis

```
<400> SEQUENCE: 22

Met Gly Gln Ser Phe Asn Ala Pro Tyr Glu Ala Ile Gly Glu Leu
1               5                   10                  15

Leu Ser Gln Leu Val Asp Thr Phe Tyr Glu Arg Val Ala Ser His Pro
            20                  25                  30

Leu Leu Lys Pro Ile Phe Pro Ser Asp Leu Thr Glu Thr Ala Arg Lys
            35                  40                  45

Gln Lys Gln Phe Leu Thr Gln Tyr Leu Gly Gly Pro Pro Leu Tyr Thr
50                  55                  60

Glu Glu His Gly His Pro Met Leu Arg Ala Arg His Leu Pro Phe Pro
65                  70                  75                  80

Ile Thr Asn Glu Arg Ala Asp Ala Trp Leu Ser Cys Met Lys Asp Ala
                85                  90                  95

Met Asp His Val Gly Leu Glu Gly Glu Ile Arg Glu Phe Leu Phe Gly
            100                 105                 110

Arg Leu Glu Leu Thr Ala Arg His Met Val Asn Gln Thr Glu Ala Glu
            115                 120                 125

Asp Arg Ser Ser
    130

<210> SEQ ID NO 23
<211> LENGTH: 131
<212> TYPE: PRT
<213> ORGANISM: Corynebacterium glutamicum

<400> SEQUENCE: 23

Met Thr Thr Ser Glu Asn Phe Tyr Asp Ser Val Gly Gly Glu Thr
1               5                   10                  15

Phe Ser Leu Ile Val His Arg Phe Tyr Glu Gln Val Pro Asn Asp Asp
            20                  25                  30

Ile Leu Gly Pro Met Tyr Pro Pro Asp Phe Glu Gly Ala Glu Gln
            35                  40                  45

Arg Leu Lys Met Phe Leu Ser Gln Tyr Trp Gly Gly Pro Lys Asp Tyr
50                  55                  60

Gln Glu Gln Arg Gly His Pro Arg Leu Arg Met Arg His Val Asn Tyr
65                  70                  75                  80

Pro Ile Gly Val Thr Ala Ala Glu Arg Trp Leu Gln Leu Met Ser Asn
                85                  90                  95

Ala Leu Asp Gly Val Asp Leu Thr Ala Glu Gln Arg Glu Ala Ile Trp
            100                 105                 110

Glu His Met Val Arg Ala Ala Asp Met Leu Ile Asn Ser Asn Pro Asp
            115                 120                 125

Pro His Ala
    130

<210> SEQ ID NO 24
<211> LENGTH: 124
<212> TYPE: PRT
<213> ORGANISM: Synechocystis sp.

<400> SEQUENCE: 24

Met Ser Thr Leu Tyr Glu Lys Leu Gly Gly Thr Thr Ala Val Asp Leu
1               5                   10                  15

Ala Val Asp Lys Phe Tyr Glu Arg Val Leu Gln Asp Asp Arg Ile Lys
            20                  25                  30
```

His Phe Phe Ala Asp Val Asp Met Ala Lys Gln Arg Ala His Gln Lys
                35                  40                  45

Ala Phe Leu Thr Tyr Ala Phe Gly Gly Thr Asp Lys Tyr Asp Gly Arg
 50                  55                  60

Tyr Met Arg Glu Ala His Lys Glu Leu Val Glu Asn His Gly Leu Asn
 65                  70                  75                  80

Gly Glu His Phe Asp Ala Val Ala Glu Asp Leu Leu Ala Thr Leu Lys
                85                  90                  95

Glu Met Gly Val Pro Glu Asp Leu Ile Ala Glu Val Ala Ala Val Ala
            100                 105                 110

Gly Ala Pro Ala His Lys Arg Asp Val Leu Asn Gln
            115                 120

<210> SEQ ID NO 25
<211> LENGTH: 183
<212> TYPE: PRT
<213> ORGANISM: Synechococcus sp.

<400> SEQUENCE: 25

Met Asp Val Ala Leu Leu Glu Lys Ser Phe Glu Gln Ile Ser Pro Arg
 1               5                  10                  15

Ala Ile Glu Phe Ser Ala Ser Phe Tyr Gln Asn Leu Phe His His His
                20                  25                  30

Pro Glu Leu Lys Pro Leu Phe Ala Glu Thr Ser Gln Thr Ile Gln Glu
            35                  40                  45

Lys Lys Leu Ile Phe Ser Leu Ala Ala Ile Glu Asn Leu Arg Asn
 50                  55                  60

Pro Asp Ile Leu Gln Pro Ala Leu Lys Ser Leu Gly Ala Arg His Ala
 65                  70                  75                  80

Glu Val Gly Thr Ile Lys Ser His Tyr Pro Leu Val Gly Gln Ala Leu
                85                  90                  95

Ile Glu Thr Phe Ala Glu Tyr Leu Ala Ala Asp Trp Thr Glu Gln Leu
            100                 105                 110

Ala Thr Ala Trp Val Glu Ala Tyr Asp Val Ile Ala Ser Thr Met Ile
            115                 120                 125

Glu Gly Ala Asp Asn Pro Ala Ala Tyr Leu Glu Pro Glu Leu Thr Phe
130                 135                 140

Tyr Glu Trp Leu Asp Leu Tyr Gly Glu Glu Ser Pro Lys Val Arg Asn
145                 150                 155                 160

Ala Ile Ala Thr Leu Thr His Phe His Tyr Gly Glu Asp Pro Gln Asp
                165                 170                 175

Val Gln Arg Asp Ser Arg Gly
            180

<210> SEQ ID NO 26
<211> LENGTH: 118
<212> TYPE: PRT
<213> ORGANISM: Nostoc commune

<400> SEQUENCE: 26

Met Ser Thr Leu Tyr Asp Asn Ile Gly Gly Gln Pro Ala Ile Glu Gln
 1               5                  10                  15

Val Val Asp Glu Leu His Lys Arg Ile Ala Thr Asp Ser Leu Leu Ala
                20                  25                  30

Pro Val Phe Ala Gly Thr Asp Met Val Lys Gln Arg Asn His Leu Val
            35                  40                  45

-continued

```
Ala Phe Leu Ala Gln Ile Phe Glu Gly Pro Lys Gln Tyr Gly Gly Arg
        50              55                  60

Pro Met Asp Lys Thr His Ala Gly Leu Asn Leu Gln Gln Pro His Phe
 65              70                  75              80

Asp Ala Ile Ala Lys His Leu Gly Glu Arg Met Ala Val Arg Gly Val
                85                  90                  95

Ser Ala Glu Asn Thr Lys Ala Ala Leu Asp Arg Val Thr Asn Met Lys
            100                 105                 110

Gly Ala Ile Leu Asn Lys
        115

<210> SEQ ID NO 27
<211> LENGTH: 136
<212> TYPE: PRT
<213> ORGANISM: Bacillus megaterium

<400> SEQUENCE: 27

Met Arg Glu Lys Ile His Ser Pro Tyr Glu Leu Leu Gly Gly Glu His
 1               5                  10                  15

Thr Ile Ser Lys Leu Val Asp Ala Phe Tyr Thr Arg Val Gly Gln His
            20                  25                  30

Pro Glu Leu Ala Pro Ile Phe Pro Asp Asn Leu Thr Glu Thr Ala Arg
        35                  40                  45

Lys Gln Lys Gln Phe Leu Thr Gln Tyr Leu Gly Gly Pro Ser Leu Tyr
 50                  55                  60

Thr Glu Glu His Gly His Pro Met Leu Arg Ala Arg His Leu Pro Phe
 65              70                  75              80

Glu Ile Thr Pro Ser Arg Ala Lys Ala Trp Leu Thr Cys Met His Glu
                85                  90                  95

Ala Met Asp Glu Ile Asn Leu Glu Gly Pro Glu Arg Asp Glu Leu Tyr
            100                 105                 110

His Arg Leu Ile Leu Thr Ala Gln His Met Ile Asn Ser Pro Glu Gln
            115                 120                 125

Thr Asp Glu Lys Gly Phe Ser His
    130                 135
```